(12) United States Patent
Wittenberg et al.

(10) Patent No.: US 9,896,642 B2
(45) Date of Patent: Feb. 20, 2018

(54) METHODS OF MICROBIAL OIL EXTRACTION AND SEPARATION

(75) Inventors: Jon Wittenberg, San Mateo, CA (US); Felipe Arana, San Mateo, CA (US)

(73) Assignee: Corbion Biotech, Inc., South San Francisco, CA (US)

( * ) Notice: Subject to any disclaimer, the term of this patent is extended or adjusted under 35 U.S.C. 154(b) by 1242 days.

(21) Appl. No.: 13/264,379

(22) PCT Filed: Apr. 14, 2010

(86) PCT No.: PCT/US2010/031108
§ 371 (c)(1),
(2), (4) Date: Nov. 16, 2011

(87) PCT Pub. No.: WO2010/120939
PCT Pub. Date: Oct. 21, 2010

(65) Prior Publication Data
US 2012/0130099 A1    May 24, 2012

Related U.S. Application Data

(63) Continuation-in-part of application No. PCT/US2009/060692, filed on Oct. 14, 2009, which is a continuation-in-part of application No. PCT/US2009/066142, filed on Nov. 30, 2009, said application No. PCT/US2010/031108 is a continuation-in-part of application No. PCT/US2009/066141, filed on Nov. 30, 2009.

(60) Provisional application No. 61/169,271, filed on Apr. 14, 2009, provisional application No. 61/299,250, filed on Jan. 28, 2010, provisional application No. 61/105,121, filed on Oct. 14, 2008, provisional application No. 61/157,187, filed on Mar. 3, 2009, provisional application No. 61/173,166, filed on Apr. 27, 2009, provisional application No. 61/246,070, filed on Sep. 25, 2009, provisional application No. 61/118,590, filed on Nov. 28, 2008, provisional application No. 61/118,994, filed on Dec. 1, 2008, provisional application No. 61/174,357, filed on Apr. 30, 2009, provisional application No. 61/219,525, filed on Jun. 23, 2009.

(51) Int. Cl.
| | |
|---|---|
| *A61K 47/14* | (2017.01) |
| *A61K 35/748* | (2015.01) |
| *C11B 1/06* | (2006.01) |
| *C11B 1/10* | (2006.01) |
| *C11C 3/00* | (2006.01) |
| *A23K 10/37* | (2016.01) |
| *A23K 50/10* | (2016.01) |
| *A23K 50/75* | (2016.01) |
| *A23K 50/30* | (2016.01) |
| *A23K 50/80* | (2016.01) |
| *A61K 38/00* | (2006.01) |

(52) U.S. Cl.
CPC .............. *C11B 1/06* (2013.01); *A23K 10/37* (2016.05); *A23K 50/10* (2016.05); *A23K 50/30* (2016.05); *A23K 50/75* (2016.05); *A23K 50/80* (2016.05); *C11B 1/10* (2013.01); *C11C 3/003* (2013.01); *Y02P 60/877* (2015.11)

(58) Field of Classification Search
CPC ... B30B 9/02; B30B 9/12; B30B 9/267; C12P 7/649; A61K 47/14; A61K 35/748
USPC ..................................................... 435/243
See application file for complete search history.

(56) References Cited

U.S. PATENT DOCUMENTS

| | | |
|---|---|---|
| 3,983,008 A | 9/1976 | Shinozaki et al. |
| 4,373,434 A | 2/1983 | Alexander et al. |
| 4,901,635 A | 2/1990 | Williams |
| 5,338,673 A | 8/1994 | Thepenier et al. |
| 5,680,812 A | 10/1997 | Linsgeseder |
| 5,685,218 A | 11/1997 | Kemper |
| 5,826,500 A | 10/1998 | Kemper |
| 6,166,231 A | 12/2000 | Hoeksema |
| 6,176,176 B1 | 1/2001 | Dale et al. |
| 6,258,964 B1 * | 7/2001 | Nakajima et al. .............. 554/12 |
| 6,750,048 B2 | 6/2004 | Ruecker et al. |
| 7,351,558 B2 | 4/2008 | Ruecker et al. |
| 7,662,598 B2 | 2/2010 | Ruecker et al. |
| 7,678,931 B2 | 3/2010 | Fichtali et al. |
| 7,781,193 B2 | 8/2010 | Ruecker et al. |
| 8,043,496 B1 | 10/2011 | Schuh et al. |
| 8,580,540 B2 | 11/2013 | Dillon et al. |

(Continued)

FOREIGN PATENT DOCUMENTS

| | | |
|---|---|---|
| CN | 1304986 A | 7/2001 |
| WO | WO 91/11918 | 8/1991 |

(Continued)

OTHER PUBLICATIONS

Belarbi et al. (2000) A process for high yield and scaleable recovery of high purity eicosapentaenoic acid esters from microalgae and fish oil, Enzym. Microb. Technol., vol. 26, pp. 516-529.*

(Continued)

*Primary Examiner* — Anand U Desai
*Assistant Examiner* — Samuel W Liu
(74) *Attorney, Agent, or Firm* — Weaver Austin Villeneuve & Sampson LLP

(57) ABSTRACT

Lipids can be extracted from a microbial biomass that constitutes at least 20% lipids by weight and has a moisture content of less than 4% by weight by applying pressure to the biomass so as to release lipids therefrom, thereby leaving a biomass of reduced lipid content; and collecting the lipids.

23 Claims, 2 Drawing Sheets

(56) References Cited

U.S. PATENT DOCUMENTS

| | | | |
|---|---|---|---|
| 8,969,030 B2* | 3/2015 | Neto | 435/41 |
| 9,115,332 B2 | 8/2015 | Dillon et al. | |
| 2004/0049062 A1 | 3/2004 | Bijl et al. | |
| 2006/0024404 A1* | 2/2006 | Kyle | 426/2 |
| 2006/0057251 A1* | 3/2006 | Dawley et al. | 426/53 |
| 2006/0122410 A1 | 6/2006 | Fichtali et al. | |
| 2007/0113467 A1 | 5/2007 | Abou-Nemeh | |
| 2008/0060257 A1 | 3/2008 | Duyvesteyn | |
| 2008/0155888 A1 | 7/2008 | Vick et al. | |
| 2008/0179434 A1 | 7/2008 | Palm | |
| 2008/0233175 A1 | 9/2008 | Steer et al. | |
| 2009/0029445 A1* | 1/2009 | Eckelberry et al. | 435/257.1 |
| 2009/0061493 A1 | 3/2009 | Trimbur et al. | |
| 2010/0051511 A1* | 3/2010 | Faerman | 208/390 |
| 2010/0160659 A1* | 6/2010 | Catchpole | C11B 1/10 554/20 |
| 2012/0135479 A1 | 5/2012 | Dillon et al. | |
| 2014/0093945 A1 | 4/2014 | Dillon et al. | |
| 2016/0010025 A1 | 1/2016 | Dillon et al. | |

FOREIGN PATENT DOCUMENTS

| | | |
|---|---|---|
| WO | WO 97/37032 | 10/1997 |
| WO | WO 03/049832 | 6/2003 |
| WO | WO 2006/046943 | 5/2006 |
| WO | WO 2006/047445 | 5/2006 |
| WO | WO 08/113041 A2 | 9/2008 |
| WO | WO 2008/119082 | 10/2008 |
| WO | WO 08/151149 A2 | 12/2008 |
| WO | WO 2010/063032 | 6/2010 |
| WO | WO 10/120939 A2 | 10/2010 |
| WO | WO 10/138620 A1 | 3/2011 |
| WO | WO 10/138620 A1 | 12/2012 |

OTHER PUBLICATIONS

Bio Diesel (2007) http://boilkerala.blogspot.com/search?q=expeller, pp. 1-3.*
Domergue et al. (2003) New insight into Phaeodactylum tricornutum fatty acid metabolism. Cloning and functional characterization of plastidial and microsomal delta 12-fatty acid desaturase, Plant Physiol., vol. 131, No. 4, pp. 2003 1648-1660.*
Casaregola et al., "T7 end of clone AWOAA009C11 of library AWOAA from strain CLIB 89 of Yarrowia lipolytica, genomic survey sequence," Genebank Accession AL411154, [online], (2001). [Retrieved from the internet Sep. 28, 2010: <URL: http://www.ncbi.nlm.nih.gov/nucgss/12180296>].
El-Sheekh et al., "Variation of Some Nutritional Constituents and Fatty Acid Profiles of Chlorella vulgaris Beijerinck Grown under Auto and Heterotrophic Conditions," International Journal of Botany, 5 (2):153-159, (2009).
International Search Report for PCT/US2010/031108 dated Oct. 1, 2010.
International Search Report for PCT/US2010/036238 dated Oct. 29, 2010.
PCT International Preliminary Report on Patentability (Chapter I) dated Jan. 18, 2012 for application PCT/US2010/031108.
PCT International Preliminary Report on Patentability (Chapter I) dated Jan. 17, 2012 for application PCT/US2010/036238.
Turmel et al., "Prototheca wickerhamii large subunit ribosomal RNA (rrnL) gene, partial sequence; chloroplast gene for chloroplast product," Genebank Accession L42851, [online], (2001). [Retrieved from the internet Sep. 28, 2010: <URL: http://www.ncbi.nlm.nih.gov/nuccore/17028073>].
Written Opinion of the International Searching Authority for PCT/US2010/031108 dated Oct. 1, 2010.
Written Opinion of the International Searching Authority for PCT/US2010/036238 dated Oct. 29, 2010.
U.S. Appl. No. 13/322,435, Non-Final Office Action dated Aug. 5, 2013.
U.S. Appl. No. 13/322,435, Notice of Allowance dated Sep. 27, 2013.
U.S. Appl. No. 13/322,435, Requirement for Restriction/Election dated Jun. 19, 2013.
U.S. Appl. No. 14/055,763, Final Office Action dated Jul. 22, 2014.
U.S. Appl. No. 14/055,763, Non-Final Office Action dated Mar. 12, 2014.
U.S. Appl. No. 14/055,763, Non-Final Office Action dated Jan. 7, 2015.
U.S. Appl. No. 14/055,763, Notice of Allowance dated Apr. 15, 2015.
U.S. Appl. No. 61/169,271, filed Apr. 14, 2009.
U.S. Appl. No. 61/181,252, filed May 26, 2009.
U.S. Appl. No. 61/299,250, filed Jan. 28, 2010.
PCT/US10/031108, filed Apr. 14, 2010, WO 10/120939.
PCT/US10/036238, filed May 26, 2010, WO 10/138620.
U.S. Appl. No. 13/322,435, filed Nov. 23, 2011, now U.S. Pat. No. 8,580,540.
U.S. Appl. No. 14/055,763, filed Oct. 16, 2013, US-2014-0093945, Pending.
U.S. Appl. No. 14/055,763, filed Oct. 16, 2013, now U.S. Pat. No. 9,115,332.
U.S. Appl. No. 14/801,172, filed Jul. 16, 2015, Pending.
Mercer, Paula and Roberto E. Armenta, "Developments in oil extraction from microalgae", Eur. J. Lipid Sci. Technol., (Jan. 10, 2011), pp. 1-9, Wiley-VCH Verlag GmbH & Co. KGaA, Weinheim.
Brown, Ben et al., "Oil Extraction from Microalgae", Algae Oil Extraction Capstone 2009/2010, (Apr. 27, 2010), 23 pages.
U.S. Appl. No. 14/801,172, Restriction Requirement, dated Dec. 13, 2016.
Patent Examination Report No. 1 for Australian Application No. 2010236412, dated Nov. 27, 2014.
Notice of Acceptance for Australian Application No. 2010236412, dated Sep. 21, 2015.
Certificate of Grant for Australian Application No. 2010236412, dated Jan. 14, 2016.
Notice of Allowance for Canadian Application No. 2,758,924, dated Jan. 25, 2017.
Examiner's Report for Canadian Application No. 2,758,924, dated Apr. 14, 2016.
First Office Action for Chinese Patent Application No. 201080026280.3, dated Jul. 24, 2013.
Second Office Action for Chinese Patent Application No. 201080026280.3, dated Apr. 8, 2014.
Third Office Action for Chinese Patent Application No. 201080026280.3, dated Jul. 7, 2014.
Rejection Decision for Chinese Patent Application No. 201080026280.3, dated Dec. 2, 2014.
Notice of Re-Exam for Chinese Patent Application No. 201080026280.3, dated Jul. 28, 2016.
Extended European Search Report for EP Application No. 10765129.1, dated Jul. 7, 2016.
Substantive Examination Report for Indonesian Application No. W00201104122, received Jul. 7, 2014.
Office Action stage II for Indonesian Application No. W00201104122, dated Nov. 21, 2016.
Notice of grant for Indonesian Application No. W00201104122, dated Feb. 27, 2017.
First Substantive Action for Israeli Patent Application No. 215719, received Mar. 19, 2015.
Further Substantive Action for Israeli Patent Application No. 215719, dated Jan. 31, 2016.
Substantive Examination Adverse report for Application No. PI 2011004904 from the Intellecuatl Proporty Corporation of Malaysia, dated Nov. 30, 2016.
Office Action for Mexican Patent Application No. MX/a/2011/010824, dated Jul. 8, 2013.
Office Action for Mexican Patent Application No. MX/a/2014/000144, dated Apr. 1, 2015, in Spanish.
Office Action for Mexican Patent Application No. MX/a/2014/000144, dated Jun. 25, 2015, in Spanish.
Office Action for Mexican Patent Application No. MX/a/2014/000144, dated Jan. 7, 2016, in Spanish.

(56) References Cited

OTHER PUBLICATIONS

European search report (EESR) for European Patent Application No. 10781154.9, dated Jan. 4, 2016.3
Office Action for Mexican Patent Application No. MX/a/2011/012543, Sep. 5, 2013, in Spanish.
Filichkin, Sergei A. et al: "New FATB thioesterases from a high-laurateCuphea species: Functional and complementation analyses", European Journal of Lipid Science and Technology .vol. 108, No. 12, (Dec. 1, 2006), pp. 979-990, XP055236568.
Lee, J. Y., et al., "Comparison of several methods for effective lipid extraction from microalgae", Bioresource Technology, Elsevier BV, GB, vol. 101, No. 1, (Apr. 21, 2009), pp. S75-S77, XP026675398.
Lu, Xuefeng et al., "Overproduction of free 14,15 fatty acids in *E. coli*: Implications for biodiesel production". Metabolic Engineering, vol. 10, No. 6, (Nov. 1, 2008), pp. 333-339, XP055100754.
Sud, Inder Jit and David S. Feingold, "Lipid Composition and Sensitivity of Prototheca wickerhamii to Membrane-Active Antimicrobail Agents", Antimicrobial Agents and Chemotherapy, vol. 16, No. 4, (Oct. 1, 1979), pp. 486-490, XP055236065.
Vysakh et al., Bio Diesel, 3 pages, (2007). [Retrieved from the Internet May 10, 2015: <URL: http://boilkerala.blogspot.com/search?q=expeller>].

\* cited by examiner

METHODS OF MICROBIAL OIL EXTRACTION AND SEPARATION

CROSS-REFERENCE TO RELATED APPLICATIONS

This application is a national stage entry of International Application No. PCT/US10/31108, filed Apr. 14, 2010, which claims the benefit under 35 U.S.C. 119(e) of U.S. Provisional Application No. 61/169,271, filed Apr. 14, 2009, and U.S. Provisional Application No. 61/299,250, filed Jan. 28, 2010. This application is also a continuation-in part of International Application No. PCT/US2009/060692, filed Oct. 14, 2009 which claims the benefit under 35 U.S.C. 119(e) of U.S. Provisional Application No. 61/246,070, filed Sep. 25, 2009, U.S. Provisional Application No. 61/173,166, filed Apr. 27, 2009, U.S. Provisional Application No. 61/157,187, filed Mar. 3, 2009 and U.S. Provisional Application No. 61/105,121, filed Oct. 14, 2008. This application is also a continuation-in-part of International Application Nos. PCT/US2009/066142 and PCT/US2009/066141, both of which were filed Nov. 30, 2009, and each of which claims the benefit under 35 U.S.C. 119(e) of U.S. Provisional Application No. 61/219,525, filed Jun. 23, 2009, U.S. Provisional Application No. 61/174,357, filed Apr. 30, 2009, U.S. Provisional Application No. 61/118,994, filed Dec. 1, 2008, and U.S. Provisional Application No. 61/118,590, filed Nov. 28, 2008. Each of these applications is incorporated herein by reference in its entirety for all purposes.

REFERENCE TO A SEQUENCE LISTING

This application includes a sequence listing as shown in pages 1-21, appended hereto.

FIELD OF INVENTION

This invention generally relates to the production and extraction of oil from microorganisms. In particular, the invention provides methods for extracting, recovering, isolating, and obtaining oil from a microorganism and compositions comprising the oil. The invention accordingly relates to the fields of biology, microbiology, fermentation technology and oil and fuel production technology.

BACKGROUND OF THE INVENTION

Fossil fuel is a general term for combustible geologic deposits of organic materials formed from decayed plants and animals that have been converted to crude oil, coal, natural gas, or heavy oils by exposure to heat and pressure in the earth's crust over hundreds of millions of years.

Fossil fuels are a finite, non-renewable resource. With global modernization in the $20^{th}$ and $21^{st}$ centuries, the demand for energy from fossil fuels, especially gasoline derived from oil, is growing and has been the cause of major regional and global conflicts. Increased demand for energy has also increased the cost of hydrocarbon fuels. Aside from energy, many industries, including the plastics and chemical manufacturing industries, are dependent on the availability of hydrocarbons as a feedstock for manufacturing. Alternatives to current sources of supply would help mitigate the upward pressure on these raw material costs.

Lipids for use in biofuels can be produced in microorganisms, such as algae, fungi, and bacteria. Typically, manufacturing a lipid in a microorganism involves growing microorganisms, such as algae, fungi, or bacteria, which are capable of producing a desired lipid in a fermentor or bioreactor, isolating the microbial biomass, drying it, and extracting the intracellular lipids, which are a form of oil. However, these processes are generally considered to be inefficient and expensive, particularly when one considers the scale on which they must be conducted to produce meaningful supplies of fuel. One significant problem with these processes is the extraction of the lipid or oil from a microorganism.

There is a need for a process for extracting oil from microorganisms that mitigates the problems of low efficiency and high cost of current methods for lipid extraction from microorganisms. The present invention provides such a process.

SUMMARY OF THE INVENTION

The present invention provides methods for extracting lipids/oil from microbial biomass. In one embodiment, the present invention provides a method for extracting oil from microbial biomass, said method comprising the steps of subjecting dry microbial biomass having a moisture content of less than 6% by weight and constituting at least 20% oil by weight and heat conditioned to a temperature in the range of 70° C. to 150° C. (160° F. to 300° F.) to pressure sufficient to extract more than 5% of the oil by weight from the biomass so that extracted oil and spent biomass of reduced oil content is produced. In various embodiments, more than 75% of the oil by weight in the dry microbial biomass is extracted from the biomass in the pressing step.

Thus, this method comprises drying and then conditioning the microbial biomass to produce conditioned feedstock that is then subjected to pressure. Conditioning changes the physical and/or physiochemical properties of the biomass but does not cause the release of more than 5% of the oil in the biomass. The conditioning step comprises heating the dry microbial biomass to a temperature in the range of 70° C. to 150° C. (160° F. to 300° F.), thereby altering its moisture content. In various embodiments, a "bulking agent" or "press-aid" is added either to the microbial biomass or to conditioned feedstock prior to the application of pressure during the pressing step. During the pressing step, the conditioned feedstock is subjected to pressure sufficient to separate at least 5% of the oil in the biomass or conditioned feedstock from other components. These other components are contained in the "spent biomass", which may include residual oil but in any event has reduced oil content relative to the conditioned feedstock. In one embodiment, the pressure is exerted by an expeller press.

In various embodiments of this and other aspects of the invention, the biomass is prepared by fermentation of a microbe selected from the group consisting of microalgae, oleaginous bacteria, oleaginous yeast, and fungi. In various embodiments, the microalgae is a species of a genus selected from *Chlorella, Parachlorella*, or *Prototheca*, or is one of the other species in Table 1, below. In various embodiments, the oleaginous bacteria is a species of the genus *Rhodococcus*. In various embodiments, the oleaginous yeast is *Rhodotorula glutinis* or another species listed in Table 2, below. In various embodiments, the fungi is a species listed in Table 3, below.

In various embodiments of this and other aspects of the invention, the biomass is prepared by fermentation of a microbe that contains 18:1 fatty acid. In various embodiments, the microbe has a fatty acid profile of less than 2% C14:0; about 13-16% C16:0; about 1-4% C18:0; about 64-71% C18:1; about 10-15% C18:2; about 0.5-2% w/w C18:3; and less than 1% carbon chain length 20 or longer. In various embodiments, the microbe has a fatty acid profile of about 1-2% C14:0; about 20% C16:0; about 4% C18:0; about 64% C18:1; and about 7-8% C18:2. In some embodiments, the microbe has a fatty acid profile of about C14:0 (1.65); C16:0 (28.0); C18:0 (2.90); C18:1 (53.80); C18:2 (10.95); and C18:3alpha (0.80). In other embodiments, the microbe has a fatty acid profile of C14:0 (2.33); C15:0 (9.08); C16:0 (24.56); C16:1 (11.07); C17:0 (10.50); C18:0 (2.49); C18:1 (17.41); C18:2 (0.05). In still other embodiments, the microbe has a fatty acid profile of C12 (less than 1%); C14:0 (2.18-3.36); C15:0 (0.12-0.25); C16:0 (29.94-33.26); C16:1 (0.49-0.76); C17:0; C18:0 (6.88-8.17); C18:1 (42.68-48.12); C18:2 (7.88-9.28) C18:3 alpha (0.84-1.33); and greater than C:20 (1.1-1.45). In various embodiments, the microbe has less than 0.5% DHA. In these and other embodiments, the microbe is, in some instances, a microalgae.

In various embodiments of this and other aspects of the invention, the microbial biomass (dry or hydrated) or conditioned feedstock contains at least 25% oil (lipids) by weight. In various embodiments, the dry microbial biomass or conditioned feedstock contains at least 25% oil by dry cell weight. In various embodiments, the dry microbial biomass or conditioned feedstock contains at least 40%, at least 50%, or at least 75% oil by dry cell weight. In various embodiments, the dry microbial biomass or conditioned feedstock contains at least 15% carbohydrate by dry cell weight.

In various embodiments of this and other aspects of the invention, the conditioning step involves the application of heat and/or pressure to the biomass. In various embodiments, the conditioning step comprises heating the biomass at a temperature in the range of 70° C. to 150° C. (160° F. to 300° F.). In various embodiments, the heating is performed using a vertical stacked shaker. In various embodiments, the conditioning step comprises treating the dry biomass with an expander or extruder to shape and/or homogenize the biomass. In various embodiments, the dry biomass or conditioned feedstock has a moisture content of less than 5% by weight. In various embodiments, the dry biomass or conditioned feedstock has a moisture content in the range of 0.1% and 5% by weight. In various embodiments, the dry biomass or conditioned feedstock has a moisture content of less than 4% by weight. In various embodiments, the dry biomass or conditioned feedstock has a moisture content in the range of 0.5% and 3.5% by weight. In various embodiments, the dry biomass or conditioned feedstock has a moisture content in the range of 0.1% and 3% by weight.

In various embodiments of this and other aspects of the invention, a bulking agent is added to the microbial biomass, which may be either dry or hydrated (i.e., biomass that has not been dried or that contains significant, i.e., more than 6% by weight, moisture, including biomass in fermentation broth that has not been subjected to any process to remove or separate water) microbial biomass or conditioned feedstock prior to the pressing step. In various embodiments, the bulking agent has an average particle size of less than 1.5 mm. In various embodiments, the bulking agent is selected from the group consisting of cellulose, corn stover, dried rosemary, soybean hulls, spent biomass (biomass of reduced lipid content relative to the biomass from which it was prepared), sugar cane bagasse, and switchgrass. In various embodiments, the bulking agent is spent biomass that contains between 50% and 80% polysaccharide by weight and/or less than 10% oil by weight. In various embodiments, the polysaccharide in the spent biomass used as a bulking agent contains 20-30 mole percent galactose, 55-65 mole percent glucose, and/or 5-15 mole percent mannose.

The invention provides various methods relating to the extraction of oil from microbial biomass that employ the bulking agents described above. In one method, hydrated microbial biomass suitable for oil extraction is prepared by adding a bulking agent to the biomass and drying the mixture obtained thereby to a moisture content less than 6% by weight, thereby forming a dried bulking agent/biomass mixture. In another method, oil is extracted from microbial biomass by co-drying hydrated microbial biomass containing at least 20% oil by weight and a bulking agent to form a dried bulking agent/biomass mixture; reducing the moisture content in the mixture to less than 4% by weight; and pressing the reduced moisture content mixture to extract oil therefrom, thereby forming spent biomass of reduced lipid content. In another method, increased yields of oil are obtained from microbial biomass containing at least 20% lipid by weight by co-drying the microbial biomass with a bulking agent, because the co-dried mixture will, upon pressing, release more oil than can be obtained from the biomass under the same conditions in the absence of a bulking agent. In various embodiments of these and other methods of the invention, the hydrated microbial biomass is contained in fermentation broth that has not been subjected to processes to separate or remove water from the biomass prior to adding the bulking agent to the biomass. Typically, the admixture of bulking agent and biomass is conditioned by heating to a temperature in the range of 70° C. to 150° C. (160° F. to 300° F.) immediately prior to the pressing step.

In various embodiments of the different aspects of the invention, dry microbial biomass, hydrated microbial biomass admixed with a bulking agent, or conditioned feedstock, optionally comprising a bulking agent, is subjected to pressure in a pressing step to extract oil, producing oil separated from the spent biomass. The pressing step involves subjecting pressure sufficient to extract oil from the conditioned feedstock. Cell lysis will occur during this step, if the biomass or feedstock has not been subjected to conditions that lyse some or all of the cells prior to the pressing step. In various embodiments of the different aspects of the invention, the pressing step will involve subjecting the conditioned feedstock to at least 10,000 psi of pressure. In various embodiments, the pressing step involves the application of pressure for a first period of time, a reduction in pressure for a second period of time, and then application of a pressure higher than during the first period of time for a third period of time. This process may be repeated one or more times ("oscillating pressure"). In various embodiments, more than 5 cycles of oscillating pressure are applied. In various embodiments, one or more of the subsequent cycles may exert an average pressure that is higher than the average pressure exerted in one or more earlier cycles. For example and without limitation, the average pressure in the last cycle can be at least 2-fold higher than the average pressure in the first or any earlier cycle. In various embodiments, moisture content of the conditioned feedstock is controlled during the pressing step. In various embodiments, the moisture is controlled in a range of from 0.1% to 3% by weight In various embodiments, the pressing step is conducted with an expeller press. In various embodiments, the pressing step is conducted in a continuous flow mode. In various embodiments, the oiling rate is at least 500 g/min to no more than 1000 g/min. In various continuous flow embodiments, the expeller press is a device comprising a continuously rotating worm shaft within a cage having a feeder at one end and a choke at the opposite end, having openings within the cage is utilized. The conditioned feedstock enters the cage through the feeder, and rotation of the worm shaft advances the feedstock along the cage and applies pressure to the feedstock disposed between the cage and the choke, the pressure releasing oil through the openings of cage and extruding spent biomass from the choke end of the cage. In various embodiments, the cage has an internal length that is between at least ten times to at least twenty times its internal diameter. In various embodiments, the cage comprises a plurality of elongated bars with at least some of the elongated bars separated by one or more spacers, the bars resting on a frame, wherein the one or more spacers between the bars form the openings, and oil is released through the openings to a collecting vessel fluidly coupled with the cage. In various embodiments, the spacers between the elongated bars are of different thicknesses thereby allowing variation of the space between each elongated bar. In various embodiments, either the spacers or the gaps between the bars are from 0.005 to 0.030 inches thick.

In various embodiments, the pressure increases by a factor of between 10 and 20 from the feeder end to the choke end of the cage. In various embodiments, the pressure along the cage does not increase by more than 100% of the pressure at the feeder end of the cage per linear foot of the cage between the feeder and choke ends of the cage. In various embodiments, the power consumed by the device does not increase by more than 10% when fully loaded with conditioned feedstock relative to running empty. In various embodiments, the residence time of feedstock in the barrel of the device is no longer than 5-10 min. In various embodiments, either the temperature of the expeller device or the pressure exerted by the expeller device or both are monitored and/or controlled.

In various embodiments, pressure is controlled by adjusting rotational velocity of a worm shaft. In various embodiments, including those in which pressure is not controlled, an expeller (screw) press comprising a worm shaft and a barrel can be used. In various embodiments, the barrel has a length and a channel having a diameter sized to receive the worm shaft, and wherein the barrel length is at least 10 to 15 times greater than the channel diameter. In various embodiments, the barrel of the press has an entrance and an exit and the diameter of the worm shaft increases from the entrance to the exit, and the pressing comprises increasing the pressure from the entrance to the exit of the barrel; in various embodiments, the pressure at the exit is 12 to 16, or even up to 20 times higher than the pressure at the entrance. In various embodiments, the expeller press comprises a worm shaft and a barrel having a first channel and a second channel, both channels concentric and sized to receive the worm shaft, wherein the first channel has a first diameter and the second channel has a second diameter different than the first diameter. In various embodiments, the conditioned feedstock remains resident in the barrel of the expeller press for 5 to 10 minutes.

In various embodiments, the expeller press comprises a worm shaft disposed in a barrel lined with a plurality of elongate bars separated by one or more spacers therebetween, the spacers creating a gap between the elongate bars. In such a press, pressure can be controlled by adjusting the gap by changing the size or number of spacers between the elongate bars, and/or if the press has a space between an outer surface of the worm shaft and an inner surface of the elongate bars, pressure can be controlled by replacing at least some of the elongate bars with different sized bars so as to change the space. In various embodiments, the press comprises an output aperture and an adjustable choke coupled therewith, and pressure is controlled by adjusting the choke to increase or decrease the pressure. In various embodiments, the press comprises a worm shaft disposed in a barrel, and pressure is controlled by adjusting a gap between an outer surface of the worm shaft and an inside surface of the barrel.

After the pressing step, the method results in the extraction of oil and the production of spent biomass. In various embodiments, the released oil contains solid particles of biomass or conditioned feedstock, and the method further comprises separating the released oil from the solid particles. Optionally, the separated solid particles can be subjected to pressure to extract any remaining oil therefrom. In various embodiments, the extracted oil contains no more than 8 ppm chloride, no more than 2 ppm phosphorus, no more than 26 ppm potassium, no more than 12 ppm sodium, and/or no more than 5 ppm sulfur. The oil produced by the process is useful in a variety of applications, including but not limited to the production of fuels such as biodiesel and renewable diesel and the production of food.

In various embodiments, the oil content in the spent biomass of reduced oil content is at least 45 percent less than the oil content of the microbial biomass before the pressing step. In various embodiments, the spent biomass of reduced oil content remaining after the pressing step is pelletized or extruded as a cake. The spent biomass, which may be subjected to additional processes, including additional conditioning and pressing or solvent-based or other extraction methods to extract residual oil, is similarly useful in a variety of applications, including but not limited to use as food, particularly for animals, and as a bulking agent. In various embodiments, remaining oil is extracted from the spent biomass of reduced oil content; in various embodiments the extracting is performed by subjecting the spent biomass to pressure or by extracting the oil with an organic solvent.

In view of the foregoing, the present invention is directed, in one aspect, to a method for extracting lipids from microbial biomass. In one embodiment, the method comprises subjecting microbial biomass constituting at least 20% lipids by weight and having a moisture content of less than 6% by weight to pressure, whereby cells of the biomass are lysed, releasing more than 5% of the lipids and leaving spent biomass of reduced lipid content, wherein the extracted lipids and spent biomass are separated from each other.

In some cases, the microbial biomass is subjected to a lower pressure for a first period of time followed by a higher pressure for a second period of time. In some cases, the microbial biomass is subjected to more than 5 cycles of oscillating pressure, and the average pressure exerted on the biomass during the course of the last cycle is at least 2 fold higher than the average pressure exerted on the biomass during the course of the first cycle. In some cases, the microbial biomass is subject to pressure by a method comprising continuous flow through a device applying the pressure. In one embodiment, the device is an expeller press. In some cases, the microbial biomass is subjected to at least 10,000 PSI of pressure.

In some embodiments, the microbial biomass is subject to pressure by a method comprising continuous flow through a device applying the pressure, wherein the device is a continuously rotating worm shaft within a cage having a feeder at one end and a choke at an end opposite thereof, and having openings within the cage, wherein the biomass enters the cage through the feeder, and rotation of the worm shaft advances the biomass along the cage and applies pressure to the biomass disposed between the cage and the choke, the pressure lysing cells of the biomass and releasing oil through the openings of the cage such that spent biomass of reduced oil content is extruded from the choke end of the cage. In some cases, the cage comprises a plurality of elongated bars with at least some of the elongated bars separated by one or more spacers, and the bars resting on a frame, wherein the one or more spacers between the bars form the openings, and lipids are released through the openings to a collecting vessel fluidly coupled with the cage. In some cases, the spacers between the elongated bars are of different thicknesses thereby allowing variation of the space between each elongated bar. In some embodiments, either the spacers or the gaps between the bars are from 0.005 to 0.030 inches thick. In some cases, the pressure increases by a factor of between 10 and 20 from the feeder end to the choke end of the cage. In some cases, the residence time of biomass in the barrel of the device is between 5-10 minutes. In some embodiments, the cage has an internal length that is between at least ten times to at least 20 times its internal diameter. In some cases, the power consumed by a device does not increase by more than 10% when fully loaded with microbial biomass relative to running empty. In some cases, the pressure along the cage does not increase by more than 100% of the pressure at the feeder end of the cage per linear foot of the cage between the feeder and choke ends of the cage.

In some embodiments, the method further comprises pelletizing the spent biomass of reduced oil content or extruding the spent biomass of reduced oil content as a cake. In some embodiments, the method further comprises extracting lipids from the spent biomass of reduced oil content. In some cases, the lipid content in the spent biomass of reduced oil content is at least 45 percent less than the lipid content of the microbial biomass before subjecting it to pressure. In some embodiments, the method further comprises extracting lipids from the spent biomass of reduced oil content with an organic solvent. In some embodiments, the method further comprises adjusting the moisture content of the microbial biomass to between 0.1 and 5% before subjecting the microbial biomass to pressure.

In some cases, the method comprises adjusting the moisture content of the microbial biomass to between 0.5% and 3.5% by weight before subjecting the microbial biomass to pressure. In some cases, the method comprises adjusting the moisture content of the microbial biomass to between 1.0% and 2.0% by weight before subjecting the microbial biomass to pressure. In some embodiments, the adjustment is achieved by conditioning the biomass with heat. In some cases, the conditioning with heat is performed using a vertical stacked conditioner.

In some embodiments, the method further comprises conditioning the biomass to change its physical or physiochemical properties without releasing more than 5% of the lipids to facilitate release of lipids in a subsequent step wherein the biomass is subjected to pressure. In some cases, the conditioning step comprises heating the biomass at 150-300° F. In some cases, the conditioning step comprises heating the biomass at 200-270° F. In some cases, the conditioning step comprises heating the biomass at 210-260° F. In some cases, the conditioning step comprises heating the biomass for a period of time between 20 and 60 minutes. In some embodiments, the conditioning step comprises subjecting the biomass to a first pressure that does not release more than 5% of the lipids in the biomass. In some embodiments, the method further comprises treating the biomass with an expander or extruder without releasing more than 5% of the lipids in the biomass before the step of subjecting the biomass to pressure sufficient to release more than 5% of the lipids.

In some embodiments, the method further comprises adding a bulking agent to the microbial biomass to facilitate release of the lipids when the microbial biomass is subjected to pressure. In some cases, the bulking agent is selected from the group consisting of switchgrass, soybean hulls, dried rosemary, corn stover, cellulose, spent biomass of reduced lipid content, and sugar cane bagasse. In some cases, the bulking agent is spent microbial biomass of reduced lipid content that comprises between 40% and 90% polysaccharide and less than 10% oil. In some cases, the bulking agent is spent microbial biomass of reduced lipid content that comprises between 60% and 80% polysaccharide and less than 10% oil. In some cases, the bulking agent is spent microbial biomass of the same strain as the microbial biomass. In some embodiments, the polysaccharide is of 20-30 mole percent galactose; 55-65% mole percent glucose; and 5-15 mole percent mannose. In some cases, the spent biomass of reduced lipid content is from microalgae from the genus *Chlorella, Parachlorella* or *Prototheca*. In some embodiments, the bulking agent has an average particle size of less than 1.5 mm In some cases, the bulking agent has an average particle size of between 150-350 microns. In some cases, the bulking agent is added to the microbial biomass prior to a step of dehydrating the microbial biomass to a moisture content of less than 6%.

In some embodiments of the present invention, the microbial biomass is microalgae. In some cases, the microalgae is selected from the species listed in Table 1. In some cases, the microalgae is of the genus *Chlorella, Parachlorella* or *Prototheca*. In some embodiments, the microalgae has a 23S rRNA genomic sequence with at least 75%, 85% or 95% nucleotide identity to one or more of SEQ ID NOs: 1-23 or 26-34.

In some embodiments of the present invention, the microbial biomass is bacteria. In some cases, the bacteria is from the genus *Rhodococcus*.

In some embodiments of the present invention, the microbial biomass is oleaginous yeast. In some cases, the oleaginous yeast is selected from the species listed in Table 2. In some cases, the oleaginous yeast is *Rhodotorula glutinis*. In some embodiments, the oleaginous yeast has a fungal 18S and 26S rRNA genomic sequence with at least 75%, 85%, or 95% nucleotide identity to one or more of SEQ ID NOs: 37-69. In some embodiments, the microbial biomass is an oleaginous yeast of the genus *Torulaspora* or *Yarrowia*.

In some embodiments of the present invention, the microbial biomass is non-yeast oleaginous fungi. In some cases, the non-yeast oleaginous fungi is selected from the species listed in Table 3.

In some embodiments, the microbial biomass contains at least 45% lipids by dry cell weight. In some cases, the microbial biomass has at least 15% carbohydrate by dry weight. In some cases, the microbial biomass is derived from microalgae having a fatty acid profile of: less than 2% C14:0; about 13-16% C16:0; about 1-4% C18:0; about 64-71% C18:1; about 10-15% C18:2; about 0.5-2% C18:3; and less than 1% carbon chain length 20 or longer. In some cases, the microalgae has a fatty acid lipid profile comprising of at least 15% C:16 fatty acids, at least 50% C18:1 fatty acids, at least 7% C18:2 fatty acids, and less than 3% C10:0-C14:0 fatty acids. In some cases, the microalgae has a fatty acid profile of: about 1-2% C14:0; about 16-26% C16:0; about 2-6% C18:0; about 58-68% C18:1; and about 7-11% C18:2. In some embodiments, the microalgae has a lipid profile comprising at least 4% C8-C14 and contains an exogenous gene encoding a thioesterase with a preference for one or more fatty acid chain lengths of 8, 10, 12 and 14 carbon atoms. In some cases, the microalgae has a lipid profile comprising between 10 and 40% C8-C14. In some cases, the microbial biomass has a lipid profile comprising at least 10% 16:1. In some embodiments, the microbial biomass contains at least 30% lipids by weight. In some cases, the microbial biomass contains at least 40% lipids by weight. In some cases, the microbial biomass contains at least 50% lipids by weight. In some cases, the microbial biomass contains between 60-70% lipids by weight.

In some embodiments, the extracted lipid has less than 0.01 milligram of chlorophyll per kilogram of lipid. In some cases, the extracted lipid has between 0.2 and 0.3 micrograms of carotenoids per milliliter of lipid.

In some embodiments, the microbial biomass contains an exogenous gene encoding a sucrose invertase.

In some embodiments, the microbial biomass has been subjected to a pneumatic drying step prior to application of pressure.

In some embodiments, the extracted lipids comprise one or more of the following: no more than 8 ppm chloride, no more than 2 ppm phosphorus, no more than 26 ppm potassium, no more than 12 ppm sodium, and no more than 5 ppm sulfur.

In another aspect, the present invention is directed to a method of preparing hydrated microbial biomass for oil extraction. In one embodiment, the method comprises adding a bulking agent to the biomass, and drying the bulking agent and the biomass together to a moisture content of less than 6%, thereby forming a dried bulking agent-biomass mixture. In some embodiments, the hydrated microbial biomass is contained in a fermentation broth that has not been subjected to separation or water removal processes. In some cases, the bulking agent is selected from the group consisting of switchgrass, soybean hulls, dried rosemary, corn stover, cellulose, spent biomass of reduced lipid content, and sugar cane bagasse. In some cases, the bulking agent is spent biomass of reduced lipid content that comprises between 40% and 90% polysaccharide and less than 10% oil.

In yet another aspect, the present invention is directed to a method for extracting lipids from microbial biomass. In one embodiment, the method comprises (a) co-drying hydrated microbial biomass constituting at least 20% lipids by weight and a bulking agent, therby forming a dried bulking agent-biomass mixture, (b) conditioning the dried bulking agent-biomass mixture so that the moisture content is less than 4% by weight, and (c) subjecting the conditioned dried bulking agent-biomass mixture to pressure, whereby cells of the biomass are lysed, releasing more than 5% of the lipids and leaving spent biomass of reduced lipid content. In some embodiments, the hydrated microbial biomass is contained in a fermentation broth that has not been subjected to separation or water removal processes. In some cases, the bulking agent is selected from the group consisting of switchgrass, soybean hulls, dried rosemary, corn stover, cellulose, spent biomass of reduced lipid content and sugar cane bagasse. In some cases, the bulking agent is spent biomass of reduced lipid content that comprises between 40% and 90% polysaccharide and less than 10% oil.

In still another aspect, the present invention is directed to a method of increasing yield in lipid extraction from microbial biomass constituting at least 20% lipids by weight. In one embodiment, the method comprises co-drying the microbial biomass with a bulking agent, whereby the amount of oil extracted from the co-dried microbial biomass and bulking agent when subjected to pressure is greater than without the addition of the bulking agent. In some cases, the microbial biomass is derived from a culture that was cultivated through a process selected from the group consisting of a heterotrophic process, a photoautotrophic process, and a mixotrophic process.

These and other aspects and embodiments of the invention are described in the accompanying drawings, a brief description of which immediately follows, and in the detailed description of the invention below, and are exemplified in the examples below. Any or all of the features discussed above and throughout the application can be combined in various embodiments of the present invention.

DETAILED DESCRIPTION OF THE INVENTION

Figure 1:
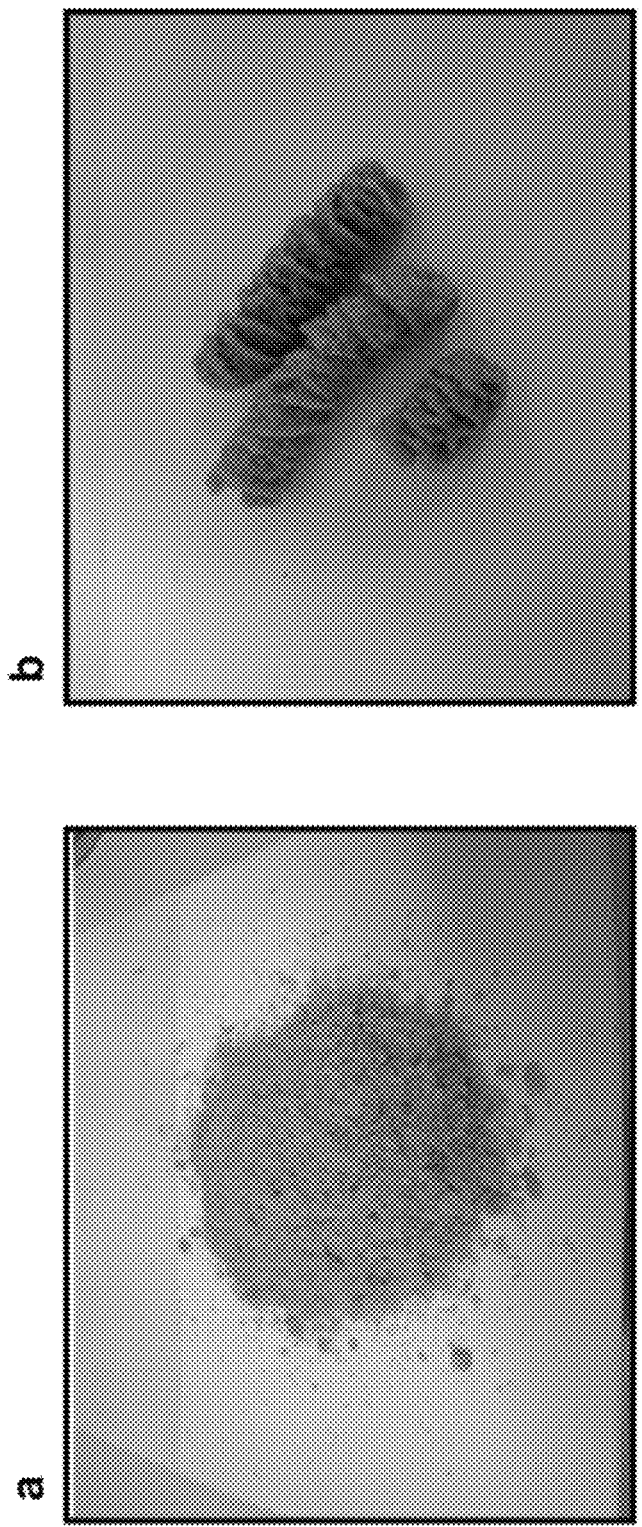
FIG. 1a shows microalgal biomass after the surface moisture has been removed through drum drying.
FIG. 1b shows microalgal biomass after being conditioned using a low pressure "pre-press" to form collets.

The present invention provides methods for extracting lipids from microorganisms. This detailed description of the invention is divided into sections for the convenience of the reader, beginning with section I, which provides definitions of various terms used in describing the invention. Section II describes the methods of the invention for extracting oil from microorganisms, for preparing microbial biomass for the extraction of oil, and for further processing spent biomass. Section III describes microorganisms useful in generating oil-containing microbial biomass and methods for culturing them to produce oil. Section V provides illustrative examples of how to practice the methods of the invention.

I. Definitions

Unless defined otherwise, all technical and scientific terms used herein have the meaning commonly understood by a person skilled in the art to which this invention belongs. The following references provide one of skill in the art to which this invention pertains with general definitions of many of the terms used in this disclosure: Singleton et al., *Dictionary of Microbiology and Molecular Biology* ($2^{nd}$ ed. 1994); *The Cambridge Dictionary of Science and Technology* (Walker ed., 1988); *Glossary of Genetics*, $5^{th}$ Ed., R. Rieger et al. (eds.), Springer Verlag (1991); and Hale & Marham, *The Harper Collins Dictionary of Biology* (1991). As used herein, the following terms have the meanings ascribed to them, unless specified otherwise.

"Area Percent" refers to the area of peaks observed using FAME GC/FID detection methods in which every fatty acid in the sample is converted into a fatty acid methyl ester (FAME) prior to detection. For example, a separate peak is observed for a fatty acid of 14 carbon atoms with no unsaturation (C14:0) compared to any other fatty acid such as C14:1. The peak area for each class of FAME is directly proportional to its percent composition in the mixture and is calculated based on the sum of all peaks present in the sample (i.e. [area under specific peak/total area of all measured peaks]×100). When referring to lipid profiles of oils and cells of the invention, "at least 4% C8-C14" means that at least 4% of the total fatty acids in the cell or in the extracted glycerolipid composition have a chain length that includes 8, 10, 12 or 14 carbon atoms.

"Axenic" refers to a culture of an organism that is free from contamination by other living organisms.

"Biomass" refers to material produced by growth and/or propagation of cells. Biomass may contain cells and/or intracellular contents as well as extracellular material. Extracellular material includes, but is not limited to, compounds secreted by a cell.

"Bioreactor" refers to an enclosure or partial enclosure in which cells, e.g., microorganisms, are cultured, optionally in suspension.

"Bulking agent" and "press-aid" are used interchangeably herein and refer to material that is suitable to add to feedstock (such as dried and/or conditioned biomass) to increase the fiber content of the feedstock. Bulking agents include, but are not limited to, switchgrass, soybean hulls, spent biomass, and sugar cane bagasse. Bulking agents facilitate release of lipids (oil) from biomass, perhaps by increasing the uniformity with which pressure can be applied to the component cells of the biomass. In some cases, a press aid can also act as a filter aid, clarifying or reducing the amount of foots that is extracted with the oil. An example of a press aid that also acts as a filter aid is cellulose.

"Cellulosic material" means the products of digestion of cellulose, including glucose, xylose, disaccharides, oligosaccharides, lignin, and other molecules.

"Conditioned feedstock" is dried, oil-bearing microbial biomass that has been physically altered in some way after being dried, typically without releasing more than 5% of total oil from the biomass and heated to a temperature in the range of 70° C. to 150° C. (160° F. to 300° F.). As used in this context, the substance to which "releasing" and "released" refer is oil. Examples of conditioning include putting the dried, oil-bearing microbial biomass through a vertical stacked conditioner, an expander, an extruder, or an expeller; and/or subjecting the dried, oil-bearing microbial biomass to flaking, cracking, grinding, crushing, heating, steaming, thermal conditioning, low pressure, high pressure, and other methods for changing the physical nature of the dried, oil-bearing microbial biomass to maximize oil extraction using non-chemical or solventless extraction methods. Changes that occur upon subjecting the dried, oil-bearing microbial biomass to conditioning include changes at the micron scale, such as ruptured cells walls, as well as changes at macro scale, such as conversion of dried flakes into pellets without releasing oil by low pressure pressing.

"Delipidated meal" and "delipidated microbial biomass" refer to microbial biomass after oil (including lipid) has been extracted from it, either through the use of an expeller press or solvent extraction or both.

"Dry back" refers to the process of adding pressed cake (also referred to herein as spent biomass) back into the feed end of the press where it is mixed with unpressed biomass. Essentially, the pressed cake is acting as a bulking agent or press aid for the unpressed material. Residual oil in the pressed cake can be further recovered along with oil from the unpressed biomass using this process.

"Dry cell weight" refers the weight of microbial biomass once all or substantially all of the water (moisture) has been removed therefrom.

"Dry microbial biomass" refers to microbial biomass from which the free moisture or surface moisture has been removed, usually so that the microbial biomass contains less than 10%, and often less than 6%, of moisture by weight. In one embodiment, dried microbial biomass is derived from microalgae. In one embodiment, the dried microbial biomass is derived from microalgae that contains at least 20% lipids by dry cell weight after drying.

"Expander" refers to a low-shear extruder that heats, homogenizes, and/or shapes oilseeds and other oil-bearing material into porous collets or pellets with a high bulk density. In one embodiment of an expander-mediated process, steam is injected into oilseed flakes/cakes or oil-bearing material under pressure, and this mixture is extruded through plates to the atmosphere. The collets expand when released to the atmosphere, hence the name expander. Historically, the expander has been used to prepare plant seed/oil seed derived collets for solvent extraction because of the higher bulk density of the collets after treatment with the expander, which allows for more surface area and increased efficiency in solvent extraction.

"Expeller press" means a screw press or continuous expeller that is used for mechanical extraction of oilseeds, such as but not limited to soybeans and rapeseed/canola. Oil-bearing raw material (such as oilseeds) is fed into the machine at one end and the material is subjected to friction and high pressure from the screw drive that moves the material along a shaft. Oil is released and seeps through small openings along the shaft and the solids (with reduced oil content) are expelled at the end of the shaft as a pressed cake. Examples of expeller/screw presses include those that are marketed by Anderson International Corp. (Cleveland, Ohio), Alloco (Santa Fe, Argentina), De Smet Rosedowns (Humberside, UK), The Dupps Co. (Germantown, Ohio), Grupo Tecnal (Sao Paulo, Brazil), Insta Pro (Des Moines, Iowa), Harburg Freudenberger (previously Krupp Extraktionstechnik) (Hamburg, Germany), French Oil Mill Machinery Company (Piqua, Ohio), Maschinenfabrik Reinartz (Neuss, Germany), Shann Consulting (New South Wales, Australia) and SKET (Magdeburg, Germany).

"Fiber" means the complex carbohydrates from plants and other fiber containing sources such as microorganisms that cannot be digested by humans. The complex carbohydrates found in fiber can include cellulose, hemicellulose and lignin, dextrins, pectins, beta-glucans and oligosaccharides.

"Fixed carbon source" refers to molecule(s) containing carbon, typically organic molecules, that are present at ambient temperature and pressure in solid or liquid form during a fermentation.

"Hydrated microbial biomass" means microbial biomass containing at least 10% moisture content that is in a liquid. In some embodiments, hydrated microbial biomass is contained in a fermentation broth that has not been subjected to separation or water removal processes.

"Hydrocarbon" refers to: (a) a molecule containing only hydrogen and carbon atoms, wherein the carbon atoms are covalently linked to form a linear, branched, cyclic or partially cyclic backbone to which the hydrogen atoms are attached; or (b) a molecule that primarily contains hydrogen and carbon atoms that can be converted to contain only hydrogen and carbon atoms by one to four chemical reactions. Non-limiting examples of the latter include hydrocarbons containing an oxygen atom between one carbon and one hydrogen atom to form an alcohol molecule, as well as aldehydes containing an oxygen atom. Methods for the reduction of alcohols to hydrocarbons containing only carbon and hydrogen atoms are well known. Another example of a hydrocarbon is an ester, in which an organic group replaces a hydrogen atom (or more than one) in an oxygen acid. The molecular structure of hydrocarbon compounds varies from the simplest, in the form of methane ($CH_4$), which is a constituent of natural gas, to the very large and complex, such as as the asphaltenes found in crude oil, petroleum, and bitumens. Hydrocarbons may be in gaseous, liquid, or solid form, or any combination of these forms, and may have one or more double or triple bonds between adjacent carbon atoms in the backbone. Accordingly, the term includes linear, branched, cyclic or partially cyclic alkanes, alkenes, lipids, and paraffin. Examples include propane, butane, pentane, hexane, octane, squalene and carotenoids.

"Hydrogen:carbon ratio" refers to the ratio of hydrogen atoms to carbon atoms in a molecule on an atom-to-atom basis. The ratio may also be used to refer to the number of carbon and hydrogen atoms in a hydrocarbon molecule. For example, the hydrocarbon with the highest ratio is methane, $CH_4$ (4:1).

"Hydrophobic fraction" refers to a portion, or fraction, of a material that is more soluble in a hydrophobic phase in comparison to an aqueous phase. A hydrophobic fraction is substantially insoluble in water and usually non-polar.

The phrase "increased lipid yield" refers to an increase in the productivity of a microbial culture by, for example, increasing dry weight of cells per liter of culture, increasing the percentage of lipid in cells and/or the percentage of cells that constitute lipid, and/or increasing the overall amount of lipid per culture volume per unit time.

The phrase "limiting concentration of a nutrient" refers to a concentration of nutrient in a culture that limits the propagation of a cultured organism. A "non-limiting concentration of a nutrient" is a concentration that supports maximal propagation during a given culture period. Thus, the number of cells produced during a given culture period is lower in the presence of a limiting concentration of a nutrient than when the nutrient is non-limiting. A nutrient is said to be "in excess" in a culture, when the nutrient is present at a concentration greater than that which supports maximal propagation.

"Lipid" refers to a lipophilic molecule from a biological organism. Biological functions of a lipid include, but are not limited to, storing energy, serving as a structural component of a cell membrane, and acting as a signaling molecule. Lipid molecules are soluble in nonpolar solvents (such as ether and chloroform) and are relatively or completely insoluble in water. Lipid molecules have these properties, because they consist largely of relatively long hydrocarbon chains which are hydrophobic in nature. Examples of lipids include fatty acids (saturated and unsaturated); glycerides or glycerolipids (such as monoglycerides, diglycerides, triglycerides, and neutral fats, and phosphoglycerides or glycerophospholipids); nonglycerides (sphingolipids, sterol lipids, including cholesterol and steroid hormones, prenol lipids, including terpenoids, waxes, and polyketides); and complex lipid derivatives (sugar-linked lipids, or glycolipids, and protein-linked lipids). Other examples of lipid include free fatty acids; esters of fatty acids; sterols; pigments (e.g., carotenoids and oxycarotenoids), phytosterols, ergothionine, lipoic acid, antioxidants including beta-carotene and tocopherol. Also included in the class of lipids are polyunsaturated fatty acids such as arachidonic acid, stearidonic acid, cholesterol, desmesterol, astaxanthin, canthaxanthin, and n-6 and n-3 highly unsaturated fatty acids such as eicosapentaenoic acid (EPA), docosapentaenoic acid, and docosahexaenoic acid (DHA). Microbial oil, as used herein, refers to lipid.

The phrase "lipid:organic solvent composition" refers to a mixture of lipid and organic solvent.

"Lysed" refers to having broken or disrupted the cellular or plasma membrane and optionally the cell wall of a biological organism or cell, and releasing at least some intracellular content into the extracellular environment. "Lysis" refers to the breakage of the cellular or plasma membrane and optionally the cell wall of a biological organism sufficient to release at least some intracellular content into the extracellular environment, often by mechanical, viral, osmotic, or temperature variation mechanisms that compromise its integrity. "Lysing" refers to disrupting the cellular or plasma membrane and optionally the cell wall of a biological organism or cell sufficient to release at least some intracellular content into the extracellular environment.

"Microalgae" refers to a microbial organism that contains a chloroplast, and optionally that is capable of performing photosynthesis. Microalgae include obligate photoautotrophs, which cannot metabolize a fixed carbon source as energy, as well as heterotrophs, which can live solely off of a fixed carbon source. Microalgae can refer to unicellular organisms that separate from sister cells shortly after cell division, such as *Chlamydomonas*, and to microbes such as, for example, *Volvox*, which is a simple multicellular photosynthetic microbe of two distinct cell types. "Microalgae" can also refer to cells such as *Chlorella* and *Dunaliella*. "Microalgae" also includes other microbial photosynthetic organisms that exhibit cell-cell adhesion, such as *Agmenellum, Anabaena*, and *Pyrobotrys*. "Microalgae" also includes obligate heterotrophic microorganisms that have lost the ability to perform photosynthesis, such as certain dinoflagellate species and species of the genus *Prototheca*.

"Microbial biomass" refers to biomass derived from a microbe.

"Microorganism" and "microbe" are used interchangeably herein and refer to microscopic unicellular organisms.

"Oil" refers to a hydrophobic, lipophilic, nonpolar carbon-containing substance including but not limited to geologically-derived crude oil, distillate fractions of geologically-derived crude oil, hydrocarbons, vegetable oil, algal oil, and microbial lipids.

"Oleaginous yeast" refers to a yeast that can accumulate more than 20% of its dry cell weight as lipid. Oleaginous yeast include organisms such as *Yarrowia lipolytica* and other species of the Dikarya subkingdom of fungi such as *Rhodosporidium toruloides* (*Eukaryota*; Fungi/Metazoa group; Fungi; *Dikarya*; *Basidiomycota*; *Pucciniomycotina*; *Microbotryomycetes*; *Sporidiobolales*; *Rhodosporidium*); *Rhodotorula glutinis* (*Eukaryota*; Fungi/Metazoa group; Fungi; *Dikarya*; *Basidiomycota*; *Pucciniomycotina*; *Microbotryomycetes*; *Sporidiobolales*; mitosporic *Sporidiobolales*; *Rhodotorula*); *Lipomyces tetrasporus* (*Eukaryota*; Fungi/Metazoa group; Fungi; *Dikarya*; *Ascomycota*; *Saccharomyceta*; *Saccharomycotina*; *Saccharomycetes*; *Saccharomycetales*; *Lipomycetaceae*; *Lipomyces*); *Cryptococcus curvatus* (*Eukaryota*; Fungi/Metazoa group; Fungi; *Dikarya*; *Basidiomycota*; *Agaricomycotina*; *Tremellomycetes*; *Tremellales*; mitosporic *Tremellales*; *Cryptococcus*); *Trichosporon domesticum* (*Eukaryota*; Fungi/Metazoa group; Fungi; *Dikarya*; *Basidiomycota*; *Agaricomycotina*; *Tremellomycetes*; *Tremellales*; mitosporic *Tremellales*; *Trichosporon*); *Yarrowia lipolytica* (*Eukaryota*; Fungi/Metazoa group; Fungi; *Dikarya*; *Ascomycota*; *Saccharomyceta*; *Saccharomycotina*; *Saccharomycetes*; *Saccharomycetales*; *Dipodascaceae*; *Yarrowia*); *Sporobolomyces alborubescens* (*Eukaryota*; Fungi/Metazoa group; Fungi; *Dikarya*; *Basidiomycota*; *Pucciniomycotina*; *Microbotryomycetes*; *Sporidiobolales*; mitosporic *Sporidiobolales*;

*Sporobolomyces*); *Geotrichum vulgare* (*Eukaryota*; Fungi/Metazoa group; Fungi; *Dikarya; Ascomycota; Saccharomyceta; Saccharomycotina; Saccharomycetes; Saccharomycetales; Dipodascaceae; mitosporic Dipodascaceae; Geotrichum*): and *Torulaspora delbrueckii* (*Eukaryota*; Fungi/Metazoa group; Fungi; *Dikarya; Ascomycota; Saccharomyceta; Saccharomycotina; Saccharomycetes; Saccharomycetales; Saccharomycetaceae; Torulaspora*). Within *Dikarya*, the invention includes use of organisms from all sub-domains of *Dikarya* (*Ascomycota* and *Basidiomycota*) and taxonomic sub-classifications within *Ascomycota* and *Basidiomycota*.

"Organic solvent" refers to a carbon-containing material that dissolves a solid, liquid, or gaseous solute, resulting in a solution.

"Photobioreactor" refers to a container, at least part of which is at least partially transparent or partially open, thereby allowing light to pass through, in which, e.g., one or more microalgae cells are cultured. Photobioreactors may be closed, as in the instance of a polyethylene bag or Erlenmeyer flask, or may be open to the environment, as in the instance of an outdoor pond.

"Polysaccharide" (also called "glycan") refers to carbohydrate made up of monosaccharides joined together by glycosidic linkages. Cellulose is an example of a polysaccharide that makes up certain plant cell walls. Cellulose can be depolymerized by enzymes to yield monosaccharides such as xylose and glucose, as well as larger disaccharides and oligosaccharides. Other examples of polysaccharides include fiber, soluble and insoluble dietary fiber, hemicellulose, and the carbohydrate from microbial cell walls, such as that contained in spent biomass.

"Polysaccharide-degrading enzyme" refers to any enzyme capable of catalyzing the hydrolysis, or depolymerization, of any polysaccharide. For example, cellulose catalyzes the hydrolysis of cellulose.

"Port", in the context of a bioreactor, refers to an opening in the bioreactor that allows influx or efflux of materials such as gases, liquids and cells. Ports are usually connected to tubing leading from the photobioreactor.

"Pressing" refers to the application of sufficient pressure to force intracellular oil from microbial biomass, which may also be referred to herein as a "pressing step." Pressing may be sufficient to lyse all or substantially all of the cells in the microbial biomass.

"Spent biomass", "spent microbial biomass" and "pressed cake" all refer to microbial biomass that has been made into conditioned feedstock and then has been subjected to high pressure so that the resulting material has less lipid content on a w/w basis than the conditioned feedstock from which it is derived. High pressure can be achieved by the use of compression pressure, such as that provided by machines such as an expeller press, a screw oil expeller, and a mechanical press, as well as by direct hydraulic pressure and other processes so that the oil is squeezed out of the conditioned feed stock. In one embodiment, the spent microbial biomass is prepared by passing oil-bearing microbial biomass through an oilseed press. In one embodiment, the spent microbial biomass is microalgae biomass that has less than 30% oil by dry cell weight "Suitable for animal feed" means a substance or material can be consumed without deleterious effect by an animal, typically a a non-human mammal of agricultural or veterinary interest, including but not limited to horses, cattle, pigs, chickens, dogs and cats; in preferred embodiments, a material suitable for animal feed provides nutrition to the animal.

II. Methods for Extracting Oil from Microorganisms

In one aspect, the present invention provides methods for extracting, recovering, isolating, or otherwise obtaining oil (lipids) from microorganisms. The methods of the present invention are applicable to extracting a variety of lipids from a variety of microorganisms. In the methods of the present invention, the lipid-producing microorganism (e.g., a microalgae) is first cultivated under conditions that allows for lipid production to generate oil-containing microbial biomass. The oil-containing biomass is then, depending on the method employed, optionally admixed with a bulking agent, and dried and conditioned to prepare a dry, conditioned feedstock that is then pressed to extract the oil. For the convenience of the reader, this discussion is divided into subsections.

Subsection A describes the microbial biomass suitable for oil extraction in accordance with the methods of the invention. Subsection B describes methods for removing water from the biomass, including dewatering and drying. Subsection C describes methods for conditioning the biomass. Subsection D describes bulking agents (press aids) and their use with dry microbial biomass, hydrated microbial biomass, and conditioned feedstock. Subsection E describes various methods for subjecting conditioned feedstock to pressure to extract oil (the pressing step). Subsection F describes the oil produced by the pressing step and methods for its use and further purification. Subsection G describes the spent biomass of reduced oil content produced by the pressing step and methods for its use.

A. Suitable Biomass

While biomass from a wide variety of microbes, including microalgae, oleaginous bacteria, oleaginous yeast and fungi (see Section III, below), can be employed in the methods of the invention, microbial biomass suitable for use in the methods described herein typically comprises at least 20% oil by dry cell weight. In some embodiments, the biomass comprises oil in a range of from at least 25% to at least 60% or more oil by dry cell weight. In some embodiments, the biomass contains from 15-90% oil, from 25-85% oil, from 40-80% oil, or from 50-75% oil by dry cell weight. In various embodiments of the invention, the microbial biomass (dry or hydrated) or conditioned feedstock contains at least 25% oil by weight. In various embodiments, the dry microbial biomass or conditioned feedstock contains at least 25% lipids by weight or by dry cell weight. In various embodiments, the dry microbial biomass or conditioned feedstock contains at least 40%, at least 50%, or at least 75% lipids by weight or by dry cell weight. In various embodiments, the dry microbial biomass or conditioned feedstock contains at least 15% carbohydrate by weight or by dry cell weight.

The oil of the biomass described herein, or extracted from the biomass for use in the methods and compositions of the present invention can comprise glycerolipids with one or more distinct fatty acid ester side chains. Glycerolipids are comprised of a glycerol molecule esterified to one, two, or three fatty acid molecules, which can be of varying lengths and have varying degrees of saturation. The length and saturation characteristics of the fatty acid molecules (and thus the oil) can be manipulated to modify the properties or proportions of the fatty acid molecules in the oil of the present invention via culture conditions or via lipid pathway engineering, as described herein (see also PCT Patent Application Nos. US09/066,141 and US09/066,142, incorporated herein by reference). Thus, specific blends of algal oil can be prepared either within a single species of microalgae (or other microbe), or by mixing together the biomass or algal oil from two or more species of microalgae (or other microbe(s)).

The oil composition, i.e., the properties and proportions of the fatty acid constituents of the glycerolipids, can also be manipulated by combining biomass or oil from at least two distinct genera or species of microbes, i.e., microalgae. In some embodiments, at least two of the distinct genera or species of microbes, i.e., microalgae, have different glycerolipid profiles. The distinct species (or genera) of microbes can be cultured together or separately as described herein (for microalgae, typically under heterotrophic conditions), to generate the respective oils. Different species of microbes can contain different percentages of distinct fatty acid constituents in the cell's glycerolipids.

In various embodiments, the microbial oil is primarily comprised of monounsaturated oil. In some cases, the oil is at least 50% monounsaturated oil by weight or volume. In various embodiments, the oil is at least 50%, at least 60%, at least 70%, or at least 80% or more monounsaturated oil by weight or by volume. In some embodiments, the oil comprises at least 10%, at least 20%, at least 30%, at least 40%, or at least 50% or more esterified oleic acid or esterified alpha-linolenic acid by weight or by volume. In various embodiments, the oil comprises less than 10%, less than 5%, or less than 1% by weight or by volume, or is substantially free of, esterified docosahexaenoic acid (DHA).

In various embodiments of this and other aspects of the invention, the biomass is prepared by fermentation of a microbe that contains 18:1 fatty acid. In various embodiments, the microbe has a fatty acid profile of less than 1% C14:0; about 10-11% C16:0; about 3-4% C18:0; about 70-71% C18:1; about 14-15% C18:2; about 1-2% C18:3; and less than 1% C20:0. In various embodiments, the microbe has a fatty acid profile of about 1-2% C14:0; about 20% C16:0; about 4% C18:0; about 64% C18:1; and about 7-8% C18:2. In various embodiments, the microbe has at most 0.5% DHA. In these and other embodiments, the microbe is, in some instances, a microalgae.

Thus, a wide variety of microbial biomass is suitable for use in the methods of the invention. In accordance with these methods, the oil-containing biomass is typically dewatered, dried, conditioned, and then pressed to extract the oil.

B. Dewatering and Drying the Microbial Biomass

The various embodiments of the methods of the invention involve one or more steps of removing water (or other liquids) from the microbial biomass. These steps of removing water can include the distinct steps referred to herein as dewatering and drying.

Dewatering, as used herein, refers to the separation of the oil-containing microbe from the fermentation broth (liquids) in which it was cultured. Dewatering, if performed, should be performed by a method that does not result in, or results only in minimal loss in, oil content of the biomass. Accordingly, care is generally taken to avoid cell lysis during any dewatering step. Dewatering is a solid-liquid separation and involves the removal of liquids from solid material. Common processes for dewatering include centrifugation, filtration, and/or the use of mechanical pressure.

Centrifugation is a process that involves the use of centrifugal force for the separation of mixtures. The more dense components of the mixture migrate away from the axis of the centrifuge, while the less dense components of the mixture migrate towards the axis. By increasing the effective gravitational force (i.e., by increasing the centrifugation speed), more dense material, usually solids, separate from the less dense material, usually liquids, according to density.

Microbial biomass useful in the methods of the present invention can be dewatered from the fermentation broth through the use of centrifugation, to form a concentrated paste. After centrifugation, there is still a substantial amount of surface or free moisture in the microbial biomass (e.g., upwards of 70%) and thus, centrifugation is not considered to be, for purposes of the present invention, a drying step. Optionally, after centrifugation, the biomass can be washed with a washing solution (e.g., deionized water) to remove remaining fermentation broth and debris.

In some embodiments, dewatering involves the use of filtration. One example of filtration that is suitable for the present invention is tangential flow filtration (TFF), also known as cross-flow filtration. Tangential flow filtration is a separation technique that uses membrane systems and flow force to purify solids from liquids. For a preferred filtration method see Geresh, Carb. Polym. 50; 183-189 (2002), which discusses use of a MaxCell A/G technologies 0.45 uM hollow fiber filter. Also see for example Millipore Pellicon® devices, used with 100 kD, 300 kD, 1000 kD (catalog number P2C01MC01), 0.1 uM (catalog number P2VVPPV01), 0.22 uM (catalog number P2GVPPV01), and 0.45 uM membranes (catalog number P2HVMPV01). The retentate should not pass through the filter at a significant level. The retentate also should not adhere significantly to the filter material. TFF can also be performed using hollow fiber filtration systems.

Non-limiting examples of tangential flow filtration include those involving the use of a filter with a pore size of at least about 0.1 micrometer, at least about 0.12 micrometer, at least about 0.14 micrometer, at least about 0.16 micrometer, at least about 0.18 micrometer, at least about 0.2 micrometer, at least about 0.22 micrometer, at least about 0.45 micrometer, or at least about 0.65 micrometers. Preferred pore sizes of TFF allow solutes and debris in the fermentation broth to flow through, but not microbial cells.

In other embodiments, dewatering involves the use of mechanical pressure directly applied to the biomass to separate the liquid fermentation broth from the microbial biomass. The amount of mechanical pressure applied should not cause a significant percentage of the microbial cells to rupture, if that would result in loss of oil, but should instead simply be enough to dewater the biomass to the level desired for subsequent processing.

One non-limiting example of using mechanical pressure to dewater microbial biomass employs the belt filter press. A belt filter press is a dewatering device that applies mechanical pressure to a slurry (e.g., microbial biomass that is directly from the fermentor or bioreactor) that is passed between the two tensioned belts through a serpentine of decreasing diameter rolls. The belt filter press can actually be divided into three zones: gravity zone, where free draining water/liquid is drained by gravity through a porous belt; a wedge zone, where the solids are prepared for pressure application; and a pressure zone, where adjustable pressure is applied to the gravity drained solids.

One or more of the above dewatering techniques can be used alone or in combination to dewater the microbial biomass for use in the present invention. The present invention results in part from the discovery that the moisture content of the microbial biomass (conditioned feedstock) dramatically affects the yield of oil obtained in the pressing step, and that the optimal moisture level, below 6% and preferably below 2%, is quite different from the optimal moisture levels for pressing oil from many oil-bearing seeds. While the optimal moisture level can vary depending on the type of oil-bearing seed, and can also vary depending on the type of microbial biomass, the optimal moisture level for pressing microbial biomass is less than that for oil seeds. For example, the optimal moisture content for pressing sesame and linseed is about 4% (Willems et al., J. Food Engineering 89:1, pp. 8-16, 2008). The optimal moisture content for pressing crambe seeds is between 9.2 and 3.6% (Singh et al., JAOCS 79:2, pp. 165-170, 2006). The optimal moisture content for pressing canola seeds is about 5% (Vadke et al., JAOCS 65:7, pp. 1169-1176, 1988). The optimal moisture content for pressing coconut is about 11% (Mpagalile et al., Int. J. Food Sciences and Nutrition, 56:2, pp. 125-132, 2005). Other optimal moisture contents are 7% for rapeseed, 6% for camelina, 8.5% for sunflower, 11% for safflower and 12% for soybean (Alam, M. S. November 2007. Basics of Fats and Oils Chemistry: Factors Affecting Crude Oil Quality. Presented to the Vegetable Oils Extraction Short Course, Texas A&M Food Protein R&D Center, College Station, Tex.).

In contrast, the optimal moisture content for pressing microbial biomass is less than 6% by weight, and more preferably less than 3%. For example, optimal moisture content can be 0.5-2% by weight. In various embodiments, particularly those relating to the extraction of oil from microalgal biomass, the optimal moisture content is in the range of 0.5% to 2% of the total weight of the microbial biomass. In one embodiment, the moisture content is in the range of 0.7% to 1.2% of the total weight of the microbial biomass. In one embodiment, the moisture content is in the range of 1.0% to 2.0% of the total weight of the microbial biomass. The optimal moisture level can depend on several factors, including but not limited to the percent lipids (oil) as measured by dry cell weight (DCW) or the amount of fiber and hemicellulose in the biomass. In some embodiments of the methods of the invention, such as, for example, those in which a bulking agent is employed (see subsection D), dewatering alone provides a suitable moisture content of the microbial biomass that is then conditioned prior to the pressing step. In other methods and embodiments of the invention, dewatered biomass is subjected to a drying step and then conditioned prior to the pressing step (in which oil is extracted from the biomass).

Drying, as referred to herein, refers to the removal of some or all of the free moisture or surface moisture of the microbial biomass. Like dewatering, the drying process should not result in significant loss of oil from the microbial biomass. Thus, the drying step should typically not cause lysis of a significant number of the microbial cells, because in most cases, the lipids are located in intracellular compartments of the microbial biomass. Several methods of drying microbial biomass known in the art for other purposes are suitable for use in the methods of the present invention. Microbial biomass after the free moisture or surface moisture has been removed is referred to as dried microbial biomass. If no further moisture removal occurs in the conditioning or moisture reduction occurs via the addition of a dry bulking agent prior to the pressing step, then the dried microbial biomass should contain less than 6% moisture by weight.

In various embodiments, the dry microbial biomass has a moisture content in the range of 0.1% to 5% by weight. In various embodiments, the dry microbial biomass has a moisture content of less than 4% by weight. In various embodiments, the dry microbial biomass has a moisture content in the range of 0.5% to 3.5% by weight. In various embodiments, the dry microbial biomass has a moisture content in the range of 0.1% to 3% by weight. Non-limiting examples of drying methods suitable for use in preparing dry microbial biomass in accordance with the methods of the invention include lyophilization and the use of dryers such as a drum dryer, spray dryer, and a tray dryer, each of which is described below.

Lyophilization, also known as freeze drying or cryodessication, is a dehydration process that is typically used to preserve a perishable material. The lyophilization process involves the freezing of the material and then reducing the surrounding pressure and adding enough heat to allow the frozen water in the material to sublime from the solid phase to gas. In the case of lyophilizing microbial biomass, such as microalgae derived biomass, the cell wall of the microalgae acts as a cryoprotectant that prevents degradation of the intracellular lipids during the freeze dry process.

Drum dryers are one of the most economical methods for drying large amounts of microbial biomass. Drum dryers, or roller dryers, consist of two large steel cylinders that turn toward each other and are heated from the inside by steam. In some embodiments, the microbial biomass is applied to the outside of the large cylinders in thin sheets. Through the heat from the steam, the microbial biomass is then dried, typically in less than one revolution of the large cylinders, and the resulting dry microbial biomass is scraped off of the cylinders by a steel blade. The resulting dry microbial biomass has a flaky consistency. In various embodiments, the microbial biomass is first dewatered and then dried using a drum dryer. More detailed description of a drum dryer can be found in U.S. Pat. No. 5,729,910, which discloses a rotary drying drum.

Spray drying is a commonly used method of drying a liquid feed using a hot gas. A spray dryer takes a liquid stream (e.g., containing the microbial biomass) and separates the solute as a solid and the liquid into a vapor. The liquid input stream is sprayed through a nozzle into a hot vapor stream and vaporized. Solids form as moisture quickly leaves the droplets. The nozzle of the spray dryer is adjustable, and typically is adjusted to make the droplets as small as possible to maximize heat transfer and the rate of water vaporization. The resulting dry solids may have a fine, powdery consistency, depending on the size of the nozzle used. In other embodiments, spray dryers can use a lyophilization process instead of steam heating to dry the material.

Tray dryers are typically used for laboratory work and small pilot scale drying operations. Tray dryers work on the basis of convection heating and evaporation. Fermentation broth containing the microbial biomass can be dried effectively from a wide range of cell concentrations using heat and an air vent to remove evaporated water.

Flash dryers are typically used for drying solids that have been de-watered or inherently have a low moisture content. Also known as "pneumatic dryers", these dryers typically disperse wet material into a stream of heated air (or gas) which conveys it through a drying duct. The heat from the airstream (or gas stream) dries the material as it is conveyed through the drying duct. The dried product is then separated using cyclones and/or bag filters. Elevated drying temperatures can be used with many products, because the flashing off of surface moisture instantly cools the drying gas/air without appreciably increasing the product temperature. More detailed descriptions of flash dryers and pneumatic dryers can be found in U.S. Pat. No. 4,214,375, which describes a flash dryer, and U.S. Pat. Nos. 3,789,513 and 4,101,264, which describe pneumatic dryers.

Regardless of the method selected for a drying step, the objective of the drying step is to reduce moisture content in the microbial biomass. If moisture is not removed from the dry microbial biomass during the conditioning step or reduced via the addition of a dry bulking agent, then the moisture content should be less than 6% by weight. Typically, the dry microbial biomass (conditioned feedstock) suitable for pressing has a moisture content of about 0.1% to 6% by weight, including in various embodiments, a moisture content of 0.5-2.5%. Moisture may be added back to the biomass, if necessary, after drying to adjust moisture content to the optimal level. If the dry microbial biomass will be admixed with a dry bulking agent (see subsection D) or conditioned in a manner that will reduce moisture content further (see subsection C), then higher (above 6% by weight) moisture content may be acceptable, as bulking agents and/or conditioning can, in some embodiments, reduce the moisture content to the desired optimal level.

Dewatered and/or dried microbial biomass is conditioned prior to the pressing step, as described in the following subsection.

C. Conditioning the Microbial Biomass

Conditioning of the microbial biomass helps to achieve desired levels of oil extraction. Conditioning refers to heating the biomass to a temperature in the range of 70° C. to 150° C. (160° F. to 300° F.) and changing the physical or physiochemical nature of the microbial biomass to improve oil yields in the subsequent oil extraction (pressing) step. Conditioning microbial biomass results in the production of "conditioned feedstock." In addition to heating or "cooking" the biomass, non-limiting examples of conditioning the biomass include adjusting the moisture content within the dry microbial biomass, subjecting the dry microbial biomass to a low pressure "pre-press", subjecting the dry microbial biomass to cycles of heating and cooling, subjecting the dry microbial biomass to an expander, and/or adjusting the particle size of the dry microbial biomass.

The conditioning step can include techniques (e.g., heating or application or pressure) that overlap in part with techniques used in the drying or pressing steps. However, the primary goals of these steps are different: the primary goal of the drying step is the removal of some or all of the free moisture or surface moisture from the microbial biomass. The primary goal of the conditioning step is to heat the biomass, which can optionally result in the removal of intracellular water from, i.e., adjusting the intracellular moisture content of, the microbial biomass and/or altering the physical or physiochemical nature of the microbial biomass without substantial release of lipids to facilitate release of oil during the pressing step. The primary the goal of the pressing step is to release oil from the microbial biomass or conditioned feedstock, i.e., the extraction of the oil.

In various embodiments, conditioning involves altering, or adjusting, the moisture content of the microbial biomass by the application of heat, i.e., heat conditioning. Heat conditioning, as used herein, refers to heat treatment (either direct or indirect) of microbial biomass. The moisture content of the microbial biomass can be adjusted by conditioning using heat (either direct or indirect), which is typically done, if at all, after a drying step. Even though the biomass may be dried by any of the above described methods, the moisture content of the microbial biomass after drying can range, for example, from 3% to 15% moisture by weight, or 5-10% moisture by weight. Such a moisture range may not be optimal for maximal oil recovery in the pressing step. Therefore, there may be benefit in heat-conditioning dewatered and/or dry microbial biomass to adjust the moisture level to a level (below 6%) optimal for maximal oil recovery.

Heat conditioners used in oil seed processing are suitable for use in conditioning microbial biomass in accordance with the methods of the present invention, such as vertical stacked conditioners. These consist of a series of three to seven or moreclosed, superimposed cylindrical steel pans. Each pan is independently jacketed for steam heating on both sides and bottom and is equipped with a sweep-type stirrer mounted close to the bottom, and operated by a common shaft extending through the entire series of pans. The temperature of the heat conditioner is also adjustable through regulation of the steam heating. There is an automatically operated gate in the bottom of each pan, except the last, for discharging the contents to the pan below. The top pan is provided with spray jets for the addition of moisture if desired. While moisture is sprayed onto seeds in many agricultural oil extraction processes during conditioning, this common process is not desirable for conditioning microbial biomass. Cookers also typically have an exhaust pipe and fan for removal of moisture. Thus, it is possible to control the moisture of the microbial biomass, not only with respect to final moisture content but also at each stage of the operation. In this respect, a conditioning step of heating microbial biomass for an extended period of time (10-60 minutes for example) provides the effect of not only reducing moisture and increasing the temperature of the biomass, but also altering the biophysical nature of the microbial biomass beyond any heating effects that might occur in a subsequent pressing step, i.e., simply from friction of the material as it is forced through, e.g., a press.

Additionally, a steam jacketed horizontal cooker is another type of heat conditioner that is suitable for use in accordance with the methods of the invention herein. In this design, the biomass is mixed, heated and conveyed in a horizontal plane in deeper beds as compared to conventional vertical stacked cookers. In the horizontal cooker, the action of a specially designed auger mixes conveys the biomass, while the biomass is simultaneously heated with indirect steam from the steam jacket. Water and vapor and air are vented out from the cooker through an upper duct, which may or may not have an exhaust fan depending on the cooker's capacity. For cooking biomass at a high flow rate, several horizontal cookers can be stacked together. In this configuration, the biomass is fed into the top level cooker and heated and conveyed through by the auger and then thrown by gravity into a lower level cooker where the process is repeated. Several levels of horizontal cookers can be stacked together depending on the needed flow rate and the time/temperature of conditioning required. Moisture and temperature can be monitored and adjusted independently for each horizontal cooker level.

For the heat conditioning of microbial biomass, especially microalgal biomass, the optimal time and temperature that the biomass spends in a vertical stacked conditioner can vary depending on the moisture level of the biomass after drying. Heat conditioning (sometimes referred to as "cooking") should not result in burning or scorching significant amounts of the microbial biomass during cooking. Depending on the moisture content of the microbial biomass prior to heat conditioning, i.e., for very low levels of moisture, it may be beneficial or even necessary to moisten the biomass before heat conditioning to avoid burning or scorching. Depending on the type of microbial biomass that is going to be fed through an expeller press, the optimal temperature for heat conditioning will vary. For some types of microalgal, the optimal temperature for heat conditioning is between 200-270° F. In some embodiments, the microalgal biomass is heat conditioned at 210-230° F. In other embodiments, the microalgal biomass is heat conditioned at 220-270° F. In still other embodiments, the microalgal biomass is heat conditioned at 240-260° F. These temperature ranges are, like moisture content, significantly different from what is typically used in an oilseed conditioning process, as oilseed processes typically use lower conditioning temperatures.

Heating the oil-bearing microbial biomass before pressing can aid in the liberation of oil from and/or accessing the oil-laden compartments of the cells. Oil-bearing microbial biomass contains the oil in compartments made of cellular components such as proteins and phospholipids. Repetitive cycles of heating and cooling can denature the proteins and alter the chemical structure of the cellular components of these oil compartments and thereby provide better access to the oil during the subsequent extraction process. Thus, in various embodiments of the invention, the microbial biomass is conditioned to prepare conditioned feedstock that is used in the pressing step, and the conditioning step involves heating and, optionally, one or more cycles of heating and cooling.

If no further heat conditioning or other conditioning that alters moisture content is to be performed, and if no bulking agent that will alter moisture content is to be added, then the conditioned feedstock resulting from heat conditioning should contain less than 6% moisture by weight. In various embodiments, the conditioned feedstock has a moisture content in the range of 0.1% to 5% by weight. In various embodiments, the conditioned feedstock has a moisture content of less than 4% by weight. In various embodiments, the conditioned feedstock has a moisture content in the range of 0.5% to 3.5% by weight. In various embodiments, the conditioned feedstock has a moisture content in the range of 0.1% to 3% by weight.

In addition to heating the biomass, conditioning can, in some embodiments, involve the application of pressure to the microbial biomass. To distinguish this type of conditioning from the pressure applied during oil extraction (the pressing step), this type of conditioning is referred to as a "pre-press." The pre-press is conducted at low pressure, a pressure lower than that used for oil extraction in the pressing step. Ordinary high-pressure expeller (screw) presses may be operated at low pressure for this pre-press conditioning step. Pre-pressing the biomass at low pressure may aid in breaking open the cells to allow for better flow of oil during the subsequent high pressure pressing; however, pre-pressing does not cause a significant amount (e.g. more than 5%) of the oil to separate from the microbial biomass. Also, the friction and heat generated during the pre-press may also help break open the oil compartments in the cells. Pre-pressing the biomass at low pressure also changes the texture and particle size of the biomass, because the biomass will extrude out of the press in a pellet-like form. In some embodiments, an extruder (see discussion below) is used to achieve the same or similar results as a low pressure pre-press conditioning step. In some embodiments, the pellets of conditioned biomass are further processed to achieve an optimal particle size for the subsequent full pressure pressing.

Thus, another parameter relevant to optimal extraction of oil from microbial biomass is the particle size. Typically, the optimum particle size for an oil expeller press (screw press) is approximately $1/16^{th}$ of an inch thick. Factors that may affect the range of particle size include, but are not limited to, the method used to dry the microbial biomass and/or the addition of a bulking agent or press aid to the biomass. If the biomass is tray dried, e.g., spread wet onto a tray and then dried in an oven, the resulting dried microbial biomass may need to be broken up into uniform pieces of the optimal particle size to make it optimal for pressing in an expeller press. The same is true if a bulking agent is added to the microbial biomass before the drying process. Thus, conditioning may involve a step that results in altering the particle size or average particle size of the microbial biomass. Machines such as hammer mills or flakers may be employed in accordance with the methods of the invention to adjust the thickness and particle size of the oil-bearing microbial biomass.

In similar fashion, improved oil extraction can result from altering other physical properties of the dried microbial biomass. In particular, the porosity and/or the density of the microbial biomass can affect oil extraction yields. In various embodiments of the methods of the invention, conditioning of the biomass to alter its porosity and/or density is performed. Commonly used prior to hexane or other solvent extraction of oil from oil seeds, expanders and extruders increase the porosity and the bulk density of the feedstock. In accordance with the methods of the present invention, expanders and extruders can be employed to condition the microbial biomass before oil extraction and may or may not cause a significant amount of oil to separate from the microbial biomass. Both expanders and extruders are low-shear machines that heat, homogenize, and shape oil-bearing material into collets or pellets. Expanders and extruders work similarly; both have a worm/collar setup inside a shaft such that, as it moves the material inside the shaft, mechanical pressure and shearing break open the cells. The biggest difference between expanders and extruders is that the expander uses water and/or steam to puff the material at the end of the shaft. The sudden high pressure (and change in pressure) causes the moisture in the material to vaporize, thus "puffing" or expanding the material using the internal moisture. Extruders change the shape of the material, forming collets or pellets. Extruders also lyse the cells and vaporizes water from the biomass (reduction of moisture) while increasing the temperature of the biomass (heating the biomass) through mechanical friction that the extruder exerts on the biomass. Thus, extruders and expanders can be used in accordance with the methods of the invention to condition the dry microbial biomass. The extruder/expanders can break open the cells, freeing the intracellular lipids, and can also change the porosity and the bulk density of the material. These changes in the physical properties of the feedstock may be advantageous in subsequent oil extraction.

The above-described conditioning methods can be used alone or in combination in accordance with the methods of the invention to achieve the optimal conditioned microbial biomass feedstock for subsequent oil extraction. Thus, the conditioning step involves the application of heat and optionally pressure to the biomass. In various embodiments, the conditioning step comprises heating the biomass at a temperature in the range of 70° C. to 150° C. (160° F. to 300° F.). In various embodiments, the heating is performed using a vertical stacked shaker. In various embodiments, the conditioning step further comprises treating the dry biomass with an expander or extruder to shape and/or homogenize the biomass.

D. Bulking Agents (Press Aids)

In various embodiments of the invention, a bulking agent or press aid is added to the microbial biomass, which may be either dry or hydrated (i.e., biomass that has not been dried or that contains significant, i.e., more than 6% by weight, moisture, including biomass in fermentation broth that has not been subjected to any process to remove or separate water) microbial biomass or conditioned feedstock, prior to the pressing step. In various embodiments, the bulking agent has an average particle size of less than 1.5 mm In some embodiments, the bulking agent or press aid has a particle size of between 50 microns and 1.5 mm. In other embodiments, the press aid has a particle size of between 150 microns and 350 microns. In some embodiments, the bulking agent is a filter aid. In various embodiments, the bulking agent is selected from the group consisting of cellulose, corn stover, dried rosemary, soybean hulls, spent biomass (biomass of reduced lipid content relative to the biomass from which it was prepared), including spent microbial biomass, sugar cane bagasse, and switchgrass. In various embodiments, the bulking agent is spent microbial biomass (see subsection G below) that contains between 40% and 90% polysaccharide by weight, such as cellulose, hemicellulose, soluble and insoluble fiber, and combinations of these different polysaccharides and/or less than 10% oil by weight. In various embodiments, the polysaccharide in the spent microbial biomass used as a bulking agent contains 20-30 mole percent galactose, 55-65 mole percent glucose, and/or 5-15 mole percent mannose.

Thus, the addition of a press aid or bulking agent may be advantageous in some embodiments of the invention. When there is high oil content and low fiber in the biomass, feeding the biomass through a press can result in an emulsion. This results in low oil yields, because the oil is trapped within the solids. One way in accordance with the methods of the invention to improve the yield in such instances is to add polysaccharide to the biomass in the form of a bulking agent, also known as a "press aid" or "pressing aid". Bulking agents are typically high fiber additives that work by adjusting the total fiber content of the microbial biomass to an optimal range. Microbial biomass such as microalgae and the like typically have very little crude fiber content. Typically, microbial biomass including microalgae biomass have a crude fiber content of less than 2%. The addition of high fiber additives (in the form of a press aid) may help adjust the total fiber content of the microbial biomass to an optimal range for oil extraction using an expeller press. Optimal fiber content for a typical oil seed may range from 10-20%. In accordance with the methods of the present invention, it may be helpful to adjust the fiber content of the microbial biomass for optimal oil extraction. The range for fiber content in the biomass may be the same or a similar range as the optimal fiber content for a typical oil seed, although the optimal fiber content for each microbial biomass may be lower or higher than the optimal fiber content of a typical oil seed. Suitable pressing aids include, but are not limited to, switchgrass, rice straw, sugar beet pulp, sugar cane bagasse, soybean hulls, dry rosemary, cellulose, corn stover, delipidated (either pressed or solvent extracted) cake from soybean, canola, cottonseed, sunflower, jatropha seeds, paper pulp, waste paper and the like. In some embodiments, the spent microbial biomass of reduced lipid content from a previous press is used as a bulking agent. In some applications, especially when the oil is going to be used in a food application or is going to be consumed, the pressing aid used in mixing with the microbial biomass (dry or hydrated) or conditioned feedstock will be selected to meet regulatory requirements (for use as a foodstuff). Thus, bulking agents, when incorporated into a biomass, change the physiochemical properties of the biomass so as to facilitate more uniform application of pressure to cells in the biomass.

In some cases, the bulking agent can be added to the microbial biomass after it has been dried, but not yet conditioned. In such cases, it may advantageous to mix the dry microbial biomass with the desired amount of the press aid and then condition the microbial biomass and the press aid together before feeding to a screw press. In other cases, the press aid can be added to a hydrated microbial biomass before the microbial biomass has been subjected to any separation or dewatering processes, drying, or conditioning. In such cases, the press aid can be added directly to the fermentation broth containing the microbial biomass before any dewatering or other step.

The invention provides various methods relating to the extraction of oil from microbial biomass that employ the bulking agents described above. In one method, hydrated microbial biomass suitable for oil extraction is prepared by adding a bulking agent to the biomass and drying the mixture obtained thereby to a moisture content less than 6% by weight, thereby forming a dried bulking agent/biomass mixture. In another method, oil is extracted from microbial biomass by co-drying hydrated microbial biomass containing at least 20% oil (including at least 40% oil) by weight and a bulking agent to form a dried bulking agent/biomass mixture; reducing the moisture content in the mixture to less than 4% by weight, i.e., by drying and/or conditioning; and pressing the reduced moisture content mixture to extract oil therefrom, thereby forming spent biomass of reduced lipid content. In another method, increased yields of oil are obtained from microbial biomass containing at least 20% lipid by weight by co-drying the microbial biomass with a bulking agent, because the co-dried mixture will, upon pressing, release more oil than can be obtained from the biomass under the same conditions in the absence of a bulking agent. In various embodiments of these and other methods of the invention, the hydrated microbial biomass is contained in fermentation broth that has not been subjected to processes to separate or remove water from the biomass.

In an embodiment, the bulking agent is spent microbial biomass, optionally that has been processed or milled (for homogeneous and ease of blending), that is combined with microbial biomass that has not been extracted. In such cases, the total polysaccharide content of the blended (spent biomass as a press aid and non-extracted microbial biomass) microbial biomass before it is fed into an expeller press contains between 10% and 40% of the total weight of the blended biomass.

E. Pressing Microbial Biomass

Thus, in accordance with the methods of the invention conditioned feedstock, optionally comprising a bulking agent, is subjected to pressure in a pressing step to extract oil, producing oil separated from the spent biomass. The pressing step involves subjecting pressure sufficient to extract oil from the conditioned feedstock. Thus, in some embodiments, the conditioned feedstock that is pressed in the pressing step comprises oil predominantly or completely encapsulated in cells of the biomass. In other embodiments, the biomass comprises predominantly lysed cells and the oil is thus primarily not encapsulated in cells.

In various embodiments of the different aspects of the invention, the pressing step will involve subjecting the conditioned feedstock to at least 10,000 psi of pressure. In various embodiments, the pressing step involves the application of pressure for a first period of time and then application of a higher pressure for a second period of time. This process may be repeated one or more times ("oscillating pressure"). In various embodiments, more than 5 cycles of oscillating pressure are applied. In various embodiments, one or more of the subsequent cycles may exert an average pressure that is higher than the average pressure exerted in one or more earlier cycles. For example and without limitation, the average pressure in the last cycle can be at least 2-fold higher than the average pressure in the first or any earlier cycle. In various embodiments, moisture content of conditioned feedstock is controlled during the pressing step. In various embodiments, the moisture is controlled in a range of from 0.1% to 3% by weight.

In various embodiments, the pressing step is conducted with an expeller press. In various embodiments, the pressing step is conducted in a continuous flow mode. In various embodiments, the oiling rate is at least 500 g/min to no more than 1000 g/min. In various continuous flow embodiments, the expeller press is a device comprising a continuously rotating worm shaft within a cage having a feeder at one end and a choke at the opposite end, having openings within the cage is utilized. The conditioned feedstock enters the cage through the feeder, and rotation of the worm shaft advances the feedstock along the cage and applies pressure to the feedstock disposed between the cage and the choke, the pressure releasing oil through the openings of cage and extruding spent biomass from the choke end of the cage. In various embodiments, the cage has an internal length that is between at least ten times to at least 20 times its internal diameter. In various embodiments, the cage comprises a plurality of elongated bars with at least some of the elongated bars separated by one or more spacers, the bars resting on a frame, wherein the one or more spacers between the bars form the openings, and oil is released through the openings to a collecting vessel fluidly coupled with the cage. In various embodiments, the spacers between the elongated bars are of different thicknesses thereby allowing variation of the space between each elongated bar. In various embodiments, either the spacers or the gaps between the bars are from 0.005 to 0.030 inches thick.

The cage on some expeller press can be heated using steam or cooled using water depending on the optimal temperature needed for maximum yield. Optimal temperature should be enough heat to aid in pressing, but not too high heat as to burn the biomass while it feeds through the press. The optimal temperature for the cage of the expeller press can vary depending on the microbial biomass that is to be pressed. In some embodiments, for pressing microbial or microalgal biomass, the cage is preheated and held to a temperature of between 200-270° F. In other embodiments, the optimal cage temperature for microbial or some species of microalgal biomass is between 210-230° F. In still other embodiments, the optimal cage temperature for microbial or some species of microalgal biomass is between 240-260° F. These temperature ranges differ significantly from many oilseed pressing processes, and in fact some oilseed pressing processes are referred to as "cold pressing" due to the lack of heating the seeds or the press during the process.

In various embodiments, the pressure increases by a factor of between 10 and 20 from the feeder end to the choke end of the cage. In various embodiments, the pressure along the cage does not increase by more than 100% of the pressure at the feeder end of the cage per linear foot of the cage between the feeder and choke ends of the cage. In various embodiments, the power consumed by the device does not increase by more than 10% when fully loaded with biomass or conditioned feedstock relative to running empty. In various embodiments, the residence time of feedstock in the barrel of the device is no longer than 5-10 min. In various embodiments, either the temperature of the device or the pressure exerted by the device or both are monitored and/or controlled.

In various embodiments, pressure is controlled by adjusting rotational velocity of a worm shaft. In various embodiments, including those in which pressure is not controlled, an expeller (screw) press comprising a worm shaft and a barrel can be used. In various embodiments, the barrel has a length and a channel having a diameter sized to receive the worm shaft, and wherein the barrel length is at least 10 to 15 times greater than the channel diameter. In various embodiments, the barrel of the press has an entrance and an exit and the diameter of the worm shaft increases from the entrance to the exit, and the pressing comprises increasing the pressure from the entrance to the exit of the barrel; in various embodiments, the pressure at the exit is 12 to 16 or even up to 20 times higher than the pressure at the entrance. In various embodiments, the expeller (screw) press comprises a worm shaft and a barrel having a first channel and a second channel, both channels concentric and sized to receive the worm shaft, wherein the first channel has a first diameter and the second channel has a second diameter different than the first diameter. In various embodiments, the conditioned feedstock remains resident in the barrel of the screw press for 5 to 10 minutes.

In various embodiments, the expeller (screw) press comprises a worm shaft disposed in a barrel lined with a plurality of elongate bars separated by one or more spacers therebetween, the spacers creating a gap between the elongate bars. In such a press, pressure can be controlled by adjusting the gap by changing the size or number of spacers between the elongate bars, and/or if the press has a space between an outer surface of the worm shaft and an inner surface of the elongate bars, pressure can be controlled by replacing at least some of the elongate bars with different sized bars so as to change the space. In various embodiments, the press comprises an output aperture and an adjustable choke coupled therewith, and pressure is controlled by adjusting the choke to increase or decrease the pressure. In various embodiments, the expeller (screw) press comprises a worm shaft disposed in a barrel, and pressure is controlled by adjusting a gap between an outer surface of the worm shaft and an inside surface of the barrel.

Expeller presses (screw presses) are routinely used for mechanical extraction of oil from soybeans and oil seeds. Generally, the main sections of an expeller press include an intake, a rotating feeder screw, a cage or barrel, a worm shaft and an oil pan. The expeller press is a continuous cage press, in which pressure is developed by a continuously rotating worm shaft. An extremely high pressure, approximately 10,000-20,000 pounds per square inch, is built up in the cage or barrel through the action of the worm working against an adjustable choke, which constricts the discharge of the pressed cake (spent biomass) from the end of the barrel. In various embodiments, screw presses from the following manufacturers are suitable for use : Anderson International Corp. (Cleveland, Ohio), Alloco (Santa Fe, Argentina), De Smet Rosedowns (Humberside, UK), The Dupps Co. (Germantown, Ohio), Grupo Tecnal (Sao Paulo, Brazil), Insta Pro (Des Moines, Iowa), French Oil Mill (Piqua, OH), Harburg Freudenberger (previously Krupp Extraktionstechnik) (Hamburg, Germany), Maschinenfabrik Reinartz (Neuss, Germany), Shann Consulting (New South Wales, Australia) and SKET (Magdeburg, Germany).

Microbial biomass or conditioned feedstock is supplied to the expeller press via an intake. A rotating feeder screw advances the material supplied from the intake into the barrel where it is then compressed by rotation of the worm shaft. Oil extracted from the material is then collected in an oil pan and then pumped to a storage tank. The remaining spent biomass is then extruded out of the press as a cake and can be collected for additional processing (see subsection G below). The cake may be pelletized.

The worm shaft is associated with a collar setup and is divided into sections. The worm and collar setup within each section is customizable. The worm shaft is responsible for conveying biomass (feedstock) through the press. It may be characterized as having a certain diameter and a thread pitch. Changing shaft diameter and pitch can increase or decrease the pressure and shear stress applied to feedstock as it passes through the press. The collar's purpose is to increase the pressure on the feedstock within the press and also apply a shear stress to the biomass.

The press load in terms of electrical current required to run the press loaded with microbial biomass (conditioned feedstock) is usually not more than about 10% of the electrical current required to run the press empty, and this suggests that the power required to press microbial biomass (conditioned feedstock disclosed herein is lower than other typical power requirements from the oil seed industry where the full press load is greater than 10% of the electrical current required to run the press empty of an oil seed feedstock.

The worm shaft preferably is tapered so that its outer diameter increases along the longitudinal length away from the barrel entrance. This decreases the gap between the worm shaft and the inside of the barrel thus creating greater pressure and shear stress as the biomass travels through the barrel. Additionally, the interior of the barrel is made up of flat steel bars separated by spacers (also referred to as shims), which are set edgewise around the periphery of the barrel, and are held in place by a heavy cradle-type cage. Adjusting the shim between the bars controls the gap between the bars which helps the extracted oil to drain as well as also helping to regulate barrel pressure. The shims are often from 0.003" thick to 0.030" thick and preferably from 0.005" to 0.020" thick, although other thicknesses may also be employed. Additionally, the bars may be adjusted, thereby creating sections within the barrel.

As the feed material is pressed or moved down the barrel, significant heat is generated by friction. In some cases, the amount of heat is controlled using a water-jacketed cooling system that surrounds the barrel. Because of the extreme pressure, oil that is pressed from a screw press or expeller press contains a proportion of "foots" or solid material from the biomass that flows out with the oil between the bars. The foots can be screened, drained and fed back into the press along with unpressed feedstock. Temperature sensors may be disposed at various locations around the barrel to monitor and aid in temperature control. Additionally, pressure sensors may also be attached to the barrel at various locations to help monitor and control the pressure.

Various operating characteristics of the expeller (screw) press can be expressed or analyzed as a compression ratio. Compression ratio is the ratio of the volume of material displaced per revolution of the worm shaft at the beginning of the barrel divided by the volume of material displaced per revolution of the worm shaft at the end of the barrel. For example, due to increasing compression ratios the pressure may be 10 to 18 times higher at the end of the barrel as compared with the beginning of the barrel. Internal barrel length may be at least ten times or even thirteen times the internal barrel diameter. Typical compression ratio for a screw or expeller press ranges from 1 to 18, depending on the feed material.

Residence time of the feed material in an expeller (screw) press may affect the amount of oil recovery. Increased residence time in the press gives the feedstock more exposure to the shear stress and pressure generated by the press, which may yield higher oil recovery. Residence time of the feedstock depends on the speed at which the press is run and the length vs. diameter of the screw press (or L/D). The greater the ratio of the length of the shaft to the diameter of the shaft, the longer the residence time of the feedstock (when rotational speed is held at a constant). In some embodiments, the residence time of the algal biomass that is being pressed with an expeller press is no more than 5 to 10 minutes. This residence time for algal biomass is about double the average residence time for other oil seeds such as soybean, canola or cottonseed.

The resulting pressed solids or cake (spent biomass of reduced oil content relative to the feedstock supplied to the screw press) is expelled from the expeller press through the discharge cone at the end of the barrel/shaft. The choke utilizes a hydraulic system to control the exit aperture on the expeller press. A fully optimized oil press operation can extract most of the available oil in the oil-bearing material. For example, optimized conditions for oil extraction from soybeans using an expeller press leaves about 4-6% residual oil; similar yields can be obtained from microbial biomass (conditioned feedstock) in accordance with the methods of the invention. A variety of factors can affect the residual oil content in the pressed cake. These factors include, but are not limited to, the ability of the press to rupture oil-containing cells and cellular compartments and the composition of the oil-bearing material itself, which can have an affinity for the expelled oil. In some cases, the oil-bearing material may have a high affinity for the expelled oil and can absorb the expelled oil back into the material, thereby trapping it. In that event, the oil remaining in the spent biomass can be re-pressed or subjected to solvent extraction, as described herein, to recover the oil.

It is not necessary to use biological agents to extract oil using an expeller press, ie: agents such as enzymes that are produced independently of the microbial biomass. The pressure exerted on the conditioned biomass is the primary mechanism by which oil is released from oil vesicles in the microbial biomass.

F. Microbial Oil Produced

After the pressing step, the method of the invention results in the extraction of oil and, consequently, the production of extracted oil and spent biomass of reduced oil content relative to the conditioned feedstock supplied to the pressing step. In various embodiments, the released oil contains solid particles of biomass (conditioned feedstock), and the method further comprises separating the released oil from the solid particles.

Contaminants may be present in the oil after pressing (or solvent extraction, see subsection G below, or both). In some embodiments, it may be advantageous to remove these contaminants before subsequent use of the oil (either for food applications or in subsequent chemical reactions, as in the production of fuels). Fines, or small particulates from the biomass, may be present in the extracted oil. Usually, fines are removed through passing the oil through a filter or some other process that physically separates the particulates from the oil. Optionally, the separated solid particles can be subjected to pressure or solvent extraction to extract any remaining oil therefrom.

Degumming is another process suitable for use in the methods of the invention that removes contaminants such as phospholipids from the oil. In some embodiments of the invention, degumming of the extracted oil is combined with refining, bleaching and deodorizing (or RBD). The RBD process eliminates or reduces the odor, color and/or taste of the extracted oil. The refining process usually consists of two steps, degumming and a neutralization step that removes the free fatty acids (FFA) in the oil through caustic stripping with sodium hydroxide. The bleaching step involves mixing the oil with various bleaching clays to absorb color, trace metals and sulfur compounds. The deodorizing step is a distillation process that occurs at low pressure and high temperature. The oil is put under a vaccum and heated with steam to remove any leftover taste or odors and FFAs. Deodorizing can also be achieved by treatment with activated charcoal.

Other methods of removal of contaminants such as heavy metals involve alkai-refining, acid pretreatment and the use of activated clays or zeolites may also be employed in various embodiments of the invention. The oil is mixed at moderate temperatures with small amounts of certain alkaline or ammonia hydroxides and alkaline or ammonia salts in the presence of a phase transfer catalyst. The Phillips Recycled Oil Program (PROP) technology, developed by the Phillips Petroleum Company, combines chemical demetallisation and hydrogenation to remove contaminants from oil. The process involves mixing the oil with an aqueous solution of diammonium phosphate at an elevated temperature in order to reduce the metal content of the oil. This process leads to chemical reactions that form metallic phosphates, which can then be removed from the oil by filtration. Next, the oil is mixed with hydrogen and percolated from a bed of clay and passed over an Ni/Mo catalyst in a hydrogenation reactor. This adsorption step removes the remaining traces of contaminating compounds, such as sulfur, oxygen, chlorine and nitrogen.

In various embodiments, the extracted oil produced by the methods of the invention contains no more than 8 ppm chloride, no more than 2 ppm phosphorus, no more than 26 ppm potassium, no more than 12 ppm sodium, and/or no more than 5 ppm sulfur. The oil produced by the process is useful in a variety of applications, including but not limited to the production of fuels such as biodiesel and renewable diesel (see, e.g., PCT Publication No. 2008/151149 and PCT Application Nos. US09/066141 and US09/066142, each of which is incorporated herein by reference) and the production of food (see, e.g., PCT Application No. US09/060692, incorporated herein by reference).

G. Spent Biomass Produced

The oil extraction methods of the present invention result in the production of microbial biomass of reduced oil content (spent biomass also referred to as pressed cake or pressed biomass) relative to the conditioned feedstock subjected to pressure in the pressing step. In various embodiments of the present invention, the oil content in the spent biomass of reduced oil content is at least 45 percent less than the oil content of the microbial biomass before the pressing step. In various embodiments, the spent biomass of reduced oil content remaining after the pressing step is pelletized or extruded as a cake. The spent cake, which may be subjected to additional processes, including additional conditioning and pressing or solvent-based extraction methods to extract residual oil in accordance with the invention, is similarly useful in a variety of applications, including but not limited to use as food, particularly for animals, and as a press aid. In various embodiments of the invention, remaining oil is extracted from the spent biomass of reduced oil content; in various embodiments, the extracting is performed by subjecting the spent biomass to pressure or by extracting the oil with an organic solvent.

In some instances, the pressed cake contains a range of from less than 50% oil to less than 1% oil by weight, including, for example, less than 40% oil by weight, less than 20% oil by weight, less than 10%, less than 5% oil by weight, and less than 2% oil by weight. In all cases, the oil content in the pressed cake is less than the oil content in the unpressed material.

In some embodiments, the spent biomass or pressed cake is collected and recycled back into the press with fresh conditioned feedstock or dry biomass as a bulking agent pressing aid. In this case, it may be necessary to condition the spent biomass before or after it is admixed with unpressed feedstock or biomass to make it suitable as a pressing aid. In other embodiments, the spent biomass or pressed cake, which can contain residual oil and other components, i.e., dietary fiber, is suitable for use as human or animal feed or feed additive. In such applications, the spent biomass produced by the methods of the invention may be referred to as "meal" or "delipidated meal."

Thus, spent biomass produced by the methods of the invention is useful as animal feed for farm animals, e.g., ruminants, poultry, swine, and aquaculture. This delipidated meal, as described above, is microbial biomass of reduced lipid/oil content, and can be produced through a mechanical process (e.g., pressing) or through a solvent extraction process (see below), or both. Typically, delipidated meal has less than 15% oil by weight. In a preferred embodiment, the delipidated meal generated from expeller (screw) pressing of microbial biomass followed by solvent extraction, has an oil content of less than 10% by weight. As described above, delipidated meal is suitable for use as a bulking agent (press aid). Addtionally, delipidated meal, although of reduced oil content, still contains high quality proteins, carbohydrates, fiber, minerals, and other nutrients appropriate for an animal feed. Because the cells are predominantly lysed, delipidated meal is easily digested. Delipidated meal can optionally be combined with other ingredients, such as grain, in an animal feed. Because delipidated meal has a powdery consistency, it can be pressed into pellets using an extruder or expanders, which are commercially available.

As noted above, spent biomass, depending on the efficiency of the pressing step, can contain significant amounts of oil. While, in various embodiments, this oil can be extracted by pressing in accordance with the methods of the invention (for example, as when the spent biomass is used as a bulking agent), the spent biomass can also be subjected to solvent extraction to recover more oil from the microbial biomass.

One example of solvent extraction suitable for use in such embodiments of the invention is hexane solvent extraction. In this embodiment, after the oil has been extracted using pressing, the remaining spent biomass is mixed with hexane to extract the remaining oil content. The free oil in the spent microbial biomass forms miscella with the solvent (e.g., hexane) and is separated from the solids (delipidated biomass meal). The oil-solvent miscella is filtered and the solvent is evaporated and recycled for use in future solvent extractions. The delipidated biomass meal can be desolventized and so rendered suitable for use in animal feed or feed additive in accordance with the methods of the invention.

Solvent extraction can recover the free oil that is trapped or reabsorbed in the spent microbial biomass; however, solvent extraction cannot recover oil that is still trapped in unbroken/unlysed microbial cells. Microbial biomass that has been conditioned (and lysed) in an extruder or expander but not subjected to the high pressure of a screw press may also be solvent extracted in order to recover the oil freed from the biomass during the conditioning step. Because the efficiency of solvent extraction depends on the accessibility of the solvent to the free oil, increasing the porosity and/or the surface area of the material for solvent extraction is important. Ideally, for solvent extraction, the spent microbial biomass or pressed cake should contain a high percentage of lysed or broken microbial cells, be of porous texture and increased surface area for solvent extraction, should not be highly compressed or burned, and should not be powdery and dry. In a preferred embodiment, the spent microbial biomass contains at least 85% lysed or broken microbial cells.

Several types of solvent extractors are used in the art and are suitable for use with the spent biomass as described above. In one embodiment, a continuous, percolation solvent extractor is used to extract residual free oil from the spent microbial biomass. Another method of oil extraction suitable for use in accordance with the methods of the invention is the supercritical fluid/carbon dioxide extraction method in which carbon dioxide is liquefied under pressure and heated to the point that it has the properties of both a liquid and a gas. This liquefied fluid then acts as the solvent in extracting the oil from the spent microbial biomass.

Solventless extraction methods known in the art for lipids can also be used for recovering oil from spent biomass in accordance with the methods of the invention. For example, the methods described in U.S. Pat. No. 6,750,048 can be used to recover oil from spent biomass produced by the methods of the invention. Another suitable solventless extraction method involves treating the spent biomass with an acid to create a liquid slurry. Optionally, the slurry can be sonicated to ensure the complete lysis of the microalgae cells in the spent biomass. The lysate produced by acid treatment is preferably created at temperatures above room temperature. Such a lysate, upon centrifugation or settling by gravity, can be separated into layers, one of which is an aqueous:lipid layer. Other layers can include a solid pellet, an aqueous layer, and a lipid layer. Lipid can be extracted from the emulsion layer by freeze thawing or otherwise cooling the emulsion. In such methods, it is not necessary to add any organic solvent, although in some embodiments it may be advantageous to do so.

The following section describes microorganisms useful for producing oil-containing microbial biomass suitable for use in the methods of the invention.

III. Microorganisms Useful for Producing Oil and Methods for Culturing Them

The present invention arose in part from the discovery that certain microorganisms can be used to produce oil, and hydrocarbon compositions derived therefrom, economically and in large quantities for use in the transportation fuel and petrochemical industry, as well as many other applications. Suitable microorganisms include microalgae, oleaginous bacteria, oleaginous yeast, and fungi. Acidic transesterfication of lipids yields long-chain fatty acid esters useful as a biodiesel. Other enzymatic processes can be applied to lipids derived from these organisms as described herein to yield fatty acids, aldehydes, alcohols, and alkanes. The present invention also provides methods for cultivating microorganisms such as microalgae to achieve increased productivity of lipids and increased lipid yield.

Microorganisms useful in the invention produce oil (lipids or hydrocarbons) suitable for biodiesel production or as feedstock for industrial applications. Suitable hydrocarbons for biodiesel production include triacylglycerides (TAGs) containing long-chain fatty acid molecules. Suitable hydrocarbons for industrial applications, such as manufacturing, include fatty acids, aldehydes, alcohols, and alkanes. In some embodiments, suitable fatty acids, or the corresponding primary alcohols, aldehydes or alkanes, generated by the methods described herein, contain from at least 8 to at least 35 carbon atoms. Long-chain fatty acids for biodiesel generally contain at least 14 carbon or more atoms.

Preferred fatty acids, or the corresponding primary alcohols, aldehydes, and alkanes, for industrial applications contain at least 8 or more carbon atoms. In certain embodiments of the invention, the above fatty acids, as well as the other corresponding hydrocarbon molecules, are saturated (with no carbon-carbon double or triple bonds); monounsaturated (single carbon-carbon double bond); or polyunsaturated (two or more carbon-carbon double bonds); and are linear (not cyclic); and/or have little or no branching in their structures.

Triacylglycerols containing carbon chain lengths in the C8 to C22 range can be produced using the methods of the invention and are preferred for a variety of applications. For surfactants, the preferred TAGs are typically C10-C14. For biodiesel or renewable diesel, the preferred TAGS are typically C16-C18. For jet fuel, the preferred TAGS are typically are C8-C10. For nutrition, the preferred TAGs are C22 polyunsaturated fatty acids (such as, DHA) and carotenoids (such as astaxanthin).

Any species of organism that produces suitable lipid or hydrocarbon can be used in the methods of the invention, although microorganisms that naturally produce high levels of suitable lipid or hydrocarbon are preferred. Production of hydrocarbons by microorganisms is reviewed by Metzger et al., *Appl Microbiol Biotechnol* (2005) 66: 486-496 and A Look Back at the U.S. Department of Energy's Aquatic Species Program: Biodiesel from Algae, NREL/TP-580-24190, John Sheehan, Terri Dunahay, John Benemann and Paul Roessler (1998), incorporated herein by reference.

Considerations affecting the selection of a microorganism for use in the invention include, in addition to production of suitable hydrocarbon for biodiesel or for industrial applications: (1) high lipid content as a percentage of cell weight; (2) ease of growth; and (3) ease of processing. In particular embodiments, the microorganism yields cells that are at least: about 40%, to 60% or more (including more than 70%) lipid when harvested for oil extraction. For certain applications, organisms that grow heterotrophically (on sugar in the absence of light) or can be engineered to do so, are useful in the methods of the invention. See U.S. Patent Application Nos. 60/837,839, 61/118,994, Ser Nos. 11/893,364, and 12/194,389, as well as US Patent Application Publication Nos. 20090004715, 20090047721, 20090011480, 20090035842, 20090061493, and 20090148918; PCT Application Nos. 2009/066141 and 2009/066142; and PCT Publication No.2008/151149, each of which is incorporated herein by reference in their entireties. For applications in which an organism will be genetically modified, the ease of transformation and availability of selectable markers and promoters, constitutive and/or inducible, that are functional in the microorganism will affect the selection of the organism to be modified.

Naturally occurring microalgae are preferred microorganisms for use in the methods of the invention. Thus, in various preferred embodiments of the present invention, the microorganism producing a lipid—the microorganism from which oil is extracted, recovered, or obtained—is a microalgae. Examples of genera and species of microalgae that can be used in the methods of the present invention include, but are not limited to, the following genera and species microalgae.

TABLE 1

Microalgae.

*Achnanthes orientalis, Agmenellum, Amphiprora hyaline, Amphora coffeiformis, Amphora coffeiformis linea, Amphora coffeiformis punctata, Amphora coffeiformis taylori, Amphora coffeiformis tenuis, Amphora delicatissima, Amphora delicatissima capitata, Amphora sp., Anabaena, Ankistrodesmus, Ankistrodesmus falcatus, Boekelovia hooglandii, Borodinella sp., Botryococcus braunii, Botryococcus sudeticus, Bracteoccocus aerius, Bracteococcus sp., Bracteacoccus grandis, Bracteacoccus cinnabarinas, Bracteococcus minor, Bracteococcus medionucleatus, Carteria, Chaetoceros gracilis, Chaetoceros muelleri, Chaetoceros muelleri subsalsum, Chaetoceros sp., Chlorella anitrata, Chlorella Antarctica, Chlorella aureoviridis, Chlorella candida, Chlorella capsulate, Chlorella desiccate, Chlorella ellipsoidea, Chlorella emersonii, Chlorella fusca, Chlorella fusca var. vacuolata, Chlorella glucotropha, Chlorella infusionum, Chlorella infusionum var. actophila, Chlorella infusionum var. auxenophila, Chlorella kessleri, Chlorella lobophora* (strain SAG 37.88), *Chlorella luteoviridis, Chlorella luteoviridis var. aureoviridis, Chlorella luteoviridis var. lutescens, Chlorella miniata, Chlorella cf. minutissima, Chlorella minutissima, Chlorella mutabilis, Chlorella nocturna, Chlorella ovalis, Chlorella parva, Chlorella photophila, Chlorella pringsheimii, Chlorella protothecoides* (including any of UTEX strains 1806, 411, 264, 256, 255, 250, 249, 31, 29, 25), *Chlorella protothecoides var. acidicola, Chlorella regularis, Chlorella regularis var. minima, Chlorella regularis var. umbricata, Chlorella reisiglii, Chlorella saccharophila, Chlorella saccharophila var. ellipsoidea, Chlorella salina, Chlorella simplex, Chlorella sorokiniana, Chlorella sp., Chlorella sphaerica, Chlorella stigmatophora, Chlorella vanniellii, Chlorella vulgaris, Chlorella vulgaris f. tertia, Chlorella vulgaris var. autotrophica, Chlorella vulgaris var. viridis, Chlorella vulgaris var. vulgaris, Chlorella vulgaris var. vulgaris f. tertia, Chlorella vulgaris var. vulgaris f. viridis, Chlorella xanthella, Chlorella zofingiensis, Chlorella trebouxioides, Chlorella vulgaris, Chlorococcum infusionum, Chlorococcum sp., Chlorogonium, Chroomonas sp., Chrysosphaera sp., Cricosphaera sp., Crypthecodinium cohnii, Cryptomonas sp., Cyclotella cryptica, Cyclotella meneghiniana, Cyclotella sp., Dunaliella sp., Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera sp., Ellipsoidon sp., Euglena, Franceia sp., Fragilaria crotonensis, Fragilaria sp., Gleocapsa sp., Gloeothamnion sp., Hymenomonas sp., Isochrysis aff. galbana, Isochrysis galbana, Lepocinclis, Micractinium, Micractinium* (UTEX LB 2614), *Monoraphidium minutum, Monoraphidium sp., Nannochloris sp., Nannochloropsis salina, Nannochloropsis sp., Navicula acceptata, Navicula biskanterae, Navicula pseudotenelloides, Navicula pelliculosa, Navicula saprophila, Navicula sp., Neochloris oleabundans, Nephrochloris sp., Nephroselmis sp., Nitschia communis, Nitzschia alexandrina, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia sp., Ochromonas sp., Oocystis parva, Oocystis pusilla, Oocystis sp., Oscillatoria limnetica, Oscillatoria sp., Oscillatoria subbrevis, Parachlorella beijerinckii, Parachlorella kessleri, Pascheria acidophila, Pavlova sp., Phagus, Phormidium, Platymonas sp., Pleurochrysis carterae, Pleurochrysis dentate, Pleurochrysis sp., Prototheca stagnora, Prototheca portoricensis, Prototheca moriformis, Prototheca wickerhamii, Prototheca zopfii, Pseudochlorella aquatica, Pyramimonas sp., Pyrobotrys, Sarcinoid chrysophyte, Scenedesmus armatus, Scenedesmus rubescens, Schizochytrium, Spirogyra, Spirulina platensis, Stichococcus sp., Synechococcus sp., Tetraedron, Tetraselmis sp., Tetraselmis suecica, Thalassiosira weissflogii,* and *Viridiella fridericiana.*

In various preferred embodiments of the present invention, the microorganism producing a lipid or a microorganism from which oil can be extracted, recovered, or obtained is an organism of a species of the genus *Chlorella*. In various preferred embodiments, the microalgae is *Chlorella protothecoides, Chlorella ellipsoidea, Chlorella minutissima, Chlorella zofinienesi, Chlorella luteoviridis, Chlorella kessleri, Chlorella sorokiniana, Chlorella fusca* var. *vacuolate Chlorella* sp., *Chlorella* cf. *minutissima* or *Chlorella emersonii.* *Chlorella* is a genus of single-celled green algae, belonging to the phylum Chlorophyta. It is spherical in shape, about 2 to 10 μm in diameter, and is without flagella. Some species of *Chlorella* are naturally heterotrophic. *Chlorella*, particularly *Chlorella protothecoides*, is a preferred microorganism for use in the invention because of its high composition of lipid and its ability to grow heterotrophically.

*Chlorella*, preferably, *Chlorella protothecoides, Chlorella minutissima,* or *Chlorella emersonii*, can be genetically engineered to express one or more heterologous genes ("transgenes"). Examples of expression of transgenes in, e.g., *Chlorella*, can be found in the literature (see for example *Current Microbiology* Vol. 35 (1997), pp. 356-362; *Sheng Wu Gong Cheng Xue Bao.* 2000 July;16(4):443-6; *Current Microbiology* Vol. 38 (1999), pp. 335-341; *Appl Microbiol Biotechnol* (2006) 72: 197-205; *Marine Biotechnology* 4, 63-73, 2002; *Current Genetics* 39:5, 365-370 (2001); *Plant Cell Reports* 18:9, 778-780, (1999); *Biologia Plantarium* 42(2): 209-216, (1999); *Plant Pathol.* J 21(1): 13-20, (2005)), and such references are incorporated herein by reference as teaching various methods and materials for introducing and expressing genes of interest in such organisms, as the patent applications referenced above. Other lipid-producing microalgae can be engineered as well, including prokaryotic Microalgae (see Kalscheuer et al., Applied Microbiology and Biotechnology, Volume 52, Number 4/October, 1999), which are suitable for use in the methods of the invention.

Species of *Chlorella* suitable for use in the invention can also be identified by a method that involves amplification of certain target regions of the genome. For example, identification of a specific *Chlorella* species or strain can be achieved through amplification and sequencing of nuclear and/or chloroplast DNA using primers and methodology using any region of the genome, such as, for example, the methods described in Wu et al., *Bot. Bull. Acad. Sin.* 42:115-121 (2001). Identification of *Chlorella* spp. isolates using ribosomal DNA sequences. Well established methods of phylogenetic analysis, such as amplification and sequencing of ribosomal internal transcribed spacer (ITS1 and ITS2 rDNA), 18S rRNA, and other conserved genomic regions can be used by those skilled in the art to identify species of not only *Chlorella*, but other oil and lipid producing organisms capable of using the methods disclosed herein. For examples of methods of identification and classification of algae see *Genetics,* 170(4):1601-10 (2005) and *RNA,* 11(4): 361-4 (2005).

Genomic DNA comparison can also be used to identify suitable species of microalgae for use in the methods of the present invention. Regions of conserved DNA, including but not limited to DNA encoding 23S rRNA, can be amplified from microalgal species and compared to consensus sequences to screen for microalgal species that are taxonomically related to a preferred microalgae for use in the methods of the present invention. Similar genomic DNA comparisons can also be used to identify suitable species of oleaginous yeast for use in the methods of the present invention. Regions of conserved genomic DNA, such as, but not limited to conserved genomic sequences between three prime regions of fungal 18S and five prime regions of fungal 26S rRNA genes can be amplified from oleaginous yeast species that may be, for example, taxonomically related to the preferred oleaginous yeast species used in the present invention and compared to the corresponding regions of those preferred species. Example 13 describes genomic sequencing of conserved 3' regions of fungal 18S and 5'regions of fungal 26S rRNA for 48 strains of oleaginous yeasts and the genomic sequences are listed as SEQ ID NOs: 37-69.

in diameter, and lack flagella. In various preferred embodiments, the microalgae used in the methods of the invention is selected from the following species of *Prototheca*: *Prototheca stagnora, Prototheca portoricensis, Prototheca moriformis, Prototheca wickerhamii* and *Prototheca zopfii.*

In some embodiments, microalgae preferred for use in the methods of the present invention have genomic DNA sequences encoding 23S rRNA that have at least 99%, or at least 95%, or at least 90%, or at least 85% identical to a 23S rRNA sequence of a *Prototheca* species.

In addition to *Prototheca* and *Chlorella*, other microalgae can be used in accordance with the methods of the present invention. In various preferred embodiments, the microalgae is selected from a genus or species from any of the following genera and species:

*Parachlorella kessleri, Parachlorella beijerinckii, Neochloris oleabundans, Bracteacoccus grandis, Bracteacoccus cinnabarinas, Bracteococcus aerius, Bracteocooccus* sp. or *Scenedesmus rebescens*. Other non-limiting examples of microalgae (including *Chlorella*) are listed in Table 1, above.

In addition to microalgae, oleaginous yeast can accumulate more than 20% of their dry cell weight as lipid and so are useful in the methods of the invention. In one preferred embodiment of the present invention, a microorganism producing a lipid or a microorganism from which oil can be extracted, recovered, or obtained, is an oleaginous yeast. Examples of oleaginous yeast that can be used in the methods of the present invention include, but are not limited to, the oleaginous yeast listed in Table 2. Illustrative methods for the cultivation of oleaginous yeast (*Yarrowia lipolytica* and *Rhodotorula graminis*) in order to achieve high oil content are provided in the examples below.

TABLE 2

Oleaginous Yeast.

*Candida apicola, Candida* sp., *Cryptococcus curvatus, Cryptococcus terricolus, Debaromyces hansenii, Endomycopsis vernalis, Geotrichum carabidarum, Geotrichum cucujoidarum, Geotrichum histeridarum, Geotrichum silvicola, Geotrichum vulgare, Hyphopichia burtonii, Lipomyces lipofer, Lypomyces orentalis, Lipomyces starkeyi, Lipomyces tetrasporous, Pichia mexicana, Rodosporidium sphaerocarpum, Rhodosporidium toruloides Rhodotorula aurantiaca, Rhodotorula dairenensis, Rhodotorula diffluens, Rhodotorula glutinus, Rhodotorula glutinis* var. *glutinis, Rhodotorula gracilis, Rhodotorula graminis Rhodotorula minuta, Rhodotorula mucilaginosa, Rhodotorula mucilaginosa* var. *mucilaginosa, Rhodotorula terpenoidalis, Rhodotorula toruloides, Sporobolomyces alborubescens, Starmerella bombicola, Torulaspora delbruekii, Torulaspora pretoriensis, Trichosporon behrend, Trichosporon brassicae, Trichosporon domesticum, Trichosporon laibachii, Trichosporon loubieri, Trichosporon loubieri* var. *loubieri, Trichosporon montevideense, Trichosporon pullulans, Trichosporon* sp., *Wickerhamomyces Canadensis, Yarrowia lipolytica,* and *Zygoascus meyerae.*

In some embodiments, oleaginous yeast preferred for use in the methods of the present invention have genomic DNA sequences encoding for fungal 18S and 26S rRNA genomic sequence with at least 75%, 85% or 95% nucleotide identity to one or more of SEQ ID NOs: 37-69.

In some embodiments, microalgae preferred for use in the methods of the present invention have genomic DNA sequences encoding 23S rRNA that are at least 99%, or at least 95%, or at least 90%, or at least 85% identical to a 23S rRNA sequences of a *Chlorella* species.

*Prototheca* is a genus of single-cell microalgae believed to be a non-photosynthetic mutant of *Chlorella*. While *Chlorella* can obtain its energy through photosynthesis, species of the genus *Prototheca* are obligate heterotrophs. *Prototheca* are spherical in shape, about 2 to 15 micrometers In one preferred embodiment of the present invention, a microorganism producing a lipid or a microorganism from which a lipid can be extracted, recovered or obtained, is a fungus. Examples of fungi that can be used in the methods of the present invention include, but are not limited to, the fungi listed in Table 3.

TABLE 3

Oleaginous Fungi.

*Mortierella, Mortierrla vinacea, Mortierella alpine, Pythium debaryanum, Mucor circinelloides, Aspergillus ochraceus, Aspergillus terreus, Pennicillium iilacinum, Hensenulo, Chaetomium, Cladosporium, Malbranchea, Rhizopus,* and *Pythium*

Thus, in one embodiment of the present invention, the microorganism used for the production of microbial biomass for use in the methods of the invention is a fungus. Examples of suitable fungi (e.g., *Mortierella alpine*, *Mucor circinelloides*, and *Aspergillus ochraceus*) include those that have been shown to be amenable to genetic manipulation, as described in the literature (see, for example, *Microbiology*, July; 153(Pt.7): 2013-25 (2007); *Mol Genet Genomics*, June; 271(5): 595-602 (2004); *Curr Genet*, March;21(3):215-23 (1992); *Current Microbiology*, 30(2):83-86 (1995); Sakuradani, NISR Research Grant, "Studies of Metabolic Engineering of Useful Lipid-producing Microorganisms" (2004); and PCT/JP2004/012021).

In other embodiments of the present invention, a microorganism producing a lipid or a microorganism from which oil can be extracted, recovered, or obtained is an oleaginous bacterium. Oleaginous bacteria are bacteria that can accumulate more than 20% of their dry cell weight as lipid. Species of oleaginous bacteria for use in the methods of the present invention, include species of the genus *Rhodococcus*, such as *Rhodococcus opacus* and *Rhodococcus* sp. Methods of cultivating oleaginous bacteria, such as *Rhodococcus opacus*, are known in the art (see Waltermann, et al., (2000) *Microbiology*, 146: 1143-1149). Illustrative methods for cultivating *Rhodococcus opacus* to achieve high oil content are provided in the examples below.

To produce oil-containing microbial biomass suitable for use in the methods of the invention, microorganisms are cultured for production of oil (e.g., hydrocarbons, lipids, fatty acids, aldehydes, alcohols and alkanes). This type of culture is typically first conducted on a small scale and, initially, at least, under conditions in which the starting microorganism can grow. For example, if the starting microorganism is a photoautotroph, the initial culture is conducted in the presence of light. The culture conditions can be changed if the microorganism is evolved or engineered to grow independently of light. Culture for purposes of hydrocarbon production is preferentially conducted on a large scale. Preferably, a fixed carbon source is present in excess. The culture can also be exposed to light some or all of the time, if desired or beneficial.

Microalgae can be cultured in liquid media. The culture can be contained within a bioreactor. Optionally, the bioreactor does not allow light to enter. Alternatively, microalgae can be cultured in photobioreactors that contain a fixed carbon source and allow light to strike the cells. For microalgae cells that can utilize light as an energy source, exposure of those cells to light, even in the presence of a fixed carbon source that the cells transport and utilize (i.e., mixotrophic growth), nonetheless accelerates growth compared to culturing those cells in the dark. Culture condition parameters can be manipulated to optimize total oil production, the combination of hydrocarbon species produced, and/or production of a particular hydrocarbon species. In some instances, it is preferable to culture cells in the dark, such as, for example, when using extremely large (40,000 liter and higher) fermentors that do not allow light to strike a significant proportion (or any) of the culture.

Microalgal culture medium typically contains components such as a fixed nitrogen source, trace elements, optionally a buffer for pH maintenance, and phosphate. Components in addition to a fixed carbon source, such as acetate or glucose, may include salts such as sodium chloride, particularly for seawater microalgae. Examples of trace elements include zinc, boron, cobalt, copper, manganese, and molybdenum, in, for example, the respective forms of $ZnCl_2$, $H_3BO_3$, $CoCl_2 \cdot 6H_2O$, $CuCl_2 \cdot 2H_2O$, $MnCl_2 \cdot 4H_2O$ and $(NH_4)_6Mo_7O_{24} \cdot 4H_2O$. Other culture parameters can also be manipulated, such as the pH of the culture media, the identity and concentration of trace elements and other media constituents.

For organisms able to grow on a fixed carbon source, the fixed carbon source can be, for example, glucose, fructose, sucrose, galactose, xylose, mannose, rhamnose, N-acetylglucosamine, glycerol, floridoside, glucuronic acid, and/or acetate. The one or more exogenously provided fixed carbon source(s) can be supplied to the culture medium at a concentration of from at least about 50 μM to at least 500 mM, and at various amounts in that range (i.e., 100 μM, 500 μM, 5 mM, 50 mM).

Certain microalgae can be grown in the presence of light. The number of photons striking a culture of such microalgae cells can be manipulated, as well as other parameters such as the wavelength spectrum and ratio of dark:light hours per day. Microalgae can also be cultured in natural light, as well as simultaneous and/or alternating combinations of natural light and artificial light. For example, microalgae of the genus *Chlorella* can be cultured under natural light during daylight hours and under artificial light during night hours.

The gas content of a photobioreactor to grow microorganisms like microalgae can be manipulated. Part of the volume of a photobioreactor can contain gas rather than liquid. Gas inlets can be used to pump gases into the photobioreactor. Any gas can be pumped into a photobioreactor, including air, air/$CO_2$ mixtures, noble gases such as argon and others. The rate of entry of gas into a photobioreactor can also be manipulated. Increasing gas flow into a photobioreactor increases the turbidity of a culture of microalgae. Placement of ports conveying gases into a photobioreactor can also affect the turbidity of a culture at a given gas flow rate. Air/$CO_2$ mixtures can be modulated to generate optimal amounts of $CO_2$ for maximal growth by a particular organism. Microalgae grow significantly faster in the light under, for example, 3% $CO_2$/97% air than in 100% air. 3% $CO_2$/97% air has approximately 100-fold more $CO_2$ than found in air. For example, air:$CO_2$ mixtures in a range of from about 99.75% air:0.25% $CO_2$ to 95.00% air:5.0% $CO_2$ can be infused into a bioreactor or photobioreactor.

Microalgae cultures can also be subjected to mixing using devices such as spinning blades and impellers, rocking of a culture, stir bars, infusion of pressurized gas, and other instruments; such methods can be used to ensure that all cells in a photobioreactor are exposed to light but of course find application with cultures of cells that are not using light as an energy source.

Some microalgae species can grow by utilizing a fixed carbon source, such as glucose or acetate, in the absence of light. Such growth is known as heterotrophic growth. For *Chlorella protothecoides*, for example, heterotrophic growth results in high production of biomass and accumulation of high lipid content. Thus, an alternative to photosynthetic growth and propagation of microorganisms, as described above, is the use of heterotrophic growth and propagation of microorganisms, under conditions in which a fixed carbon source provides energy for growth and lipid accumulation. In some embodiments, the fixed carbon energy source comprises cellulosic material, including depolymerized cellulosic material, a 5-carbon sugar, or a 6-carbon sugar.

Methods for the growth and propagation of *Chlorella protothecoides* to high oil levels as a percentage of dry weight have been reported (see for example Miao and Wu, *J. Biotechnology*, 2004, 11:85-93 and Miao and Wu, *Biosource Technology* (2006) 97:841-846, reporting methods for obtaining 55% oil dry cell weight).

PCT Publication WO2008/151149, incorporated herein by reference, describes preferred growth conditions for *Chlorella*. Multiple species of *Chlorella* and multiple strains within a species can be grown in the presence of glycerol. The aforementioned patent application describes culture parameters incorporating the use of glycerol for fermentation of multiple genera of microalgae. Multiple *Chlorella* species and strains proliferate very well on not only purified reagent-grade glycerol, but also on acidulated and non-acidulated glycerol byproduct from biodiesel transesterification. In some instances, microalgae, such as *Chlorella* strains, undergo cell division faster in the presence of glycerol than in the presence of glucose. In these instances, two-stage growth processes in which cells are first fed glycerol to increase cell density, and are then fed glucose to accumulate lipids can improve the efficiency with which lipids are produced.

Other feedstocks for culturing microalgae under heterotrophic growth conditions for purposes of the present invention include mixtures of glycerol and glucose, mixtures of glucose and xylose, mixtures of fructose and glucose, sucrose, glucose, fructose, xylose, arabinose, mannose, galactose, acetate, and molasses. Other suitable feedstocks include corn stover, sugar beet pulp, and switchgrass in combination with depolymerization enzymes.

For lipid and oil production, cells, including recombinant cells, are typically fermented in large quantities. The culturing may be in large liquid volumes, such as in suspension cultures as an example. Other examples include starting with a small culture of cells which expand into a large biomass in combination with cell growth and propagation as well as lipid (oil) production. Bioreactors or steel fermentors can be used to accommodate large culture volumes. For these fermentations, use of photosynthetic growth conditions may be impossible or at least impractical and inefficient, so heterotrophic growth conditions may be preferred.

Appropriate nutrient sources for culture in a fermentor for heterotrophic growth conditions include raw materials such as one or more of the following: a fixed carbon source such as glucose, corn starch, depolymerized cellulosic material, sucrose, sugar cane, sugar beet, lactose, milk whey, molasses, or the like; a nitrogen source, such as protein, soybean meal, cornsteep liquor, ammonia (pure or in salt form), nitrate or nitrate salt; and a phosphorus source, such as phosphate salts. Additionally, a fermentor for heterotrophic growth conditions allows for the control of culture conditions such as temperature, pH, oxygen tension, and carbon dioxide levels. Optionally, gaseous components, like oxygen or nitrogen, can be bubbled through a liquid culture. Other starch (glucose) sources include wheat, potato, rice, and sorghum. Other carbon sources include process streams such as technical grade glycerol, black liquor, and organic acids such as acetate, and molasses. Carbon sources can also be provided as a mixture, such as a mixture of sucrose and depolymerized sugar beet pulp.

A fermentor for heterotrophic growth conditions can be used to allow cells to undergo the various phases of their physiological cycle. As an example, an inoculum of lipid-producing cells can be introduced into a medium followed by a lag period (lag phase) before the cells begin to propagate. Following the lag period, the propagation rate increases steadily and enters the log, or exponential, phase. The exponential phase is in turn followed by a slowing of propagation due to decreases in nutrients such as nitrogen, increases in toxic substances, and quorum sensing mechanisms. After this slowing, propagation stops, and the cells enter a stationary phase or steady growth state, depending on the particular environment provided to the cells.

In one heterotrophic culture method useful for purposes of the present invention, microorganisms are cultured using depolymerized cellulosic biomass as a feedstock. As opposed to other feedstocks that can be used to culture microorganisms, such as corn starch or sucrose from sugar cane or sugar beets, cellulosic biomass (depolymerized or otherwise) is not suitable for human consumption. Cellulosic biomass (e.g., stover, such as corn stover) is inexpensive and readily available; however, attempts to use this material as a feedstock for yeast have failed. In particular, such feedstocks have been found to be inhibitory to yeast growth, and yeast cannot use the 5-carbon sugars produced from cellulosic materials (e.g., xylose from hemi-cellulose). By contrast, microalgae can proliferate on depolymerized cellulosic material. Accordingly, the invention contemplates methods of culturing a microalgae under heterotrophic growth conditions in the presence of a cellulosic material and/or a 5-carbon sugar. Cellulosic materials generally include: 40-60% cellulose; 20-40% hemicellulose; and 10-30% lignin.

Suitable cellulosic materials include residues from herbaceous and woody energy crops, as well as agricultural crops, i.e., the plant parts, primarily stalks and leaves typically not removed from the fields with the primary food or fiber product. Examples include agricultural wastes such as sugarcane bagasse, rice hulls, corn fiber (including stalks, leaves, husks, and cobs), wheat straw, rice straw, sugar beet pulp, citrus pulp, citrus peels; forestry wastes such as hardwood and softwood thinnings, and hardwood and softwood residues from timber operations; wood wastes such as saw mill wastes (wood chips, sawdust) and pulp mill waste; urban wastes such as paper fractions of municipal solid waste, urban wood waste and urban green waste such as municipal grass clippings; and wood construction waste. Additional cellulosics include dedicated cellulosic crops such as switchgrass, hybrid poplar wood, and miscanthus, fiber cane, and fiber sorghum. Five-carbon sugars that are produced from such materials include xylose.

Some microbes are able to process cellulosic material and directly utilize cellulosic materials as a carbon source. However, cellulosic material may need to be treated to increase the accessible surface area or for the cellulose to be first broken down as a preparation for microbial utilization as a carbon source. Ways of preparing or pretreating cellulosic material for enzyme digestion are well known in the art. The methods are divided into two main categories: (1) breaking apart the cellulosic material into smaller particles to increase the accessible surface area; and (2) chemically treating the cellulosic material to create a useable substrate for enzyme digestion.

Methods for increasing the accessible surface area include steam explosion, which involves the use of steam at high temperatures to break apart cellulosic materials. Because of the high temperature requirement of this process, some of the sugars in the cellulosic material may be lost, thus reducing the available carbon source for enzyme digestion (see for example, Chahal, D. S. et al., *Proceedings of the 2$^{nd}$ World Congress of Chemical Engineering*; (1981) and Kaar et al., *Biomass and Bioenergy* (1998) 14(3): 277-87) Ammonia explosion allows for explosion of cellulosic material at a lower temperature, but is more costly to perform and the ammonia might interfere with subsequent enzyme digestion processes (see for example, Dale, B. E. et al., *Biotechnology and Bioengineering* (1982); 12: 31-43). Another explosion technique involves the use of supercritical carbon dioxide explosion to break the cellulosic material into smaller fragments (see for example, Zheng et al., *Biotechnology Letters* (1995); 17(8): 845-850).

Methods for chemically treating the cellulosic material to create useable substrates for enzyme digestion are also known in the art. U.S. Pat. No. 7,413,882, incorporated herein by reference, describes the use of genetically engineered microbes that secrete beta-glucosidase into the fermentation broth and treating cellulosic material with the fermentation broth to enhance the hydrolysis of cellulosic material into glucose. Cellulosic material can also be treated with strong acids and bases to aid subsequent enzyme digestion. U.S. Pat. No. 3,617,431, incorporated herein by reference, describes the use of alkaline digestion to breakdown cellulosic materials.

Microorganisms can possess both the ability to utilize an otherwise inedible feedstock, such as cellulosic material or glycerol, as a carbon source (or a pre-treated cellulosic material as a carbon source) and the natural ability to produce edible oils. By utilizing both of these properties, cellulosic material or glycerol, which is normally not part of the human food chain (as opposed to corn glucose and sucrose from sugar cane and sugar beet, which are food compositions suitable for human consumption) can be converted into high nutrition, edible oils, which can provide nutrients and calories as part of the daily human (or animal) diet. In this manner, previously inedible feedstock can be turned into high nutrition edible oils and other food products and food compositions that contain these high nutrition edible oils, as well as oils useful for other purposes.

Bioreactors can be employed for heterotrophic growth and propagation methods. As will be appreciated, provisions made to make light available to the cells in photosynthetic growth methods are unnecessary when using a fixed-carbon source in the heterotrophic growth and propagation methods described herein.

The specific examples of process conditions and heterotrophic growth and propagation methods described herein can be combined in any suitable manner to improve efficiencies of microbial growth and lipid production. For example, microbes having a greater ability to utilize any of the above-described feedstocks for increased proliferation and/or lipid production may be used in the methods of the invention.

Mixotrophic growth involves the use of both light and fixed carbon source(s) as energy sources for cultivating cells. Mixotrophic growth can be conducted in a photobioreactor. Microalgae can be grown and maintained in closed photobioreactors made of different types of transparent or semitransparent material. Such material can include Plexiglass® enclosures, glass enclosures, bags made from substances such as polyethylene, transparent or semi-transparent pipes and other material. Microalgae can be grown and maintained in open photobioreactors such as raceway ponds, settling ponds and other non-enclosed containers. The following discussion of photobioreactors useful for mixotrophic growth conditions is applicable to photosynthetic growth conditions as well.

Photobioreactors can have ports allowing entry of gases, solids, semisolids, and liquids into the chamber containing the microalgae. Ports are usually attached to tubing or other means of conveying substances. Gas ports, for example, convey gases into the culture. Pumping gases into a photobioreactor can serve both to feed cells $CO_2$ and other gases and to aerate the culture and therefore generate turbidity. The amount of turbidity of a culture varies as the number and position of gas ports is altered. For example, gas ports can be placed along the bottom of a cylindrical polyethylene bag. Microalgae grow faster when $CO_2$ is added to air and bubbled into a photobioreactor. For example, a 5% $CO_2$: 95% air mixture can be infused into a photobioreactor containing *Botryococcus* cells for such purposes (see for example *J Agric Food Chem*. 54(13):4593-9 (2006); *J Biosci Bioeng*. 87(6):811-5 (1999); and *J Nat Prod*. 66(6):772-8 (2003)).

Photobioreactors can be exposed to one or more light sources to provide microalgae with light as an energy source via light directed to a surface of the photobioreactor. Preferably the light source provides an intensity that is sufficient for the cells to grow, but not so intense as to cause oxidative damage or cause a photoinhibitive response. In some instances a light source has a wavelength range that mimics or approximately mimics the range of the sun. In other instances a different wavelength range is used. Photobioreactors can be placed outdoors or in a greenhouse or other facility that allows sunlight to strike the surface. Preferred photon intensities for species of the genus *Botryococcus* are between 25 and 500 µE m$^{-2}$ s$^{-1}$ (see for example *Photosynth Res*. 84(1-3):21-7 (2005)).

As noted above, photobioreactors preferably have one or more ports that allow media entry. It is not necessary that only one substance enter or leave a port. For example, a port can be used to flow culture media into the photobioreactor and then later can be used for sampling, gas entry, gas exit, or other purposes. In some instances, a photobioreactor is filled with culture media at the beginning of a culture, and no more growth media is infused after the culture is inoculated. In other words, the microalgal biomass is cultured in an aqueous medium for a period of time during which the microalgae reproduce and increase in number; however, quantities of aqueous culture medium are not flowed through the photobioreactor throughout the time period. Thus in some embodiments, aqueous culture medium is not flowed through the photobioreactor after inoculation.

In other instances, culture media can be flowed though the photobioreactor throughout the time period during which the microalgae reproduce and increase in number. In some embodiments media is infused into the photobioreactor after inoculation but before the cells reach a desired density. In other words, a turbulent flow regime of gas entry and media entry is not maintained for reproduction of microalgae until a desired increase in number of said microalgae has been achieved.

Photobioreactors typically have one or more ports that allow gas entry. Gas can serve to both provide nutrients such as $CO_2$ as well as to provide turbulence in the culture media. Turbulence can be achieved by placing a gas entry port below the level of the aqueous culture media so that gas entering the photobioreactor bubbles to the surface of the culture. One or more gas exit ports allow gas to escape, thereby preventing pressure buildup in the photobioreactor. Preferably a gas exit port leads to a "one-way" valve that prevents contaminating microorganisms from entering the photobioreactor. In some instances, cells are cultured in a photobioreactor for a period of time during which the microalgae reproduce and increase in number, however a turbulent flow regime with turbulent eddies predominantly throughout the culture media caused by gas entry is not maintained for all of the period of time. In other instances a turbulent flow regime with turbulent eddies predominantly throughout the culture media caused by gas entry can be maintained for all of the period of time during which the microalgae reproduce and increase in number. In some instances a predetermined range of ratios between the scale of the photobioreactor and the scale of eddies is not maintained for the period of time during which the microalgae reproduce and increase in number. In other instances such a range can be maintained.

Photobioreactors typically have at least one port that can be used for sampling the culture. Preferably, a sampling port can be used repeatedly without altering compromising the axenic nature of the culture. A sampling port can be configured with a valve or other device that allows the flow of sample to be stopped and started. Alternatively a sampling port can allow continuous sampling. Photobioreactors also typically have at least one port that allows inoculation of a culture. Such a port can also be used for other purposes such as media or gas entry.

Microorganisms useful in accordance with the methods of the present invention are found in various locations and environments throughout the world. As a consequence of their isolation from other species and their resulting evolutionary divergence, the particular growth medium for optimal growth and generation of oil and/or lipid from any particular species of microbe may need to be experimentally determined. In some cases, certain strains of microorganisms may be unable to grow on a particular growth medium because of the presence of some inhibitory component or the absence of some essential nutritional requirement required by the particular strain of microorganism. There are a variety of methods known in the art for culturing a wide variety of species of microalgae to accumulate high levels of lipid as a percentage of dry cell weight, and methods for determining optimal growth conditions for any species of interest are also known in the art.

Solid and liquid growth media are generally available from a wide variety of sources, and instructions for the preparation of particular media that is suitable for a wide variety of strains of microorganisms can be found, for example, online at http://www.utex.org/, a site maintained by the University of Texas at Austin for its culture collection of algae (UTEX). For example, various fresh water and salt water media include those shown in Table 4.

TABLE 4

| Algal Media. | |
|---|---|
| Fresh Water Media | Salt Water Media |
| ½ CHEV Diatom Medium | 1% F/2 |
| ⅓ CHEV Diatom Medium | ½ Enriched Seawater Medium |
| ⅕ CHEV Diatom Medium | ½ Erdschreiber Medium |
| 1:1 DYIII/PEA + Gr+ | ½ Soil + Seawater Medium |
| ⅔ CHEV Diatom Medium | ⅓ Soil + Seawater Medium |
| 2X CHEV Diatom Medium | ¼ ERD |
| Ag Diatom Medium | ¼ Soil + Seawater Medium |
| Allen Medium | ⅕ Soil + Seawater Medium |
| BG11-1 Medium | ⅔ Enriched Seawater Medium |
| Bold 1NV Medium | 20% Allen + 80% ERD |
| Bold 3N Medium | 2X Erdschreiber's Medium |
| Botryococcus Medium | 2X Soil + Seawater Medium |
| Bristol Medium | 5% F/2 Medium |
| CHEV Diatom Medium | ⅔ Soil + Seawater Agar Medium |
| Chu's Medium | Artificial Seawater Medium |
| CR1 Diatom Medium | BG11-1 + .36% NaCl Medium |
| CR1+ Diatom Medium | BG11-1 + 1% NaCl Medium |
| CR1-S Diatom Medium | Bold 1NV:Erdshreiber (1:1) |
| Cyanidium Medium | Bold 1NV:Erdshreiber (4:1) |
| Cyanophycean Medium | Bristol-NaCl Medium |
| Desmid Medium | Dasycladales Seawater Medium |
| DYIII Medium | Enriched Seawater Medium |
| Euglena Medium | Erdschreiber's Medium |
| HEPES Medium | ES/10 Enriched Seawater Medium |
| J Medium | ES/2 Enriched Seawater Medium |
| Malt Medium | ES/4 Enriched Seawater Medium |

TABLE 4-continued

| Algal Media. | |
|---|---|
| Fresh Water Media | Salt Water Media |
| MES Medium | F/2 Medium |
| Modified Bold 3N Medium | F/2 + NH4 |
| Modified COMBO Medium | LDM Medium |
| N/20 Medium | Modified 2 X CHEV |
| Ochromonas Medium | Modified 2 X CHEV + Soil |
| P49 Medium | Modified Artificial Seawater Medium |
| Polytomella Medium | Modified CHEV |
| Proteose Medium | Porphridium Medium |
| Snow Algae Media | Soil + Seawater Medium |
| Soil Extract Medium | SS Diatom Medium |
| Soilwater: BAR Medium | |
| Soilwater: GR– Medium | |
| Soilwater: GR–/NH4 Medium | |
| Soilwater: GR+ Medium | |
| Soilwater: GR+/NH4 Medium | |
| Soilwater: PEA Medium | |
| Soilwater: Peat Medium | |
| Soilwater: VT Medium | |
| Spirulina Medium | |
| Tap Medium | |
| Trebouxia Medium | |
| Volvocacean Medium | |
| Volvocacean-3N Medium | |
| Volvox Medium | |
| Volvox-Dextrose Medium | |
| Waris Medium | |
| Waris + Soil Extract Medium | |

A medium suitable for culturing *Chlorella protothecoides* comprises Proteose Medium. This medium is suitable for axenic cultures, and a 1L volume of the medium (pH ~6.8) can be prepared by addition of 1 g of proteose peptone to 1 liter of Bristol Medium. Bristol medium comprises 2.94 mM $NaNO_3$, 0.17 mM $CaCl_2.2H_2O$, 0.3 mM $MgSO_4.7H_2O$, 0.43 mM, 1.29 mM $KH_2PO_4$, and 1.43 mM NaCl in an aqueous solution. For 1.5% agar medium, 15 g of agar can be added to 1 L of the solution. The solution is covered and autoclaved, and then stored at a refrigerated temperature prior to use.

Other suitable media for use with the methods of the invention can be readily identified by consulting the URL identified above, or by consulting other organizations that maintain cultures of microorganisms, SAG the Culture Collection of Algae at the University of Göttingen (Göttingen, Germany), CCAP the culture collection of algae and protozoa managed by the Scottish Association for Marine Science (Scotland, United Kingdom), and CCALA the culture collection of algal laboratory at the Institute of Botany (Třeboň, Czech Republic).

The present methods are particularly suitable for microalgae having a high lipid content (e.g., at least 20% lipids by dry weight). Process conditions can be adjusted to increase the percentage weight of cells that is lipid. For example, in certain embodiments, a microbe (e.g., a microalgae) is cultured in the presence of a limiting concentration of one or more nutrients, such as, for example, nitrogen and/or phosphorous and/or sulfur, while providing an excess of fixed carbon energy such as glucose. Nitrogen limitation tends to increase microbial lipid yield over microbial lipid yield in a culture in which nitrogen is provided in excess. In particular embodiments, the increase in lipid yield is from at least about 10% to 100% to as much as 500% or more. The microbe can be cultured in the presence of a limiting amount of a nutrient for a portion of the total culture period or for the entire period. In particular embodiments, the nutrient concentration is cycled between a limiting concentration and a non-limiting concentration at least twice during the total culture period.

To increase lipid as a percentage of dry cell weight, acetate can be employed in the feedstock for a lipid-producing microbe (e.g., a microalgae). Acetate feeds directly into the point of metabolism that initiates fatty acid synthesis (i.e., acetyl-CoA); thus providing acetate in the culture can increase fatty acid production. Generally, the microbe is cultured in the presence of a sufficient amount of acetate to increase microbial lipid yield, and/or microbial fatty acid yield, specifically, over microbial lipid (e.g., fatty acid) yield in the absence of acetate. Acetate feeding is a useful component of the methods provided herein for generating microalgal biomass that has a high percentage of dry cell weight as lipid.

In a steady growth state, the cells accumulate oil (lipid) but do not undergo cell division. In one embodiment of the invention, the growth state is maintained by continuing to provide all components of the original growth media to the cells with the exception of a fixed nitrogen source. Cultivating microalgae cells by feeding all nutrients originally provided to the cells except a fixed nitrogen source, such as through feeding the cells for an extended period of time, can result in a high percentage of dry cell weight being lipid. In some embodiments, the nutrients, such as trace metals, phosphates, and other components, other than a fixed carbon source, can be provided at a much lower concentration than originally provided in the starting fermentation to avoid "overfeeding" the cells with nutrients that will not be used by the cells, thus reducing costs.

In other embodiments, high lipid (oil) biomass can be generated by feeding a fixed carbon source to the cells after all fixed nitrogen has been consumed for extended periods of time, such as from at least 8 to 16 or more days. In some embodiments, cells are allowed to accumulate oil in the presence of a fixed carbon source and in the absence of a fixed nitrogen source for over 30 days. Preferably, microorganisms grown using conditions described herein and known in the art comprise lipid in a range of from at least about 20% lipid by dry cell weight to about 75% lipid by dry cell weight.

Another tool for allowing cells to accumulate a high percentage of dry cell weight as lipid involves feedstock selection. Multiple species of *Chlorella* and multiple strains within a species of *Chlorella* accumulate a higher percentage of dry cell weight as lipid when cultured in the presence of biodiesel glycerol byproduct than when cultured in the presence of equivalent concentrations of pure reagent grade glycerol. Similarly, *Chlorella* can accumulate a higher percentage of dry cell weight as lipid when cultured in the presence of an equal concentration (weight percent) mixture of glycerol and glucose than when cultured in the presence of only glucose.

Another tool for allowing cells to accumulate a high percentage of dry cell weight as lipid involves feedstock selection as well as the timing of addition of certain feedstocks. For example, *Chlorella* can accumulate a higher percentage of dry cell weight as lipid when glycerol is added to a culture for a first period of time, followed by addition of glucose and continued culturing for a second period of time, than when the same quantities of glycerol and glucose are added together at the beginning of the fermentation. See PCT Publication No. 2008/151149, incorporated herein by reference.

The lipid (oil) percentage of dry cell weight in microbial lipid production can therefore be improved, at least with respect to certain cells, by the use of certain feedstocks and temporal separation of carbon sources, as well as by holding cells in a heterotrophic growth state in which they accumulate oil but do not undergo cell division. The examples below show growing various microbes, including several strains of microalgae, to accumulate higher levels of lipids as DCW.

In another embodiment, lipid yield is increased by culturing a lipid-producing microbe (e.g., microalgae) in the presence of one or more cofactor(s) for a lipid pathway enzyme (e.g., a fatty acid synthetic enzyme). Generally, the concentration of the cofactor(s) is sufficient to increase microbial lipid (e.g., fatty acid) yield over microbial lipid yield in the absence of the cofactor(s). In a particular embodiment, the cofactor(s) are provided to the culture by including in the culture a microbe (e.g., microalgae) containing an exogenous gene encoding the cofactor(s). Alternatively, cofactor(s) may be provided to a culture by including a microbe (e.g., microalgae) containing an exogenous gene that encodes a protein that participates in the synthesis of the cofactor. In certain embodiments, suitable cofactors include any vitamin required by a lipid pathway enzyme, such as, for example: biotin or pantothenate. Genes encoding cofactors suitable for use in the invention or that participate in the synthesis of such cofactors are well known and can be introduced into microbes (e.g., microalgae), using constructs and techniques such as those described herein.

Process conditions can be adjusted to increase the yields of lipids suitable for multiple uses including, but not limited to, biodiesel. Process conditions can also be adjusted to reduce production cost. For example, in certain embodiments, a microbe (e.g., a microalgae) is cultured in the presence of a limiting concentration of one or more nutrients, such as, for example, nitrogen, phosphorus, and/or sulfur. This condition tends to increase microbial lipid yield over microbial lipid yield in a culture in which the nutrient is provided in excess. In particular embodiments, the increase in lipid yield is at least about: 10% 20 to 500%.

Limiting a nutrient may also tend to reduce the amount of biomass produced. Therefore, the limiting concentration is typically one that increases the percentage yield of lipid for a given biomass but does not unduly reduce total biomass. In exemplary embodiments, biomass is reduced by no more than about 5% to 25%. The microbe can be cultured in the presence of a limiting amount of nutrient for a portion of the total culture period or for the entire period. In particular embodiments, the nutrient concentration is cycled between a limiting concentration and a non-limiting concentration at least twice during the total culture period.

The microalgal biomass generated by the culture methods described herein comprises microalgal oil (lipid) as well as other constituents generated by the microorganisms or incorporated by the microorganisms from the culture medium during fermentation.

Microalgal biomass with a high percentage of oil/lipid accumulation by dry weight has been generated using different methods of culture known in the art. Microalgal biomass with a higher percentage of oil/lipid accumulation is useful in with the methods of the present invention. Li et al. describe *Chlorella vulgaris* cultures with up to 56.6% lipid by dry cell weight (DCW) in stationary cultures grown under autotrophic conditions using high iron (Fe) concentrations (Li et al., *Bioresource Technology* 99(11):4717-22 (2008). Rodolfi et al. describe *Nanochloropsis* sp. and *Chaetoceros calcitrans* cultures with 60% lipid DCW and 39.8% lipid DCW, respectively, grown in a photobioreactor under nitrogen starvation conditions (Rodolfi et al., *Biotechnology & Bioengineering* (2008) [June 18 Epub ahead of print]). Solovchenko et al. describe *Parietochloris incise* cultures with approximately 30% lipid accumulation (DCW)

when grown phototropically and under low nitrogen condtions (Solovchenko et al., *Journal of Applied Phycology* 20:245-251 (2008). *Chlorella protothecoides* can produce up to 55% lipid (DCW) grown under certain heterotrophic conditions with nitrogen starvation (Miao and Wu, *Bioresource Technology* 97:841-846 (2006). Other *Chlorella* species including *Chlorella emersonii, Chlorella sorokiniana* and *Chlorella minutissima* have been described to have accumulated up to 63% oil (DCW) when grown in stirred tank bioreactors under low-nitrogen media conditions (Illman et al., *Enzyme and Microbial Technology* 27:631-635 (2000). Still higher percent lipid accumulation by dry cell weight have been reported, including 70% lipid (DCW) accumulation in *Dumaliella tertiolecta* cultures grown in increased NaCl conditions (Takagi et al., *Journal of Bioscience and Bioengineering* 101(3): 223-226 (2006)) and 75% lipid accumulation in *Botryococcus braunii* cultures (Banerjee et al., *Critical Reviews in Biotechnology* 22(3): 245-279 (2002)).

These and other aspects and embodiments of the invention are illustrated, but not limited, by the examples below; the examples also highlight the advantages of the methods of the invention.

IV. Examples

EXAMPLE 1

Cultivation of Microalgae to Achieve High Oil Content

Microalgae strains were cultivated to achieve a high percentage of oil by dry cell weight. Cryopreserved cells were thawed at room temperature, and 500 μl of cells were added to 4.5 ml of medium (4.2 g/L $K_2HPO_4$, 3.1 g/L $NaH_2PO_4$, 0.24 g/L $MgSO_4 \cdot 7H_2O$, 0.25 g/L citric acid monohydrate, 0.025 g/L $CaCl_2$ $2H_2O$, 2 g/L yeast extract) plus 2% glucose and grown for 7 days at 28° C. with agitation (200 rpm) in a 6-well plate. Dry cell weights were determined by centrifuging 1 ml of culture at 14,000 rpm for 5 minutes in a pre-weighed Eppendorf tube. The culture supernatant was discarded and the resulting cell pellet washed with 1 ml of deionized water. The culture was again centrifuged, the supernatant discarded, and the cell pellets placed at −80° C. until frozen. Samples were then lyophilized for 24 hours and dry cell weights were calculated. For determination of total lipid in cultures, 3 ml of culture was removed and subjected to analysis using an Ankom system (Ankom Inc., Macedon, N.Y.) according to the manufacturer's protocol. Samples were subjected to solvent extraction with an Ankom XT10 extractor according to the manufacturer's protocol. Total lipid was determined as the difference in mass between acid hydrolyzed dried samples and solvent extracted, dried samples. Percent oil dry cell weight measurements are shown below in Table 5.

TABLE 5

Cultivation of microalgae to achieve high oil content.

| Species | Strain | % Oil | SEQ ID NO: |
|---|---|---|---|
| Chlorella kessleri | UTEX 397 | 39.42 | 4 |
| Chlorella kessleri | UTEX 2229 | 54.07 | 5 |
| Chlorella kessleri | UTEX 398 | 41.67 | 6 |
| Parachlorella kessleri | SAG 11.80 | 37.78 | 7 |
| Parachlorella kessleri | SAG 14.82 | 50.70 | 8 |
| Parachlorella kessleri | SAG 21.11 H9 | 37.92 | 9 |
| Prototheca stagnora | UTEX 327 | 13.14 | 10 |
| Prototheca moriformis | UTEX 1441 | 18.02 | 11 |
| Prototheca moriformis | UTEX 1435 | 27.17 | 12 |
| Chlorella minutissima | UTEX 2341 | 31.39 | 13 |

TABLE 5-continued

Cultivation of microalgae to achieve high oil content.

| Species | Strain | % Oil | SEQ ID NO: |
|---|---|---|---|
| Chlorella protothecoides | UTEX 250 | 34.24 | 1 |
| Chlorella protothecoides | UTEX 25 | 40.00 | 2 |
| Chlorella protothecoides | CCAP 211/8D | 47.56 | 3 |
| Chlorella sp. | UTEX 2068 | 45.32 | 14 |
| Chlorella sp. | CCAP 211/92 | 46.51 | 15 |
| Chlorella sorokiniana | SAG 211.40B | 46.67 | 16 |
| Parachlorella beijerinkii | SAG 2046 | 30.98 | 17 |
| Chlorella luteoviridis | SAG 2203 | 37.88 | 18 |
| Chlorella vulgaris | CCAP 211/11K | 35.85 | 19 |
| Chlorella reisiglii | CCAP 11/8 | 31.17 | 20 |
| Chlorella ellipsoidea | CCAP 211/42 | 32.93 | 21 |
| Chlorella saccharophila | CCAP 211/31 | 34.84 | 22 |
| Chlorella saccharophila | CCAP 211/32 | 30.51 | 23 |

Culturing *Chlorella protothecoides* to Achieve High Oil Content

Three fermentation processes were performed with three different media formulations with the goal of generating algal biomass with high oil content. The first formulation (Media 1) was based on medium described in Wu et al. (1994 *Science in China*, vol. 37, No. 3, pp. 326-335) and consisted of per liter: $KH_2PO_4$, 0.7 g; $K_2HPO_4$, 0.3 g; $MgSO_4 \cdot 7H_2O$, 0.3 g; $FeSO_4 \cdot 7H_2O$, 3 mg; thiamine hydrochloride, 10 μg; glucose, 20 g; glycine, 0.1 g; $H_3BO_3$, 2.9 mg; $MnCl_2 \cdot 4H_2O$, 1.8 mg; $ZnSO_4 \cdot 7H_2O$, 220 μg; $CuSO_4 \cdot 5H_2O$, 80 μg; and $NaMoO_4 \cdot 2H_2O$, 22.9 mg. The second medium (Media 2) was derived from the flask media described in Example 1 and consisted of per liter: $K_2HPO_4$, 4.2 g; $NaH_2PO_4$, 3.1 g; $MgSO_4 \cdot 7H_2O$, 0.24 g; citric acid monohydrate, 0.25 g; calcium chloride dehydrate, 25 mg; glucose, 20 g; yeast extract, 2 g. The third medium (Media 3) was a hybrid and consisted of per liter: $K_2HPO_4$, 4.2 g; $NaH_2PO_4$, 3.1 g; $MgSO_4 \cdot 7H_2O$, 0.24 g; citric acid monohydrate, 0.25 g; calcium chloride dehydrate, 25 mg; glucose, 20 g; yeast extract, 2 g; $H_3BO_3$, 2.9 mg; $MnCl_2 \cdot 4H_2O$, 1.8 mg; $ZnSO_4 \cdot 7H_2O$, 220 μg; $CuSO_4 \cdot 5H_2O$, 80 μg; and $NaMoO_4 \cdot 2H_2O$, 22.9 mg. All three media formulations were prepared and autoclave sterilized in lab scale fermentor vessels for 30 minutes at 121° C. Sterile glucose was added to each vessel following cool down post autoclave sterilization.

Inoculum for each fermentor was *Chlorella protothecoides* (UTEX 250), prepared in two flask stages using the medium and temperature conditions of the fermentor inoculated. Each fermentor was inoculated with 10% (v/v) mid-log culture. The three lab scale fermentors were held at 28° C. for the duration of the experiment. The microalgal cell growth in Media 1 was also evaluated at a temperature of 23° C. For all fermentor evaluations, pH was maintained at 6.6-6.8, agitations at 500 rpm, and airflow at 1 vvm. Fermentation cultures were cultivated for 11 days. Biomass accumulation was measured by optical density at 750 nm and dry cell weight.

Lipid/oil concentration was determined using direct transesterification with standard gas chromatography methods. Briefly, samples of fermentation broth with biomass was blotted onto blotting paper and transferred to centrifuge tubes and dried in a vacuum oven at 65-70° C. for 1 hour. When the samples were dried, 2 mL of 5% $H_2SO_4$ in methanol was added to the tubes. The tubes were then heated on a heat block at 65-70° C. for 3.5 hours, while being vortexed and sonicated intermittently. 2 ml of heptane was then added and the tubes were shaken vigorously. 2Ml of 6% $K_2CO_3$ was added and the tubes were shaken vigorously to mix and then centrifuged at 800 rpm for 2 minutes. The supernatant was then transferred to GC vials containing Na$_2$SO$_4$ drying agent and ran using standard gas chromatography methods. Percent oil/lipid was based on a dry cell weight basis. The dry cell weights for cells grown using: Media 1 at 23° C. was 9.4 g/L; Media 1 at 28° C. was 1.0 g/L, Media 2 at 28° C. was 21.2 g/L; and Media 3 at 28° C. was 21.5 g/L. The lipid/oil concentration for cells grown using: Media 1 at 23° C. was 3 g/L; Media 1 at 28° C. was 0.4 g/L; Media 2 at 28° C. was 18 g/L; and Media 3 at 28° C. was 19 g/L. The percent oil based on dry cell weight for cells grown using: Media 1 at 23° C. was 32%; Media 1 at 28° C. was 40%; Media 2 at 28° C. was 85%; and Media 3 at 28° C. was 88%. The lipid profiles (in area %, after normalizing to the internal standard) for algal biomass generated using the three different media formulations at 28° C. are summarized below in Table 6.

acid) and grown at 30° C. with 200 rpm agitation for 18-24 hours until an OD reading was over 5 OD (A600). The culture was then transferred to 7-L fermentors and switched to YP1 medium (8.5 g/L Difco Yeast Nitrogen Base without Amino Acids and Ammonium Sulfate, 3 g/L Ammonium Sulfate, 4 g/L yeast extract) with 1x DAS vitamin solution. The cultures were sampled twice per day and assayed for OD (A600), dry cell weight (DCW) and lipid concentration. When the cultures reached over 50 g/L DCW, the cultures were harvested. Based on dry cell weight, the yeast biomass contained approximately 50% oil. Two samples of yeast biomass were subjected to direct transesterification and analyzed via GC/FID for a lipid profile. The results are expressed in Area Percent, and shown in Table 7, below.

TABLE 7

| | Lipid profile of transesterified yeast biomass samples. | | | | | | | | | | | |
|---|---|---|---|---|---|---|---|---|---|---|---|---|
| | C10:0 | C12:0 | C14:0 | C15:0 | C16:0 | C16:1 | C17:0 | C18:0 | C18:1 | C18:2 | C18:3α | ≥C:20 |
| Sample 1 | 0.03 | 0.21 | 3.36 | 0.25 | 33.26 | 0.76 | 0.20 | 6.88 | 42.68 | 9.28 | 1.33 | 1.1 |
| Sample 2 | 0.02 | 0.10 | 2.18 | 0.12 | 29.94 | 0.49 | 0.16 | 8.17 | 48.12 | 7.88 | 0.84 | 1.45 |

TABLE 6

| Lipid profiles for Chlorella protothecoides grown under different media conditions. | | | |
|---|---|---|---|
| | Media 1 28° C. (in Area %) | Media 2 28° C. (in Area %) | Media 3 28° C. (in Area %) |
| C14:0 | 1.40 | 0.85 | 0.72 |
| C16:0 | 8.71 | 7.75 | 7.43 |
| C16:1 | — | 0.18 | 0.17 |
| C17:0 | — | 0.16 | 0.15 |
| C17:1 | — | 0.15 | 0.15 |
| C18:0 | 3.77 | 3.66 | 4.25 |
| C18:1 | 73.39 | 72.72 | 73.83 |
| C18:2 | 11.23 | 12.82 | 11.41 |
| C18:3 alpha | 1.50 | 0.90 | 1.02 |
| C20:0 | — | 0.33 | 0.37 |
| C20:1 | — | 0.10 | 0.39 |
| C20:1 | — | 0.25 | — |
| C22:0 | — | 0.13 | 0.11 |

Culturing Oleaginous Yeast to Achieve High Oil Content

Yeast strain Rhodotorula glutinis (DSMZ-DSM 70398) was obtained from the Deutsche Sammlung von Mikroorganismen und Zellkulturen GmbH (German Collection of Microorganism and Cell Culture, Inhoffenstraβe 7B, 38124 Braunschweig, Germany. Cryopreserved cells were thawed and added to 50 mL YPD media (described above) with 1x DAS vitamin solution (1000x: 9 g/L tricine; 0.67 g/L thiamine-HCl; 0.01 g/L d-biotin; 0.008 cyannocobalamin; 0.02 calcium pantothenate; and 0.04 g/L p-Aminobenzoic Cultivation of Rhodococcus opacus to Achieve High Oil Content A seed culture of Rhodococcus opacus PD630 (DSM 44193, Deutsche Sammlung von Mikroorganismen und Zellkuttwen GmbH) was generated using 2 ml of a cryopreserved stock inoculated into 50 ml of MSM media with 4% sucrose (see Schlegel, et al., (1961) Arch Mikrobiol 38, 209-22) in a 250 ml baffle flask. The seed culture was grown at 30° C. with 200 rpm agitation until it reached an optical density of 1.16 at 600 nm. 10 ml of the seed flask was used to inoculate cultures for lipid production under two different nitrogen conditions: 10 mM NH$_4$Cl and 18.7 mM NH$_4$Cl (each in duplicate). The growth cultures were grown at 30° C. with 200 rpm agitation for 6 days. Cells grown in the 10 mM NH$_4$Cl condition reached a maximal 57.2% (average) lipid by DCW after 6 days of culture. Cells grown in the 18.7 mM NH$_4$Cl condition reached a maximal 51.8% (average) lipid by DCW after 5 days in culture.

A sample of Rhodococcus opacus biomass was subjected to direct transesterification and analyzed via GC/FID for a lipid profile. The results were: C14:0 (2.33); C15:0 (9.08); C16:0 (24.56); C16:1 (11.07); C17:0 (10.50); 2 double bond equivalent (2DBE) C17 species (19.90); C18:0 (2.49); C18:1 (17.41); C18:2 (0.05); C19:0 (0.75) and 2DBE C19 species (1.87).

EXAMPLE 2

Diversity of Lipid Chains in Microalgal Species

Lipid samples from a subset of strains grown in Example 1, and listed in Table 5, were analyzed for lipid profile using HPLC. Results are shown below in Table 8.

TABLE 8

| Diversity of lipid chains in microalgal species. | | | | | | | | | |
|---|---|---|---|---|---|---|---|---|---|
| Microalgal Strain | C:14:0 | C:16:0 | C:16:1 | C:18:0 | C:18:1 | C:18:2 | C:18:3 | C:20:0 | C:20:1 |
| C. protothecoides (UTEX 250) | 0.57 | 10.30 | 0 | 3.77 | 70.52 | 14.24 | 1.45 | 0.27 | 0 |
| C. protothecoides (UTEX 25) | 0.61 | 8.70 | 0.30 | 2.42 | 71.98 | 14.21 | 1.15 | 0.20 | 0.24 |

TABLE 8-continued

Diversity of lipid chains in microalgal species.

| Microalgal Strain | C:14:0 | C:16:0 | C:16:1 | C:18:0 | C:18:1 | C:18:2 | C:18:3 | C:20:0 | C:20:1 |
|---|---|---|---|---|---|---|---|---|---|
| C. kessleri (UTEX 397) | 0.68 | 9.82 | 0 | 2.83 | 65.78 | 12.94 | 1.46 | 0 | 0 |
| C. kessleri (UTEX 2229) | 1.47 | 21.96 | 0 | 4.35 | 22.64 | 9.58 | 5.2 | 3.88 | 3.3 |
| Prototheca stagnora (UTEX 327) | 0 | 12.01 | 0 | 0 | 50.33 | 17.14 | 0 | 0 | 0 |
| Prototheca moriformis (UTEX 1441) | 1.41 | 29.44 | 0.70 | 3.05 | 57.72 | 12.37 | 0.97 | 0.33 | 0 |
| Prototheca moriformis (UTEX 1435) | 1.09 | 25.77 | 0 | 2.75 | 54.01 | 11.90 | 2.44 | 0 | 0 |

EXAMPLE 3

Drum Drying Microalgal Biomass

An F-tank batch of *Chlorella protothecoides* (UTEX 250) (about 1,200 gallons) was used to generate biomass for extraction processes. The batch was allowed to run for approximately 100 hours, while controlling the glucose levels at 16 g/L, after which time the corn syrup feed was terminated. Residual glucose levels dropped to approximately 0 g/L two hours later. The final broth volume was 1,120 gallons. Both in-process contamination checks and a thorough analysis of a final broth sample failed to show any signs of contamination. The microalgal biomass contained 38% oil based on dry cell weight (DCW).

The microalgal biomass was then dried on an atmospheric double drum dryer. The broth was fed through a nozzle onto the two steam-heated drums that were counter-rotating toward each other. The broth was mechanically spread by the action of the counter-rotating drums into thin split sheets on both hot cylinders. The adhering thin sheets of broth were rapidly dried conductively by the high heat flux of the condensing steam inside the drums. The steam pressure ranged from 45 to 105 psig and the drum rotational speed was adjusted to between 2 to 20 rpm. The moisture content of the biomass after drum drying was between 3-10% (by weight).

Heat-conditioning Microbial Biomass

*Chlorella protothecoides* was produced and drum dried using the methods described in Example 6. Drum dried microalgal biomass was heat conditioned using a 4-deck vertical stacked conditioner (model 424, French Oil Mill Machinery, Piqua, Ohio). Each deck held up to 2.8 cubic feet of material. The vertical stacked conditioner was preheated using 45 to 100 psig steam for about an hour before heat conditioning of the biomass. After pre-heating, the microalgal biomass was loaded onto the top deck of the vertical stacked conditioner and guided to a chute leading to the next deck below by a sweeper arm on each deck, which was mounted to a common vertical shaft powered by an electric motor. A 150 pound load of drum dried microalgal biomass filled the vertical conditioner, and in order to ensure uniform heat-conditioning, the biomass was circulated by opening the vertical stacked conditioner's bottom discharge gate valve and returning the biomass to the top of the vertical conditioner. The biomass temperature in each deck was monitored and controlled between 180 and 250° F. in order to prevent scorching. Heat-conditioning residence times were varied from 10 to 60 minutes to obtain biomass of varying moisture content. The heat-conditioned biomass was unloaded into covered polyethylene carts and immediately pressed in an oilseed press. Samples of biomass before and after heat-conditioning were analyzed for moisture and oil content.

Oil Extraction from Microalgae using a Benchtop Taby Pressen

Drum dried *Chlorella protothecoides* (UTEX 250) biomass made according to the methods above was dried such that the resulting moisture content was about 5-5.5%. The microalgal biomass contained 48.5% oil based on dry cell weight (DCW). The biomass was fed through a Taby Pressen Type 70 oil press with a 2.2 Hp motor and 70 mm screw diameter. The press was preheated to a barrel temperature of 100° C. No oil was extracted under these conditions. Another press run was performed using the same lot of drum-dried biomass with the moisture adjusted down to 0.5% moisture by weight using a forced air oven at 70° C. for 30 minutes as a conditioning step prior to feeding it into the press. The press barrel was heated to 82° C. and the drum-dried, conditioned microalgal biomass was fed through the bench-top press. Approximately 68% of the available oil (by weight) was recovered and the pressed cake, or spent biomass, was then solvent extracted to recover the residual oil. After multiple experiments with microalgal biomass of varying oil content (between 40-55% oil DCW), the pressed cake had approximately 30% oil as measured by analytical methods every time.

The analytical method for determining percent lipid/oil in a sample was based on a modified Soxlet method. Briefly, 1 gram of sample was weighed out and subjected to acid hydrolysis followed by petroleum ether solvent extraction. Both acid hydrolysis and petroleum either extraction was accelerated by heat using the MARS Microwave accelerated reaction system. The petroleum ether solvent was then evaporated and the amount of extracted lipid was determined gravimetrically.

Small Scale Solvent Extraction

Pressed cake generated from the bench top press was solvent extracted to recover the residual oil. Excess petroleum ether was added to the pressed cake (5:1 weight by volume) and mixed for a minimum of an hour at room temperature. The petroleum ether mixture was then passed through a Buchner funnel containing a 5 μm filter. The solids were collected from the filter and then subjected to 3 additional washes with petroleum ether of 2× volume each. The filtered petroleum ether mixture and washes were pooled and placed in a RotoVap (2 L) to distill the petroleum ether. The remaining oil was collected and weighed. Upon microscopic inspection of the petroleum ether extracted cake, there was no free oil detected in the cake after petroleum ether extraction. However, lipid vesicles were still seen in intact (unbroken) algae cells. This method will recover 100% of the free oil in the pressed cake, but not in intact algae cells. This small scale solvent extraction process can be used to determine the effectiveness of an expeller press at breaking or cracking the algae cells.

EXAMPLE 4

Oil Extraction from Microalgae Using a Lab Scale Komet Press

Figure 2:
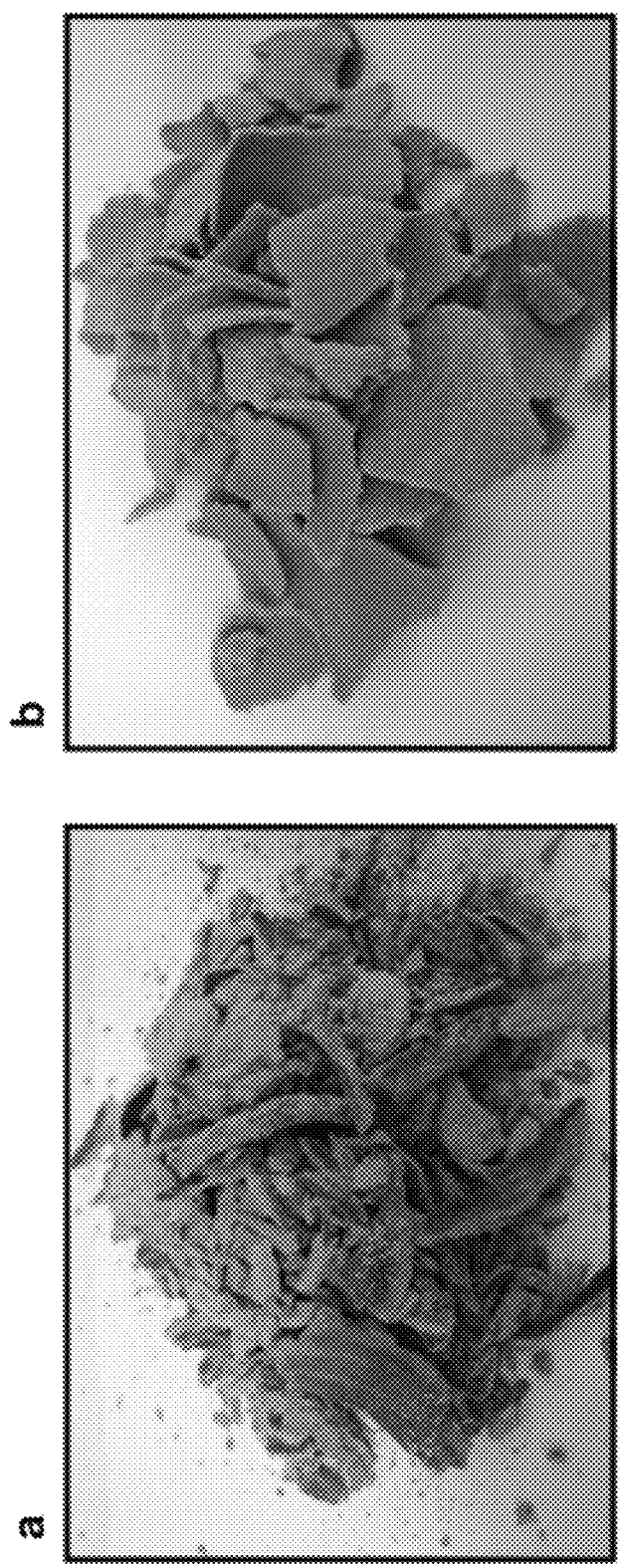
FIG. 2a shows spent pressed cake from microbial biomass that is of poor quality for subsequent solvent extraction.
FIG. 2b shows spent pressed cake from microbial biomass that is of good quality for subsequent solvent extraction.

Thirty (30) kilograms of drum dried *Chlorella protothecoides* (UTEX 250) microalgal biomass containing about 48% oil by DCW with moisture content of about 5% was run through a Komet oilseed press with a 65 mm diameter in a pre-press conditioning step with the discharge cone completely disengaged. Under this low pressure pre-press condition, no oil was released; however, the dried microalgal biomass was converted from loose flakes into pre-pressed pellets. FIG. 2a shows the drum-dried biomass material that was fed into the press. FIG. 2b shows the pre-pressed pellets. The pre-pressed pellets were collected and run through the same press under full press conditions with the discharge cone completely engaged for maximum pressure. The result was a 69% recovery of the oil from the pellets.

Spent cake from the press was then subjected to solvent extraction using iso-hexane in a percolation type extractor. The iso-hexane extraction yielded an additional 1 kg of oil. The combination of the conditioned pressing followed by the hexane extraction recovered a total of 76% of the total available oil from the dried microalgal biomass. These results are summarized in Table 9 below.

TABLE 9

Summary of results from Komet press run.

| | |
|---|---|
| Total Biomass | 30 kilograms |
| Percent Oil (DCW) | 48% |
| Total Available Oil by Weight | 14.4 kilograms |
| Recovered Virgin Oil (Conditioned pressing) | 10 kilograms |
| % Oil Recovery from Pressing | 69% |
| Available Oil by Weight After Pressing | 4.4 kilograms |
| % Oil Recovery from Hexane Extraction | 23% of available oil from the pressed cake (approx. 1 kilogram oil) |
| Total Percentage of Oil Recovered | 76% |

EXAMPLE 5

Pilot-scale Pressing of Microalgae Using a Press Aid

Microalgal biomass (*Chlorella protothecoides* UTEX 250) containing 38% oil by DCW was dried using a drum dryer with a resulting moisture content of about 3.5% (as measured by a moisture analyzer). An L-250 (3.5" diameter) French pilot scale oilseed screw press (French Oil Mill Machinery Company, Piqua, Ohio) was used in the following experiments. The core main barrel (or cage) had a diameter of 3.5 inches. The screw consisted of alternating worms and collars set up for a compression ratio of 7 to 18. The main drive was powered by a 20 horsepower electric motor and the main shaft rotational speed was 20 rpm. The cage and shaft was preheated to between 180° F. and 260° F. by using indirect steam. A cone gap of 0.5 inches, measured between cone bracket and cone mounting plate was used. The cone gap was adjusted by using the 3-position directional valves and the hand pump of the hydraulic cone cylinder.

Dried switchgrass was used as a press aid for microalgae. Drum-dried algal biomass of 38% oil DCW was mixed with switchgrass to form a 20% switchgrass/biomass, 5% switchgrass/biomass, or biomass only samples. All three algal biomass samples were separately heat conditioned in a vertical stacked conditioner (as described above) for 30 minutes at 121° C. The press was heated to a barrel temperature of 93° C. prior to the addition of the biomass. Approximately 39.5% of the total available oil (by weight) was recovered from pressing the 20% switchgrass/biomass and also yielded a good quality pressed cake for hexane extraction. Approximately 25% of the total available oil (by weight was recovered from pressing the 5% switchgrass/biomass and also yielded a good quality pressed cake for hexane extraction. The biomass only condition yielded lower oil recovery, about 5% of the total oil (by weight), and the pressed cake was of lower quality for hexane extraction.

Soybean hulls were also used as a press aid with microalgae. Drum-dried algal biomass of 38% oil DCW was mixed with soybean hulls to form a 20% soybean hull/biomass, 10% soybean hull/biomass or biomass only samples. All three algal biomass samples were separately heat conditioned in a vertical stacked conditioner for 30 minutes at 121° C. The press was heated to a barrel temperature of 93° C. prior to the addition of the biomass. The 20% soybean hull/biomass mixture did not feed through the press; therefore, no oil was recovered. Approximately 22.5% of the total available oil (by weight) was recovered from pressing the 10% soybean hull/biomass and also yielded a good quality pressed cake for hexane extraction. The biomass only condition yielded no oil and clogged the screw assembly of the expeller press. In the 5%, 20% switchgrass and 10% soybean hulls conditions, there were about 25% solids by weight in the oil recovered. The results are summarized in Table 10 below, which show the total percent oil recovered by weight with the weight of the solids subtracted out.

TABLE 10

Pressing microalgae with use of press aids.

| Press Aid | Percent added | % oil recovered | Quality of pressed cake for solvent extraction |
|---|---|---|---|
| Switchgrass | 0 | ~5% | Poor |
| Switchgrass | 5% | 24.9% | Good |
| Switchgrass | 20% | 39.5% | Good |
| Soybean hulls | 0 | none | N/A |
| Soybean hulls | 10% | 22.5% | Good |
| Soybean hulls | 20% | none | N/A |

EXAMPLE 6

Effects of Moisture Content on Oil Recovery

*Chlorella protothecoides* (UTEX 250) algal biomass of 38% oil DCW was drum dried according to the methods described in Example 3. The moisture content was measured at approximately 3 to 5% and was not conditioned prior to feeding into the screw press. 72 pounds of the biomass was fed into 3.5" oil seed screw press (French Oil Mill Company, Piqua, OH) preheated to 200° F. Heavy footing or solids was observed to be pushed between the bars of the cage throughout all sections of the press. Approximately 5% oil was recovered (after solids were removed). Solvent extraction of the pressed cake recovered an additional 58% of the total available oil (approximately 7 kgs). Analysis of the solvent extracted cake showed that there was approximately 18.6% residual oil. Total recovery (press and solvent extraction) of oil was 62%, indicating that the press only broke or lysed 62% of the microalgal cells. The poor oil recovery (5%) and the heavy footing that was observed indicated that the conditions (e.g., moisture content of the microbial biomass) were not optimal.

A series of tests were performed to establish an optimal range of moisture content for dried microbial biomass that would yield the highest recovery of oil in an expeller press. Microalgal biomass containing 51.3% oil by DCW was dried using a drum dryer. A French 3.5" oilseed press (comparable to the L250 French press) was used and the setup was identical to that described in Example 5. The dried algal biomass was heat-conditioned in a vertical stacked conditioner at 250° F. The time of heat-conditioning was varied to achieve the different moisture content levels. The press barrel was pre-heated to and maintained at 200° F. during all of the experiments, unless otherwise noted. The heat-conditioned microalgal biomass was introduced slowly into the oilseed press, while monitoring the press electrical load. The feed rate was controlled by a variable-speed screw conveyor. The feed rate was determined by adding the weights of crude oil and pressed cake collected over 2-3 minutes. Samples of each of the pressed cake from the different conditions were analyzed using analytical methods described above to measure lipid/oil content.

A second set of experiments was done with the same lot of drum-dried microalgal biomass as above. One batch of microalgal biomass was conditioned in the vertical stacked conditioner at 200° F. and had a final moisture content of 1.2%. Another batch of microalgal biomass was conditioned in the vertical stacked conditioner at 290° F. and had a final moisture content of 0.7%. Both batches were pressed in the L250, 3.5" diameter oilseed press with the barrel temperature at 200° F. The batch with the 1.2% moisture content yielded 54.3% oil recovery (by weight), which is comparable to the results from the above batch of 1.2% moisture content biomass, which yielded 48.2% oil recovery. The 0.7% moisture content condition yielded the best results, producing a good quality cake for subsequent solvent extraction and a yield of 73% oil recovery. However, the oil was slightly darker than the oil produced from the biomass that was conditioned at 200° F. Table 11 below summarizes the test moisture content and percent oil recovered (after subtracting out the solids) from these two sets of experiments.

TABLE 11

Effects of moisture content on oil recovery.

| Moisture content | % oil recovered | % oil in pressed cake | Oiling rate (g/min) | Quality of pressed cake for solvent extraction |
|---|---|---|---|---|
| 0.2% | 49.1% | 8% | 355 | Poor-burnt; powdery |
| 1% | 66.9% | 29% | 596 | Good |
| 1.2% | 48.2 | 33% | 518 | Good |
| 2.4% | 34.9% | 39% | 277 | Good |
| 1.2%; conditioning temp 200° F. | 54.3% | 32% | 520 | Good |
| 0.7%; conditioning temp 290° F. | 73% | 16% | 697 | Good; Oil was slightly darker than 200° F. runs |

The results from these two sets of experiments indicated that the optimum moisture content to achieve the highest percent oil recovery and a good quality pressed cake for subsequent solvent extraction in this Example is between 0.7% and 1.2%. This range of moisture content in the microalgal biomass also produced less solids in the oil (less than 25% by weight). Other similar experiments showed that a moisture content below 0.5% resulted in heavy footing (solids) in the oil (over 40% by weight), which impacts overall yield, and produced a burnt, powdery, poor quality cake that was not suitable for subsequent solvent extraction (See FIG. 2a). At a moisture content higher than 1.2%, the overall yield of oil was lower, but the pressed cake produced was of very good quality for subsequent solvent extraction (See FIG. 2b). This result indicates that moisture content plays a major role in the quality and texture of the pressed cake from microbial biomass, and there is an inhibition of percent oil yield if the moisture content is too high.

EXAMPLE 7

Prototheca in Lab Press with Lipid Profile of Pressed, Extracted, and Combined Materials Approximately 2 kg of drum-dried *Prototheca moriformis* algal biomass with 60% lipid DCW was pressed using a bench-top Taby Type 70 press (see Example 8 above for press conditions). The dried biomass was heat conditioned in a forced air oven at 212° F. for 30 minutes. The press was preheated to 200° F. and 235.5 grams of oil was recovered (19%), after solids were removed. The oil was collected and analyzed for lipid profile (expressed as area %), chlorophyll and carotenoid content using standard methods. The residual oil in the pressed cake was recovered via a batch extraction with petroleum ether (as described in Example 3). A total of 311 grams of oil was extracted out of 961 grams of pressed cake. The extracted oil was also analyzed for lipid profile (expressed as area %), chlorophyll and carotenoids, which are summarized below. Overall, the lipid profile, chlorophyll and carotenoid content from pressed oil and solvent extracted oil were very similar.

TABLE 12

Lipid profile of oil extracted from *Prototheca moriformis*.

| | Pressed oil (Area %) | Solvent extracted oil (Area %) |
|---|---|---|
| C12:0 | 0.05 | 0.05 |
| C14:0 | 1.36 | 1.37 |
| C14:1 | 0.02 | 0.02 |
| C15:0 | 0.04 | 0.04 |
| C16:0 | 19.90 | 20.11 |
| C16:1 | 0.85 | 0.85 |
| C18:0 | 4.11 | 4.15 |
| C18:1 | 64.81 | 64.56 |
| C18:2 | 7.83 | 7.83 |
| C20:0 | 0.03 | 0.03 |

TABLE 13

Carotenoid and chlorophyll content in oil extracted from *Prototheca moriformis*.

| | Pressed oil (mcg/ml) | Solvent extracted oil (mcg/ml) |
|---|---|---|
| cis-Lutein | 0.041 | 0.042 |
| trans-Lutein | 0.140 | 0.112 |
| trans-Zeaxanthin | 0.045 | 0.039 |
| cis-Zeaxanthin | 0.007 | 0.013 |
| t-alpha-Cryptoxanthin | 0.007 | 0.010 |
| t-beta-Cryptoxanthin | 0.009 | 0.010 |
| t-alpha-Carotene | 0.003 | 0.001 |

TABLE 13-continued

Carotenoid and chlorophyll content in oil extracted
from *Prototheca morifomis*.

| | Pressed oil (mcg/ml) | Solvent extracted oil (mcg/ml) |
|---|---|---|
| c-alpha-Carotene | none detected | none detected |
| t-beta-Carotene | 0.010 | 0.009 |
| 9-cis-beta-Carotene | 0.004 | 0.002 |
| Lycopene | none detected | none detected |
| Total Carotenoids | 0.267 | 0.238 |
| Chlorophyll | <0.01 mg/kg | <0.01 mg/kg |

Additionally, elemental analysis was also performed on pressed oil and solvent extracted oil from *Prototheca moriformis* using ICP mass spectrometry. The results are summarized below in Table 14.

TABLE 14

Elemental analysis of oil extracted from *Prototheca moriformis*.

| | Pressed oil (ppm) | Solvent extracted oil (ppm) |
|---|---|---|
| Lithium | <2 | <2 |
| Beryllium | <2 | <2 |
| Boron | <2 | <2 |
| Sodium | 12 | 12 |
| Magnesium | <2 | 2 |
| Aluminum | 8 | 8 |
| Phosphorus | <2 | <2 |
| Potassium | 12 | 26 |
| Calcium | 11 | <2 |
| Scandium | <2 | <2 |
| Titanium | <2 | <2 |
| Vanadium | <2 | <2 |
| Chromium | <2 | <2 |
| Manganese | <2 | <2 |
| Iron | <2 | <2 |
| Cobalt | <2 | <2 |
| Nickel | <2 | <2 |
| Copper | <2 | <2 |
| Zinc | <2 | <2 |
| Gallium | <2 | <2 |
| Germanium | <2 | <2 |
| Arsenic | <2 | <2 |
| Selenium | <2 | <2 |
| Rubidium | <2 | <2 |
| Strontium | <2 | <2 |
| Yttrium | <2 | <2 |
| Zirconium | <2 | <2 |
| Niobium | <2 | <2 |
| Molybdenum | <2 | <2 |
| Ruthenium | <2 | <2 |
| Rhodium | <2 | <2 |
| Palladium | <2 | <2 |
| Silver | <2 | <2 |
| Cadmium | <2 | <2 |
| Indium | <2 | <2 |
| Tin | <2 | <2 |
| Antimony | <2 | <2 |
| Tellurium | <2 | <2 |
| Cesium | <2 | <2 |
| Barium | <2 | <2 |
| Lanthanum | <2 | <2 |
| Cerium | <2 | <2 |
| Praseodymium | <2 | <2 |
| Neodymium | <2 | <2 |
| Samarium | <2 | <2 |
| Europium | <2 | <2 |
| Gadolinium | <2 | <2 |
| Terbium | <2 | <2 |
| Dysprosium | <2 | <2 |
| Holmium | <2 | <2 |
| Erbium | <2 | <2 |
| Thulium | <2 | <2 |
| Ytterbium | <2 | <2 |
| Lutetium | <2 | <2 |
| Hafnium | <2 | <2 |
| Tantalum | <2 | <2 |
| Tungsten | <2 | <2 |
| Rhenium | <2 | <2 |
| Iridium | <2 | <2 |
| Platinum | <2 | <2 |
| Gold | <2 | <2 |
| Thallium | <2 | <2 |
| Lead | <2 | <2 |
| Bismuth | <2 | <2 |
| Thorium | <2 | <2 |
| Uranium | <2 | <2 |
| Iodine | 28 | <4 |
| Sulfur (ICP) | <5 | <5 |
| Mercury | <2 | <2 |
| Chloride | <8 | <6 |

EXAMPLE 8

Pilot Scale Pressing of *Prototheca moriformis*

*Prototheca moriformis* (UTEX 1435) containing approximately 66% oil (by dry cell weight) was drum dried using the methods described in Example 3. After drum drying, the moisture content of the biomass was about 2.7%. The dried biomass was then heat-conditioned using methods described in Example 3. The moisture content of the biomass after heat-conditioning was approximately 0.6-1.4%. The algal biomass was then fed into a 3.5" oil seed screw press (French Oil Mill Company, Piqua Ohio) with the cage preheated to 195-220° F. Heavy footing was observed to be pushed between the bars of the cage, indicating that the conditions were not optimal. Approximately 47.9% oil (based on weight and theoretical calculation of available oil in the biomass) was recovered with fines (solids). The solids were removed by centrifugation and the total oil yield was 31.9% after clarification. Analysis of the pressed cake showed that there was approximately 22% (by weight of the pressed cake) residual oil. Another batch of biomass that was similarly prepared was also run through the press with similar yield in oil recovery (57.3% including solids in the oil).

EXAMPLE 9

Use of Press Aids with Oil Extraction from *Prototheca moriformis*

A series of tests were performed with different press aids on the lab-scale bench top Taby press in order to see if the addition of a press aid can increase oil yields. Different press aids were added to the fermentation broth after harvesting the biomass. The press aid/biomass were then dried together on a drum dryer and then heat-conditioned. This press aid/biomass mixture was then fed into a lab-scale Taby press under conditions described above in Example 3. A condition with no added press aid was used as a negative control.

For the negative control, 3L of fermentation broth containing biomass with 63.4% oil was dried on a drum dryer. The dried biomass was fed through the bench top press and yielded minimal amount of oil. The next condition was 3 L of fermentation broth with 150 g (5% by wet weight of the fermentation broth) cellulosic filter aid (PB20, EP Minerals, Nevada). The mixture was then dried on a drum dryer and had a moisture content of 2.25% after drum drying. The cellulose/biomass was then heat conditioned in a 110° C. oven for 20-30 minutes, to a final moisture content of 1.2%. This conditioned cellulose/biomass was then fed into the lab scale press. Based on theoretical calculations of available oil, there was approximately 145 grams of available oil in the biomass. Approximately 148 grams of oil was recovered using the lab scale press, making total oil recovery about 100%.

The next conditioned tested was the addition of 5% coarse-ground soy hulls (by wet weight). 150 grams of soy hulls was mixed with 3 L of fermentation broth containing *Prototheca moriformis* biomass. During the mixing process, it was observed that the coarse-ground soy hulls tended to settle out of solution, so constant mixing was required. The mixture was then dried on the drum dryer and had a moisture content of 6.5% after drum drying. The dried soyhull/biomass was then heat conditioned in a 110° C. oven for 20-30 minutes, to a final moisture content of 2.5%. The heat-conditioned soyhull/biomass was then fed through the lab scale screw press. Out of the calculated 162 grams of available oil, 46 grams of oil was recovered from the lab scale screw press, making total oil recovery at 28%. These experiments were repeated with another lot of *Prototheca moriformis* fermentation broth and 2% coarse ground soyhulls added, 1% soyhulls added, 2% cellulose added and 1% cellulose added. A negative control with just drum dried fermentation broth was also tested. Minimal amount of oil was recovered from the negative control. From the 2% soyhull condition, 42% of the available oil was recovered and 30% of the available oil was recovered from the 1% soyhull condition. From the 2% cellulose condition, 40% of the available oil was recovered and 10% of the available oil was recovered from the 1% cellulose condition.

Additional experiments were performed using finely ground soy hulls and dry back addition to the fermentation broth as press aids. Because the course ground soy hulls have the tendency to settle out, the course ground soy hulls were finely ground using a coffee grinder on the finest setting. After grinding, the finely ground soy hulls had a powdery texture. Dryback (2× pressed cake of *Prototheca moriformis* biomass having 5% oil content) was also ground up for this experiment. The control condition was *Prototheca moriformis* biomass with approximately 60% oil, without the addition of press aid . 150 grams of either finely ground soy hulls (5%) or ground dry back (5%) was added to 3 L of fermentation broth containing *Prototheca moriformis* biomass. The algal biomass and press aid mixture was then dried on a drum dryer. The control (*Prototheca moriformis* biomass only) condition had a moisture content of 4% after drum drying, the 5% finely ground soy hull condition had a moisture content of 2.3% after drum drying, and the 5% dry back condition had a moisture content of 2.5% after drum drying. Each of the biomass was then dried in a 110° C. oven for 20-30 minutes in order to heat condition the biomass. The final moisture content for the control biomass was 2%, the final moisture content for the 5% finely ground soy hull addition was 1.3% and the final moisture content for the 5% dry back addition was 1.01%. After heat conditioning, each of the biomass was then fed through a lab-scale Taby screw press under conditions described above in Example 3. The extracted oil and the pressed cake was collected and analyzed for an estimated yield. For the control condition, 6.7 grams of oil was collected (after removal of solids from the oil), for an approximate yield of 2.8%. Heavy footing was observed through out the press and the pressed cake clogged the discharge end of the press. In the 5% finely ground soy hull added condition, 148.2 grams of oil was collected (after removal of solids from the oil), for an approximate yield of 79.2% recovery. There was minimal amount of footing during pressing and very low amount of solids were in the pressed oil before clarification. In the 5% dryback added condition, 195.9 g of oil was collected (after removal of solids from the oil), for an approximate yield of 54.6%. There was minimal amount of footing during pressing and very small amount of solids were in the pressed oil before clarification. These results are consistent with the above results, where the addition of press aids to the fermentation broth (containing microalgae biomass) followed by co-drying on a drum drier produced biomass that had an increased oil yield when pressed on a screw press as compared to microalgal biomass with no press aid added.

Pilot Scale Pressing of Prototheca moriformis Using a Press Aid

Pilot plant scale trial were performed to evaluate ground soy hulls as press aids when dry mixing with drum dried *Prototheca moriformis* microalgal biomass. Ground soy hulls were mixed with drum dried biomass at 10 and 20% w/w based on finished weight of the mix. Then the microalgal biomass/soy hull mix was heat conditioned in a French 424 vertical stacked conditioner before being pressed in a 3.5" screw press (French Oil Mill Company, Piqua, Ohio). Oil and pressed cake were recovered and weighed to estimate yields.

A control batch of *Prototheca moriformis* biomass was prepared in a similar manner but without the inclusion of soyhulls. The control batch had an oil content of 52% (DCW) and a moisture content of 2.57% after drum drying. 70 pounds of the control batch was heat conditioned for 30 minutes in a vertical stacked conditioner at 195-223° F. and the moisture content was reduced to 0.81-0.95%. 72 pounds of 10% soy hulls added biomass with an initial moisture content of 3.30% was conditioned at 195-223.5° F. for 30 minutes and the moisture content was reduced to 1.06%. 70 pounds of the 20% soy hulls added biomass with an initial moisture content of 3.07% was heat conditioned at 208-227° F. for 30 minutes and the moisture content was reduced to 1.47%. The heat conditioned biomass was then fed into the screw press. In the control batch, 30 pounds (out of the 70 pounds that was heat conditioned) was fed through the press before the press clogged. Approximately 4.0 pounds of oil was recovered (including solids) from the 30 pounds of biomass that was fed through, making the yield approximately 20.5%. In the 10% soy hull condition, 61 pounds (out of the 72 pounds that was heat conditioned) was fed through the press and approximately 7.0 pound of oil was recovered (including solids), making the yield approximately 20%. In the 20% soy hulls test, all 70 pounds of the heat conditioned material was fed through the press, but minimal (unmeasured) amounts of oil was recovered.

With the success of the lab scale press experiments described above, the addition of press aids to the fermentation broth after harvesting the algal biomass was scaled up for a pilot scale oil screw press (3.5" oil seed screw press (French Oil Mill Company, Piqua, Ohio)). *Prototheca moriformis* biomass was prepared under three different experimental conditions: a negative control with no cellulose (PB20) added, biomass with 25 g/L cellulose added to the fermentation broth after harvesting, and biomass with 50 g/L cellulose added to the fermentation broth after harvesting. Biomass from all three conditions was dried on a drum dryer. The negative control biomass had about 58% oil content (DCW) and a moisture content of 6.68%. 140 pounds of the negative control biomass was then conditioned in a vertical stacked conditioner at 225° F. for 45 minutes and the moisture content after heat-conditioning was 2.5-3.5% The 25 g/L cellulose added biomass had a moisture content of 5.30% after drum drying. 200 pounds of the 25 g/L cellulose added biomass was then conditioned in a vertical stacked conditioner at 200° F. for 45 minutes and the moisture content after heat-conditioning was 2.5-3.5%. The 50 g/L cellulose added biomass had a moisture content of 4.35% after drum drying. 115 pounds of the 50 g/L cellulose added biomass was then conditioned in a vertical stacked conditioner at 200° F. for 45 minutes and the moisture content after heat-conditioning was 2.5-3.5%. Biomass from each experimental condition was then fed through the 3.5" oil seed press. In the negative control condition, 32.3 pounds of oil (including solids or fines in the oil) was recovered. The pressed cake from the negative control condition was analyzed for residual oil content and the cake contained 42-52% (by weight) residual oil. In the 25 g/L cellulose condition, 87.6 pounds of oil (including solids in the oil) was recovered. The pressed cake was analyzed for residual oil content and the cake contained 10-11% (by weight) residual oil. No oil was recovered from the 50 g/L cellulose added condition. The biomass did not feed through the press and clogged the press after 5 minutes.

The results from this experiment were consistent with the results from the lab-scale bench top press. Although a modest amount of oil was recovered from the negative control condition, there was still a significant amount of residual oil left in the pressed cake. The 25 g/L cellulose condition performed the best, yielding the most about of oil with the least amount of residual oil in the pressed cake. The 50 g/L cellulose condition failed to yield any oil and clogged the press after 5 minutes of running These results showed that the addition of a press-aid to the fermentation broth of the harvested microalgal biomass and the co-dried can increase the oil yield when pressed in an oil seed screw press.

Pilot Scale Two-Step Full Press of *Prototheca moriformis*

Two-step full press of *Prototheca moriformis* biomass was undertaken whereby dried, conditioned *Prototheca moriformis* biomass was pressed in an expeller press and the spent biomass was then conditioned for a second time and pressed in an expeller press for a second time.

*Prototheca moriformis* (UTEX 1435) containing approximately 62% oil (by dry cell weight) was drum dried using the methods described above in Example 3. After drum drying, the moisture content of the biomass was about 2.7%. The dried biomass was then heat-conditioned using methods described in Example 3. The moisture content of the biomass after heat-conditioning was approximately 1.7-2.1%.

A first pass pressing was performed on the heat-conditioned biomass using a 3.5" oil seed screw press (French Oil Mill Company, Piqua, Ohio) with the cage preheated to 194-220° F. Approximately 77.1% of the oil (by weight) was recovered from the microalgal biomass during this first pass. Analysis of the pressed cake showed that there was about 21% by weight residual oil.

The pressed cake was heat-conditioned a second time so that the pressed cake was about 166-197° F. The moisture content of the heat-conditioned pressed cake was approximately 1.8%. The heat-conditioned cake was then fed into the press with the cage preheated to 180-235° F. Approximately 72.5% of the oil in the cake was recovered in this second pass, based on the weight of the oil recovered in this second, the pressed cake from the second press and the calculated available oil in the pressed cake after the first pass through the screw press. By adding the oil recovered in both passes through the press, the total oil recovery achieved with both passes was approximately 92.9%.

Monosaccharide Composition of Delipidated *Prototheca moriformis* Biomass

High oil *Prototheca moriformis* biomass was then harvested and dried using a drum dryer. The dried algal biomass was lysed and the oil extracted using an expeller press as described herein. The residual oil in the pressed biomass was then solvent extracted using petroleum ether. Residual petroleum ether was evaporated from the delipidated meal using a Rotovapor (Buchi Labortechnik AG, Switzerland). Glycosyl (monosaccharide) composition analysis was then performed on the delipidated meal using combined gas chromatography/mass spectrometry (GC/MS) of the per-O-trimethylsily (TMS) derivatives of the monosaccharide methyl glycosides produced from the sample by acidic methanolysis. A sample of delipidated meal was subjected to methanolysis in 1M HCl in methanol at 80° C. for approximately 20 hours, followed by re-N-acetylation with pyridine and acetic anhydride in methanol (for detection of amino sugars). The samples were then per-O-trimethylsiylated by treatment with Tri-Sil (Pierce) at 80° C. for 30 minutes (see methods in Merkle and Poppe (1994) *Methods Enzymol.* 230: 1-15 and York et al., (1985) *Methods Enzymol.* 118:3-40). GC/MS analysis of the TMS methyl glycosides was performed on an HP 6890 GC interfaced to a 5975b MSD, using a All Tech EC-1 fused silica capillary column (30 m×0.25 mm ID). The monosaccharides were identified by their retention times in comparison to standards, and the carbohydrate character of these are authenticated by their mass spectra. 20 micrograms per sample of inositol was added to the sample before derivatization as an internal standard. The monosaccharide profile of the delipidated *Prototheca moriformis* (UTEX 1435) biomass is summarized in Table 15 below.

TABLE 15

Monosaccharide (glycosyl) composition analysis of *Prototheca moriformis* (UTEX 1435) delipidated biomass.

|  | Mass (µg) | Mole % (of total carbohydrate) |
|---|---|---|
| Arabinose | 0.6 | 1.2 |
| Xylose | n.d. | n.d. |
| Galacturonic acid (GalUA) | n.d. | n.d. |
| Mannose | 6.9 | 11.9 |
| Galactose | 14.5 | 25.2 |
| Glucose | 35.5 | 61.7 |
| N Acetyl Galactosamine (GalNAc) | n.d. | n.d. |
| N Acetyl Glucosamine (GlcNAc) | n.d. | n.d. |
| Heptose | n.d. | n.d. |
| 3 Deoxy-2-manno-2 Octulsonic acid (KDO) | n.d. | n.d. |
| Sum | 57 | 100 | n.d. = none detected

Two samples of delipidated *Prototheca moriformis* (UTEX 1435) biomass was also analyzed for dietary fiber content using AOAC Method 991.43. The dietary fiber content for the two samples was 22.89% and 33.06%.

EXAMPLE 10

Solvent Extraction of Pressed Cake from Microalgal Biomass

To maximize the total oil yield from the microalgal biomass, the pressed cake (as described in the previous Examples) was subjected to solvent extraction using a drum batch-type extractor and commercial hexane as the solvent. The pressed biomass was mixed with the commercial hexane in the extractor. Extraction of oil was performed in the drum extractor by washing the pressed cake three times with commercial hexane using a solvent to solids ratio of between 0.7:1 to 2:1. The temperature of the extractor was held at between 122° F. to 131° F., for a residence time of 1 hour for each wash and a slight vacuum of 1 to 2 inches of water. The drum extractor was rotated continuously during each wash to improving mixing the extraction efficiency.

The oil-hexane miscella leaving the extractor was filtered through a one micron filter and then evaporated to a minimum solvent content in a batch evaporation vessel. The solvent was removed by evaporation at 170° F. to 200° F. and a vacuum of 20 to 24 inches of Hg. 0.5% to 2% nitrogen was sparged to achieve low residual solvent in the crude oil. The desolventized crude oil was then packed in 5 gallon containers. The wet spent meal ("marc") was desolventized in the same drum extractor vessel after the oil-hexane miscella was pumped out. Desolventization and drying of the marc was performed in the drum extractor by heating the biomass to 220° F. to 240° F. using only indirect steam. The desolventized meal was packed in 44 gallon fiber drums.

Solvent vapors from the drum extractor and the oil evaporator were condensed and recovered in the solvent-water tank where the water and solids were removed. The reclaimed solvent was stored and can be reused in future solvent extractions.

EXAMPLE 11

Drying and Oil Extraction from Oleaginous Yeast

Oleaginous yeast strain *Rhodotorula glutinis* (DSMZ-DSM 70398) was cultured according to the methods in Example 1 to produce oleaginous yeast biomass with approximately 50% lipid by DCW. The harvested yeast broth was dried using three different methods for comparison: (1) tray dried in a forced air oven at 75° C. overnight; (2) dried on a drum dryer without concentration; and (3) the yeast broth was concentrated to 22% solids and the slurry was then dried on a drum dryer. Material from each of the three different drying conditions was heat conditioned and fed through a screw press for oil extraction. The press temperature was at 150° F. and the conditioned dried yeast biomass was held at about 190° F. until it was ready to be fed into the press.

The moisture content of the drum dried yeast broth without concentration was 5.4% and the drum dried yeast was then conditioned in an oven at 90° C. for 20 minutes. The moisture content after conditioning was 1.4%. The conditioned drum dried yeast was then fed into a bench-top Taby screw press for oil extraction. This material oiled well, with minimal footing.

The moisture content of the drum dried concentrated yeast broth was 2.1% and the drum dried concentrated yeast was then conditioned in an oven at 90° C. for 20 minutes. The moisture content after conditioning was 1.0%. The conditioned drum dried concentrated yeast was then fed into a bench-top Taby screw press for oil extraction. This material oiled well, with minimal footing.

EXAMPLE 12

Drying and Oil Extraction from Oleaginous Bacteria

Oleaginous bacteria strain *Rhodococcus opacus* PD630 (DSMZ-DSM 44193) was cultured according to the methods in Example 1 to produce oleaginous bacteria biomass with approximately 32% lipid by DCW.

The harvested *Rhodococcus opacus* broth was concentrated using centrifugation and then washed with deionized water and resuspended in 1.8L of deionized water. 50 grams of purified cellulose (PB20-Pre-co-Floc, EP Minerals, Nevada) was added to the resuspended biomass and the total solids was adjusted with deionized water to 20%. The *Rhodococcus* biomass was then dried on a drum drier and the moisture content of the *Rhodococcus* after drum drying was approximately 3%.

The drum-dried material was then heat conditioned in a oven at 130° C. for 30 minutes with a resulting moisture content of approximately 1.2%. The heat conditioned biomass was then fed through a bench top Taby press (screw press) for oil extraction. The press temperature was at 209° F. and the conditioned dried yeast biomass was held at about 240° F. until it was ready to be fed into the press. Oil recovery was accompanied by heavy footing.

EXAMPLE 13

Genotyping Microalgal Strains

Microalgae samples from the 23 strains listed in Table 5 above were genotyped. Genomic DNA was isolated from algal biomass as follows. Cells (approximately 200 mg) were centifuged from liquid cultures 5 minutes at 14,000×g. Cells were then resuspended in sterile distilled water, centrifuged 5 minutes at 14,000×g and the supernatant discarded. A single glass bead ~2 mm in diameter was added to the biomass and tubes were placed at −80° C. for at least 15 minutes. Samples were removed and 150 µl of grinding buffer (1% Sarkosyl, 0.25 M Sucrose, 50 mM NaCl, 20 mM EDTA, 100 mM Tris-HCl, pH 8.0, RNase A 0.5 ug/ul) was added. Pellets were resuspended by vortexing briefly, followed by the addition of 40 ul of 5M NaCl. Samples were vortexed briefly, followed by the addition of 66 µl of 5% CTAB (Cetyl trimethylammonium bromide) and a final brief vortex. Samples were next incubated at 65° C. for 10 minutes after which they were centrifuged at 14,000×g for 10 minutes. The supernatant was transferred to a fresh tube and extracted once with 300 µl of Phenol: Chloroform: Isoamyl alcohol 12:12:1, followed by centrifugation for 5 minutes at 14,000×g. The resulting aqueous phase was transferred to a fresh tube containing 0.7 vol of isopropanol (~190 µl), mixed by inversion and incubated at room temperature for 30 minutes or overnight at 4° C. DNA was recovered via centrifugation at 14,000×g for 10 minutes. The resulting pellet was then washed twice with 70% ethanol, followed by a final wash with 100% ethanol. Pellets were air dried for 20-30 minutes at room temperature followed by resuspension in 50 µl of 10 mM TrisCl, 1 mM EDTA (pH 8.0).

Five µl of total algal DNA, prepared as described above, was diluted 1:50 in 10 mM Tris, pH 8.0. PCR reactions, final volume 20 µl, were set up as follows. Ten µl of 2× iProof HF master mix (BIO-RAD) was added to 0.4 µl primer SZ02613 (5'-TGTTGAAGAATGAGCCGGCGAC-3' (SEQ ID NO:24) at 10 mM stock concentration). This primer sequence runs from position 567-588 in Gen Bank accession no. L43357 and is highly conserved in higher plants and algal plastid genomes. This was followed by the addition of 0.4 µl primer SZ02615 (5'-CAGTGAGCTATTACG-CACTC-3' (SEQ ID NO:25) at 10 mM stock concentration). This primer sequence is complementary to position 1112-

1093 in Gen Bank accession no. L43357 and is highly conserved in higher plants and algal plastid genomes. Next, 5 µl of diluted total DNA and 3.2 µl dH$_2$O were added. PCR reactions were run as follows: 98° C., 45"; 98° C., 8"; 53° C., 12"; 72° C., 20" for 35 cycles followed by 72° C. for 1 min and holding at 25° C. For purification of PCR products, 20 µl of 10 mM Tris, pH 8.0, was added to each reaction, followed by extraction with 40 µl of Phenol:Chloroform: isoamyl alcohol 12:12:1, vortexing and centrifuging at 14,000×g for 5 minutes. PCR reactions were applied to S-400 columns (GE Healthcare) and centrifuged for 2 minutes at 3,000×g. Purified PCR products were subsequently TOPO cloned into PCR8/GW/TOPO and positive clones selected for on LB/Spec plates. Purified plasmid DNA was sequenced in both directions using M13 forward and reverse primers. Sequences from the 23 microalgal strains are listed as SEQ ID NOs:1-23 in the attached Sequence Listing (see Table 5 for the correlation). Additionally, several Prototheca strains of microalgae (see Table 16, below) were also genotyped using the methods and primers described above. 23S rRNA genomic sequences are listed as SEQ ID NOs: 26-34 in the attached Sequence Listing and are described below.

TABLE 16

Prototheca microalgal strains.

| Species | Strain | SEQ ID NO. |
|---|---|---|
| Prototheca kruegani | UTEX 329 | SEQ ID NO: 26 |
| Prototheca wickerhamii | UTEX 1440 | SEQ ID NO: 27 |
| Prototheca stagnora | UTEX 1442 | SEQ ID NO: 28 |
| Prototheca moriformis | UTEX 288 | SEQ ID NO: 29 |
| Prototheca moriformis | UTEX 1439; 1441; 1435; 1437 | SEQ ID NO: 30 |
| Prototheca wikerhamii | UTEX 1533 | SEQ ID NO: 31 |
| Prototheca moriformis | UTEX 1434 | SEQ ID NO: 32 |
| Prototheca zopfii | UTEX 1438 | SEQ ID NO: 33 |
| Prototheca moriformis | UTEX 1436 | SEQ ID NO: 34 |

Genotyping Oleaginous Yeast Strains

Genotyping of 48 different strains of oleaginous yeast was performed. Genomic DNA was isolated from each of the 48 different strains of oleaginous yeast biomass as follows. Cells (approximately 200 mg) were centrifuged from liquid cultures 5 minutes at 14,000×g. Cells were then resuspended in sterile distilled water, centrifuged 5 minutes at 14,000×g and the supernatant discarded. A single glass bead ~2 mm in diameter was added to the biomass and tubes were placed at −80° C. for at least 15 minutes. Samples were removed and 150 µl of grinding buffer (1% Sarkosyl, 0.25 M Sucrose, 50 mM NaCl, 20 mM EDTA, 100 mM Tris-HCl, pH 8.0, RNase A 0.5 ug/ul) was added. Pellets were resuspended by vortexing briefly, followed by the addition of 40 ul of 5M NaCl. Samples were vortexed briefly, followed by the addition of 66 µl of 5% CTAB (Cetyl trimethylammonium bromide) and a final brief vortex. Samples were next incubated at 65° C. for 10 minutes after which they were centrifuged at 14,000×g for 10 minutes. The supernatant was transferred to a fresh tube and extracted once with 300 µl of Phenol: Chloroform:Isoamyl alcohol 12:12:1, followed by centrifugation for 5 minutes at 14,000×g. The resulting aqueous phase was transferred to a fresh tube containing 0.7 vol of isopropanol (~190 µl), mixed by inversion and incubated at room temperature for 30 minutes or overnight at 4° C. DNA was recovered via centrifugation at 14,000×g for 10 minutes. The resulting pellet was then washed twice with 70% ethanol, followed by a final wash with 100% ethanol. Pellets were air dried for 20-30 minutes at room temperature followed by resuspension in 50 µl of 10 mM TrisCl, 1 mM EDTA (pH 8.0).

Five µl of total algal DNA, prepared as described above, was diluted 1:50 in 10 mM Tris, pH 8.0. PCR reactions, final volume 20 µl, were set up as follows. Ten µl of 2× iProof HF master mix (BIO-RAD) was added to 0.4 µl primer SZ5434 forward primer (5' GTCCCTGCCCTTTGTACACAC -3' (SEQ ID NO: 35) at 10 mM stock concentration) and 0.4 µl primer SZ5435 reverse primer (5'-TTGATATGCTTAAGT-TCAGCGGG -3' (SEQ ID NO: 36) at 10 mM stock concentration). The primers were selected based on sequence conservation between three prime regions of 18S and five prime regions of fungal 26S rRNA genes. By reference, the forward primer is identical to nucleotides 1632-1652 of Genbank Ascension #AY550243 and the reverse primer is identical to nucleotides 464271-464293 of Genbank Ascension #NC_001144. Next, 5 µl of diluted total DNA and 3.2 µl dH$_2$O were added. PCR reactions were run as follows: 98° C., 45 seconds; 98° C., 8 seconds; 58° C., 12 seconds; 72° C., 36 seconds for 35 cycles followed by 72° C. for 1 min and holding at 4° C. For purification of PCR products, 20 µl of 10 mM Tris, pH 8.0, was added to each reaction, followed by extraction with 40 µl of Phenol: Chloroform:isoamyl alcohol 12:12:1, vortexing and centrifuging at 14,000×g for 5 minutes. PCR reactions were applied to S-400 columns (GE Healthcare) and centrifuged for 2 minutes at 3,000×g. The resulting purified PCR products were cloned and transformed into E. coli using ZeroBlunt PCR4Blunt-TOPO vector kit (Invitrogen) according to manufacture's instructions. Sequencing reactions were carried out directly on ampicillin resistant colonies. Purified plasmid DNA was sequenced in both directions using M13 forward and reverse primers.

A list of the 48 strains of oleaginous yeast that were genotyped is summarized below in Table 17 along with the corresponding SEQ ID NOs.

TABLE 17

Oleaginous yeast strains.

| Strain Name | Strain Number | SEQ ID NO |
|---|---|---|
| Rhodotorula glutinis | DSMZ-DSM 70398 | SEQ ID NO: 37 |
| Lipomyces tetrasporus | CBS 5911 | SEQ ID NO: 37 |
| Rhodotorula glutinis var. glutinis | CBS 3044 | SEQ ID NO: 38 |
| Lipomyces tetrasporus | CBS 8664 | SEQ ID NO: 38 |
| Lipomyces tetrasporus | CBS 1808 | SEQ ID NO: 39 |
| Lipomyces tetrasporus | CBS 1810 | SEQ ID NO: 39 |
| Lipomyces starkeyi | CBS 1809 | SEQ ID NO: 40 |
| Trichosporon montevideense | CBS 8261 | SEQ ID NO: 40 |
| Yarrowia lipolytica | CBS 6331 | SEQ ID NO: 41 |
| Cryptococcus curvatus | CBS 5324 | SEQ ID NO: 42 |
| Rhodotorula mucilaginosa var. mucilaginosa | CBS 316 | SEQ ID NO: 42 |
| Cryptococcus curvatus | CBS 570 | SEQ ID NO: 42 |
| Cryptococcus curvatus | CBS 2176 | SEQ ID NO: 42 |
| Cryptococcus curvatus | CBS 2744 | SEQ ID NO: 42 |
| Cryptococcus curvatus | CBS 2754 | SEQ ID NO: 42 |
| Cryptococcus curvatus | CBS 2829 | SEQ ID NO: 42 |
| Cryptococcus curvatus | CBS 5163 | SEQ ID NO: 42 |
| Cryptococcus curvatus | CBS 5358 | SEQ ID NO: 42 |
| Trichosporon sp. | CBS 7617 | SEQ ID NO: 43 |
| Sporobolomyces alborubescens | CBS 482 | SEQ ID NO: 44 |
| Rhodotorula glutinis var. glutinis | CBS 324 | SEQ ID NO: 45 |
| Rhodotorula glutinis var. glutinis | CBS 4476 | SEQ ID NO: 46 |
| Trichosporon behrend | CBS 5581 | SEQ ID NO: 47 |
| Geotrichum histeridarum | CBS 9892 | SEQ ID NO: 48 |
| Rhodotorula aurantiaca | CBS 8411 | SEQ ID NO: 49 |
| Cryptococcus curvatus | CBS 8126 | SEQ ID NO: 49 |

TABLE 17-continued

Oleaginous yeast strains.

| Strain Name | Strain Number | SEQ ID NO |
|---|---|---|
| Trichosporon domesticum | CBS 8111 | SEQ ID NO: 50 |
| Rhodotorula toruloides | CBS 8761 | SEQ ID NO: 51 |
| Rhodotorula terpendoidalis | CBS 8445 | SEQ ID NO: 52 |
| Yarrowia lipolytica | CBS 10144 | SEQ ID NO: 53 |
| Rhodotorula glutinis var. glutinis | CBS 5805 | SEQ ID NO: 54 |
| Yarrowia lipolytica | CBS 10143 | SEQ ID NO: 55 |
| Lipomyces tetrasporus | CBS 5607 | SEQ ID NO: 56 |
| Yarrowia lipolytica | CBS 5589 | SEQ ID NO: 57 |
| Lipomyces tetrasporus | CBS 8724 | SEQ ID NO: 58 |
| Rhodosporidium sphaerocarpum | CBS 2371 | SEQ ID NO: 59 |
| Trichosporon brassicae | CBS 6382 | SEQ ID NO: 60 |
| Cryptococcus curvatus | CBS 2755 | SEQ ID NO: 61 |
| Lipomyces tetrasporus | CBS 7656 | SEQ ID NO: 61 |
| Lipomyces starkeyi | CBS 7786 | SEQ ID NO: 62 |
| Yarrowia lipolytica | CBS 6012 | SEQ ID NO: 63 |
| Trichosporon loubieri var. loubieri | CBS 8265 | SEQ ID NO: 64 |
| Geotrichum vulgare | CBS 10073 | SEQ ID NO: 65 |
| Rhodosporidium toruloides | CBS 14 | SEQ ID NO: 66 |
| Rhodotorula glutinis var. glutinis | CBS 6020 | SEQ ID NO: 67 |
| Lipomyces orientalis | CBS 10300 | SEQ ID NO: 67 |
| Rhodotorula aurantiaca | CBS 317 | SEQ ID NO: 68 |
| Torulaspora delbrueckii | CBS 2924 | SEQ ID NO: 69 |

All references cited herein, including patents, patent applications, and scientific journal publications, are hereby incorporated by reference in their entireties, whether previously specifically incorporated or not. In particular, PCT Application No. PCT/US2010/031088, filed Apr. 14, 2010, entitled "Novel Microalgal Food Compositions" is incorporated herein by reference. The publications mentioned herein are cited for the purpose of describing and disclosing reagents, methodologies and concepts that may be used in connection with the present invention. Nothing herein is to be construed as an admission that these references are prior art in relation to the inventions described herein.

Although this invention has been described in connection with specific embodiments thereof, it will be understood that it is capable of further modifications. The following claims are intended to cover any variations, uses or adaptations of the invention following, in general, the principles of the invention and including such departures from the present disclosure as come within known or customary practice within the art to which the invention pertains and as may be applied to the essential features hereinbefore set forth.

What is claimed is:

1. A method for extracting triglyceride oil from microalgal biomass, the method consisting of:
   a. drying the microalgal biomass to produce dried microalgal biomass;
   b. conditioning the dried microalgal biomass by heating the dried microalgal biomass to a temperature of from 70° C. to 150° C. to produce conditioned feedstock having a moisture content of from 0.5% to 2.5% by weight of the microalgal biomass wherein prior to said conditioning a bulking agent is added to the dried microalgal biomass; and
   c. subjecting the conditioned feedstock having a moisture content of from 0.5% to 2.5% to pressure sufficient to separate at least 25% of the total triglyceride oil from the conditioned feedstock,
   leaving spent microalgal biomass of reduced triglyceride oil content relative to the conditioned feedstock, wherein said method does not use organic solvent for the extraction.

2. The method of claim 1, wherein the triglyceride oil is extracted by an expeller press.

3. The method of claim 1, wherein more than 50% of the triglyceride oil is separated from the conditioned feedstock.

4. The method of claim 2, wherein the expeller press is a continuously rotating worm shaft within a cage having a feeder at one end and a choke at an end opposite thereof, and having openings within the cage,
   wherein the cage has an internal length that is between at least ten times to at least 20 times its internal diameter and comprises a plurality of elongated bars with at least some of the elongated bars separated by one or more spacers, the bars resting on a frame, wherein the one or more spacers between the bars form the openings, and triglyceride oil is released through the openings to a collecting vessel fluidly coupled with the cage,
   wherein the spacers between the elongated bars are of different thicknesses thereby allowing variation of the space between each elongated bar, wherein either the spacers or the gaps between the bars are from 0.005 to 0.030 inches thick,
   wherein the biomass enters the cage through the feeder, and rotation of the worm shaft advances the biomass along the cage and applies pressure to the biomass disposed between the cage and the choke, the pressure lysing cells of the biomass and releasing triglyceride oil through the openings of the cage, and spent biomass of reduced triglyceride oil content is extruded from the choke end of the cage.

5. The method of claim 4, wherein the pressure increases by a factor of between 10 and 20 from the feeder end to the choke end of the cage and does not increase by more than 100% of the pressure at the feeder end of the cage per linear foot of the cage between the feeder and choke ends of the cage.

6. The method of claim 1, wherein the moisture content of the conditioned feedstock is between 0.7% and 1.2% by weight.

7. The method of claim 1, wherein the biomass is conditioned with heat for a period of time between 10 and 60 minutes.

8. The method of claim 7, wherein a bulking agent is switchgrass, soybean hulls, dried rosemary, corn stover, cellulose, sugar cane bagasse, or spent microbial biomass that comprises between 40% and 90% polysaccharide and less than 10% triglyceride oil, and is added to the microbial biomass prior to conditioning the dried microbial biomass.

9. The method of claim 1, wherein the microalgal biomass that was cultivated through a process selected from the group consisting of a heterotrophic process, a photoautotrophic process, and a mixotrophic process.

10. The method of claim 1, wherein the microalgal biomass has a fatty acid profile of at least 4% C8-C14.

11. The method of claim 1, wherein the extracted triglyceride oil has one or more properties selected from:
    less than 0.01 milligram of chlorophyll per kilogram of triglyceride oil; or
    one or more of the following: no more than 8 ppm chloride, no more than 2 ppm phosphorus, no more than 26 ppm potassium, no more than 12 ppm sodium, and no more than 5 ppm sulfur.

12. The method of claim 1, wherein the spent biomass comprises less than 40% triglyceride oil by weight.

13. The method of claim 12, wherein the spent biomass comprises less than 20% triglyceride oil by weight.

14. The method of claim 13, wherein the spent biomass comprises less than 10% triglyceride oil by weight.

15. The method of claim 14, wherein the spent biomass comprises less than 5% triglyceride oil by weight.

16. The method of claim 1, wherein the pressure is applied mechanically.

17. The method of claim 1, wherein the pressure that is applied mechanically is applied by an expeller press.

18. A method for extracting triglyceride oil from microalgal biomass, the method consisting of:
    a. drying the microalgal biomass to produce dried microalgal biomass;
    b. conditioning the dried microalgal biomass by heating to a temperature of from 70° C. to 150° C. to produce conditioned feedstock having a moisture content of from 0.5% to 2.5% by weight of the microalgal biomass wherein prior to said conditioning a bulking agent is added to the dried microalgal biomass; and
    c. subjecting the conditioned feedstock having a moisture content of from 0.5% to 2.5% to pressure sufficient to separate at least 5% of the total triglyceride oil from the conditioned feedstock and leaving spent biomass of reduced triglyceride oil content relative to the conditioned feedstock, wherein said method does not use organic solvent for the extraction.

19. The method of claim 18, wherein the microalgal biomass is derived from microalgae of the genus *Chlorella* or the genus *Prototheca*.

20. The method of claim 19, wherein the moisture content is from 0.5% to 2.0% by weight.

21. The method of claim 20, wherein the moisture content is from 0.7% to 1.2% by weight.

22. The method of claim 18, wherein the pressure is applied mechanically.

23. The method of claim 22, wherein the pressure that is applied mechanically is applied by a expeller press.

* * * * *

SEQUENCE LISTING

```
<160> NUMBER OF SEQ ID NOS: 76

<210> SEQ ID NO 1
<211> LENGTH: 565
<212> TYPE: DNA
<213> ORGANISM: Chlorella protothecoides

<400> SEQUENCE: 1
tgttgaagaa tgagccggcg acttagaaaa agtggcgtgg ttaaggaaaa attccgaagc      60
cttagcgaaa gcgagtctga atagggcgat caaatatttt aatatttaca atttagtcat     120
tttttctaga cccgaacccg ggtgatctaa ccatgaccag gatgaaactt gggtgatacc     180
aagtgaaggt ccgaaccgac cgatgttgaa aaatcggcgg atgagttgtg gttagcggtg     240
aaataccagt cgaacccgga gctagctggt tctccccgaa atgcgttgag gcgcagcagt     300
acatctagtc tatctagggg taaagcactg tttcggtgcg ggctgtgaaa acggtaccaa     360
atcgtggcaa actctgaata ctagaaatga cggtgtagta gtgagactgt ggggggataag    420 ctccattgtc aagagggaaa cagcccagac caccagctaa ggcccaaaa tggtaatgta     480 gtgacaaagg aggtgaaaat gcaaacacaa ccaggaggtt ggcttagaag cagccatcct    540
ttaaagagtg cgtaatagct cactg                                          565

<210> SEQ ID NO 2
<211> LENGTH: 546
<212> TYPE: DNA
<213> ORGANISM: Chlorella protothecoides

<400> SEQUENCE: 2
tgttgaagaa tgagccggcg acttagaaaa cgtggcaagg ttaaggaaac gtatccggag      60
ccgaagcgaa agcaagtctg aacagggcga ttaagtcatt ttttctagac ccgaacccgg     120
gtgatctaac catgaccagg atgaagcttg ggtgacacca agtgaaggtc cgaaccgacc     180
gatgttgaaa aatcggcgga tgagttgtgg ttagcggtga ataccagtc gaactcggag      240 ctagctggtt ctccccgaaa tgcgttgagg cgcagcggtt cataaggctg tctagggta     300
```

```
aagcactgtt tcggtgcggg ctgcgaaagc ggtaccaaat cgtggcaaac tctgaatact    360
agatatgcta tttatgggcc agtgagacgg tgggggataa gcttcatcgt cgagagggaa    420
acagcccaga tcactagcta aggccccaaa atgatcgtta agtgacaaag gaggtgagaa    480
tgcagaaaca accaggaggt ttgcttagaa gcagccaccc tttaaagagt gcgtaatagc    540
tcactg                                                               546
```

<210> SEQ ID NO 3
<211> LENGTH: 565
<212> TYPE: DNA
<213> ORGANISM: Chlorella protothecoides

<400> SEQUENCE: 3

```
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt ggggataag    420 ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565
```

<210> SEQ ID NO 4
<211> LENGTH: 565
<212> TYPE: DNA
<213> ORGANISM: Chlorella kessleri

<400> SEQUENCE: 4

```
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt ggggataag    420 ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565
```

<210> SEQ ID NO 5
<211> LENGTH: 548
<212> TYPE: DNA
<213> ORGANISM: Chlorella kessleri

<400> SEQUENCE: 5

```
tgttgaagaa tgagccggcg acttagaaga agtggcttgg ttaaggataa ctatccggag     60
ccagagcgaa agcaagtctg aatagggcgc ttaaggtca cttttctag acccgaaccc    120
```

```
gggtgatcta accatgacca ggatgaagct tgggtaacac cacgtgaagg tccgaaccga      180
ccgatgttga aaatcggcg  gatgagttgt ggttagcggt gaaataccaa tcgaactcgg      240
agctagctgg ttctccccga aatgcgttga ggcgcagcgg tttatgaggc tgtctagggg      300
taaagcactg tttcggtgcg ggctgcgaaa gcggtaccaa atcgtggcaa actctgaata      360
ctagatatgc tattcatgag ccagtgagac ggtgggggat aagcttcatc gtcaagaggg      420
aaacagccca gatcaccagc taaggcccca aaatggtcgt taagtggcaa aggaggtgag      480
aatgctgaaa caaccaggag gtttgcttag aagcagccac cctttaaaga gtgcgtaata      540
gctcactg                                                              548
```

```
<210> SEQ ID NO 6
<211> LENGTH: 548
<212> TYPE: DNA
<213> ORGANISM: Chlorella kessleri

<400> SEQUENCE: 6
tgttgaagaa tgagccggcg acttagaaga agtggcttgg ttaaggataa ctatccggag      60
ccagagcgaa agcaagtctg aatagggcgc ttaaaggtca cttttctag  acccgaaccc      120 gggtgatcta accatgacca ggatgaagct tgggtaacac cacgtgaagg tccgaaccga      180
ccgatgttga aaatcggcg  gatgagttgt ggttagcggt gaaataccaa tcgaactcgg      240
agctagctgg ttctccccga aatgcgttga ggcgcagcgg tttatgaggc tgtctagggg      300
taaagcactg tttcggtgcg ggctgcgaaa gcggtaccaa atcgtggcaa actctgaata      360
ctagatatgc tattcatgag ccagtgagac ggtgggggat aagcttcatc gtcaagaggg      420
aaacagccca gatcaccagc taaggcccca aaatggtcgt taagtggcaa aggaggtgag      480
aatgctgaaa caaccaggag gtttgcttag aagcagccac cctttaaaga gtgcgtaata      540
gctcactg                                                              548
```

```
<210> SEQ ID NO 7
<211> LENGTH: 548
<212> TYPE: DNA
<213> ORGANISM: Parachlorella kessleri

<400> SEQUENCE: 7
tgttgaagaa tgagccggcg acttagaaga agtggcttgg ttaaggataa ctatccggag      60
ccagagcgaa agcaagtctg aatagggcgc ttaaaggtca cttttctag  acccgaaccc      120 gggtgatcta accatgacca ggatgaagct tgggtaacac cacgtgaagg tccgaaccga      180
ccgatgttga aaatcggcg  gatgagttgt ggttagcggt gaaataccaa tcgaactcgg      240
agctagctgg ttctccccga aatgcgttga ggcgcagcgg tttatgaggc tgtctagggg      300
taaagcactg tttcggtgcg ggctgcgaaa gcggtaccaa atcgtggcaa actctgaata      360
ctagatatgc tattcatgag ccagtgagac ggtgggggat aagcttcatc gtcaagaggg      420
aaacagccca gatcaccagc taaggcccca aaatggtcgt taagtggcaa aggaggtgag      480
aatgctgaaa caaccaggag gtttgcttag aagcagccac cctttaaaga gtgcgtaata      540
gctcactg                                                              548
```

```
<210> SEQ ID NO 8
<211> LENGTH: 548
<212> TYPE: DNA
<213> ORGANISM: Parachlorella kessleri

<400> SEQUENCE: 8
```

```
tgttgaagaa tgagccggcg acttagaaga agtggcttgg ttaaggataa ctatccggag    60
ccagagcgaa agcaagtctg aatagggcgc ttaaaggtca ctttttctag acccgaaccc   120
gggtgatcta accatgacca ggatgaagct tgggtaacac cacgtgaagg tccgaaccga   180
ccgatgttga aaaatcggcg gatgagttgt ggttagcggt gaaataccaa tcgaactcgg   240
agctagctgg ttctccccga aatgcgttga ggcgcagcgg tttatgaggc tgtctagggg   300
taaagcactg tttcggtgcg ggctgcgaaa gcggtaccaa atcgtggcaa actctgaata   360
ctagatatgc tattcatgag ccagtgagac ggtgggggat aagcttcatc gtcaagaggg   420
aaacagccca gatcaccagc taaggcccca aaatggtcgt taagtggcaa aggaggtgag   480
aatgctgaaa caaccaggag gtttgcttag aagcagccac cctttaaaga gtgcgtaata   540
gctcactg                                                            548

<210> SEQ ID NO 9
<211> LENGTH: 565
<212> TYPE: DNA
<213> ORGANISM: Parachlorella kessleri

<400> SEQUENCE: 9
tgttgaagaa tgagccggcg acttagaaaa agtggcgtgg ttaaggaaaa attccgaagc    60
cttagcgaaa gcgagtctga atagggcgat caaatatttt aatatttaca atttagtcat   120
tttttctaga cccgaacccg ggtgatctaa ccatgaccag gatgaaactt gggtgatacc   180
aagtgaaggt ccgaaccgac cgatgttgaa aaatcggcgg atgagttgtg gttagcggtg   240
aaataccagt cgaacccgga gctagctggt tctccccgaa atgcgttgag gcgcagcagt   300
acatctagtc tatctagggg taaagcactg tttcggtgcg ggctgtgaaa acggtaccaa   360
atcgtggcaa actctgaata ctagaaatga cggtgtagta gtgagactgt ggggataag   420 ctccattgtc aagagggaaa cagcccagac caccagctaa ggccccaaaa tggtaatgta   480
gtgacaaagg aggtgaaaat gcaaacacaa ccaggaggtt ggcttagaag cagccatcct   540
ttaaagagtg cgtaatagct cactg                                         565

<210> SEQ ID NO 10
<211> LENGTH: 541
<212> TYPE: DNA
<213> ORGANISM: Prototheca stagnora

<400> SEQUENCE: 10
tgttgaagaa tgagccggcg agttaaaaaa aatggcatgg ttaaagatat ttctctgaag    60
ccatagcgaa agcaagtttt acaagctata gtcattttt ttagacccga aaccgagtga   120
tctacccatg atcagggtga agtgttggtc aaataacatg gaggcccgaa ccgactaatg   180
gtgaaaaatt agcggatgaa ttgtgggtag gggcgaaaaa ccaatcgaac tcggagttag   240
ctggttctcc ccgaaatgcg tttaggcgca gcagtagcaa cacaaataga ggggtaaagc   300 actgttttctt ttgtgggctt cgaaagttgt acctcaaagt ggcaaactct gaatactcta   360
tttagatatc tactagtgag accttggggg ataagctcct tggtcaaaag ggaaacagcc   420
cagatcacca gttaaggccc caaaatgaaa atgatagtga ctaaggacgt gagtatgtca   480
aaacctccag caggttagct tagaagcagc aatcctttca agagtgcgta atagctcact   540
g                                                                   541

<210> SEQ ID NO 11
```

```
<211> LENGTH: 573
<212> TYPE: DNA
<213> ORGANISM: Prototheca moriformis

<400> SEQUENCE: 11
tgttgaagaa tgagccggcg acttaaaata aatggcaggc taagagaatt aataactcga      60
aacctaagcg aaagcaagtc ttaatagggc gctaatttaa caaaacatta aataaaatct     120
aaagtcattt attttagacc cgaacctgag tgatctaacc atggtcagga tgaaacttgg     180
gtgacaccaa gtggaagtcc gaaccgaccg atgttgaaaa atcggcggat gaactgtggt     240
tagtggtgaa ataccagtcg aactcagagc tagctggttc tccccgaaat gcgttgaggc     300
gcagcaatat atctcgtcta tctaggggta aagcactgtt tcggtgcggg ctatgaaaat     360
ggtaccaaat cgtggcaaac tctgaatact agaaatgacg atatattagt gagactatgg     420
gggataagct ccatagtcga gagggaaaca gcccagacca ccagttaagg ccccaaaatg     480
ataatgaagt ggtaaaggag gtgaaaatgc aaatacaacc aggaggttgg cttagaagca     540
gccatccttt aaagagtgcg taatagctca ctg                                  573

<210> SEQ ID NO 12
<211> LENGTH: 573
<212> TYPE: DNA
<213> ORGANISM: Prototheca moriformis

<400> SEQUENCE: 12
tgttgaagaa tgagccggcg acttaaaata aatggcaggc taagagaatt aataactcga      60
aacctaagcg aaagcaagtc ttaatagggc gctaatttaa caaaacatta aataaaatct     120
aaagtcattt attttagacc cgaacctgag tgatctaacc atggtcagga tgaaacttgg     180
gtgacaccaa gtggaagtcc gaaccgaccg atgttgaaaa atcggcggat gaactgtggt     240
tagtggtgaa ataccagtcg aactcagagc tagctggttc tccccgaaat gcgttgaggc     300
gcagcaatat atctcgtcta tctaggggta aagcactgtt tcggtgcggg ctatgaaaat     360
ggtaccaaat cgtggcaaac tctgaatact agaaatgacg atatattagt gagactatgg     420
gggataagct ccatagtcga gagggaaaca gcccagacca ccagttaagg ccccaaaatg     480
ataatgaagt ggtaaaggag gtgaaaatgc aaatacaacc aggaggttgg cttagaagca     540
gccatccttt aaagagtgcg taatagctca ctg                                  573

<210> SEQ ID NO 13
<211> LENGTH: 565
<212> TYPE: DNA
<213> ORGANISM: Chlorella minutissima

<400> SEQUENCE: 13
tgttgaagaa tgagccggcg acttagaaaa agtggcgtgg ttaaggaaaa attccgaagc      60
cttagcgaaa gcgagtctga atagggcgat caaatatttt aatatttaca atttagtcat     120
tttttctaga cccgaacccg ggtgatctaa ccatgaccag gatgaaactt gggtgatacc     180
aagtgaaggt ccgaaccgac cgatgttgaa aaatcggcgg atgagttgtg ttagcggtg     240
aaataccagt cgaacccgga gctagctggt tctccccgaa atgcgttgag cgcagcagt     300
acatctagtc tatctagggg taaagcactg tttcggtgcg gctgtgaaa acggtaccaa     360
atcgtggcaa actctgaata ctagaaatga cggtgtagta gtgagactgt ggggataag     420
ctccattgtc aagagggaaa cagcccagac caccagctaa ggccccaaaa tggtaatgta     480
gtgacaaagg aggtgaaaat gcaaacacaa ccaggaggtt ggcttagaag cagccatcct     540
```

<210> SEQ ID NO 14
<211> LENGTH: 565
<212> TYPE: DNA
<213> ORGANISM: Chlorella sp.

<400> SEQUENCE: 14

```
tgttgaagaa tgagccggcg acttagaaaa agtggcgtgg ttaaggaaaa attccgaagc      60
cttagcgaaa gcgagtctga atagggcgat caaatatttt aatatttaca atttagtcat     120
tttttctaga cccgaacccg ggtgatctaa ccatgaccag gatgaaactt gggtgatacc     180
aagtgaaggt ccgaaccgac cgatgttgaa aaatcggcgg atgagttgtg gttagcggtg     240
aaataccagt cgaacccgga gctagctggt tctccccgaa atgcgttgag cgcagcagt     300
acatctagtc tatctagggg taaagcactg tttcggtgcg ggctgtgaaa acggtaccaa     360
atcgtggcaa actctgaata ctagaaatga cggtgtagta gtgagactgt gggggataag     420
ctccattgtc aagagggaaa cagcccagac caccagctaa ggccccaaaa tggtaatgta     480
gtgacaaagg aggtgaaaat gcaaacacaa ccaggaggtt ggcttagaag cagccatcct     540
ttaaagagtg cgtaatagct cactg                                          565
```

<210> SEQ ID NO 15
<211> LENGTH: 546
<212> TYPE: DNA
<213> ORGANISM: Chlorella sp.

<400> SEQUENCE: 15

```
tgttgaagaa tgagccggcg acttagaaaa cgtggcaagg ttaaggacat gtatccggag      60
ccgaagcgaa agcaagtctg aatagggcgc ctaagtcatt ttttctagac ccgaacccgg     120
gtgatctaac catgaccagg atgaagcttg ggtgacacca agtgaaggtc cgaaccgacc     180
gatgttgaaa aatcggcgga tgagttgtgg ttagcggtga ataccagtc gaactcggag      240
ctagctggtt ctccccgaaa tgcgttgagg cgcagcggtt cataaggctg tctagggta     300
aagcactgtt tcggtgcggg ctgcgaaagc ggtaccaaat cgtggcaaac tctgaatact     360
agatatgcta tttatgagcc agtgagacgg tggggataa gcttcatcgt cgagagggaa     420
acagcccaga tcactagcta aggcccctaa atgatcgtta agtgacaaag gaggtgagaa     480
tgcagaaaca accaggaggt ttgcttagaa gcagccaccc tttaaagagt gcgtaatagc     540
tcactg                                                               546
```

<210> SEQ ID NO 16
<211> LENGTH: 550
<212> TYPE: DNA
<213> ORGANISM: Chlorella sorokiniana

<400> SEQUENCE: 16

```
tgttgaagaa tgagccggcg acttatagga agtggcaggg ttaaggaaga atctccggag      60
cccaagcgaa agcgagtctg aaagggcga tttggtcact tcttatggac ccgaacctgg      120
atgatctaat catggccaag ttgaagcatg gtaacacta tgtcgaggac tgaacccacc      180
gatgttgaaa aatcggggga tgagctgtga ttagcggtga aattccaatc gaattcagag     240
ctagctggat ctccccgaaa tgcgttgagg cgcagcggcg acgatgtcct gtctaagggt     300
agagcgactg tttcggtgcg ggctgcgaaa gcggtaccaa gtcgtggcaa actccgaata     360
```

```
ttaggcaaag gattccgtga gccagtgaga ctgtggggga taagcttcat agtcaagagg    420
gaaacagccc agaccatcag ctaaggcccc taaatggctg ctaagtggaa aaggatgtga    480
gaatgctgaa acaaccagga ggttcgctta gaagcagcta ttccttgaaa gagtgcgtaa    540
tagctcactg                                                          550

<210> SEQ ID NO 17
<211> LENGTH: 548
<212> TYPE: DNA
<213> ORGANISM: Parachlorella beijerinkii

<400> SEQUENCE: 17
tgttgaagaa tgagccggcg acttagaaga agtggcttgg ttaaggataa ctatccggag     60
ccagagcgaa agcaagtctg aatagggcgc ttaaaggtca cttttctag acccgaaccc    120 gggtgatcta accatgacca ggatgaagct tgggtaacac cacgtgaagg tccgaaccga    180
ccgatgttga aaaatcggcg gatgagttgt ggttagcggt gaaataccaa tcgaactcgg    240
agctagctgg ttctccccga aatgcgttga ggcgcagcgg tttatgaggc tgtctagggg    300
taaagcactg tttcggtgcg ggctgcgaaa gcggtaccaa atcgtggcaa actctgaata    360
ctagatatgc tattcatgag ccagtgagac ggtgggggat aagcttcatc gtcaagaggg    420
aaacagccca gatcaccagc taaggcccca aaatggtcgt taagtggcaa aggaggtgag    480
aatgctgaaa caaccaggag gtttgcttag aagcagccac cctttaaaga gtgcgtaata    540
gctcactg                                                            548

<210> SEQ ID NO 18
<211> LENGTH: 556
<212> TYPE: DNA
<213> ORGANISM: Chlorella luteoviridis

<400> SEQUENCE: 18
tgttgaagaa tgagccggcg acttataggg ggtggcgtgg ttaaggaagt aatccgaagc     60
caaagcgaaa gcaagttttc aatagagcga ttttgtcacc ccttatggac ccgaacccgg    120
gtgatctaac cttgaccagg atgaagcttg ggtaacacca agtgaaggtc cgaactcatc    180
gatcttgaaa atcgtggga tgagttgggg ttagttggtt aaatgctaat cgaactcgga    240
gctagctggt tctccccgaa atgtgttgag gcgcagcgat taacgaaata ttttgtacgg    300
tttaggggta aagcactgtt tcggtgcggg ctgcgaaagc ggtaccaaat cgtggcaaac    360
tctgaatact aagcctgtat accgttagtc agtgagagta tagggataa gctctatact    420 caagagggaa acagcccaga tcaccagcta aggccccaaa atgacagcta agtggcaaag    480
gaggtgaaag tgcagaaaca accaggaggt tcgcttagaa gcagcaaccc tttaaagagt    540
gcgtaatagc tcactg                                                   556

<210> SEQ ID NO 19
<211> LENGTH: 548
<212> TYPE: DNA
<213> ORGANISM: Chlorella vulgaris

<400> SEQUENCE: 19
tgttgaagaa tgagccggcg acttagaaga agtggcttgg ttaaggataa ctatccggag     60
ccagagcgaa agcaagtctg aatagggcgc ttaaaggtca cttttctag acccgaaccc    120 gggtgatcta accatgacca ggatgaagct tgggtaacac cacgtgaagg tccgaaccga    180
ccgatgttga aaaatcggcg gatgagttgt ggttagcggt gaaataccaa tcgaactcgg    240
```

```
agctagctgg ttctccccga aatgcgttga ggcgcagcgg tttatgaggc tgtctagggg    300
taaagcactg tttcggtgcg ggctgcgaaa gcggtaccaa atcgtggcaa actctgaata    360
ctagatatgc tattcatgag ccagtgagac ggtgggggat aagcttcatc gtcaagaggg    420
aaacagccca gatcaccagc taaggcccca aaatggtcgt taagtggcaa aggaggtgag    480
aatgctgaaa caaccaggag gtttgcttag aagcagccac cctttaaaga gtgcgtaata    540
gctcactg                                                             548
```

```
<210> SEQ ID NO 20
<211> LENGTH: 565
<212> TYPE: DNA
<213> ORGANISM: Chlorella reisiglii

<400> SEQUENCE: 20
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt ctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt gggggataag    420
ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565
```

```
<210> SEQ ID NO 21
<211> LENGTH: 573
<212> TYPE: DNA
<213> ORGANISM: Chlorella ellipsoidea

<400> SEQUENCE: 21
tgttgaagaa tgagccggcg acttataggg ggtggcttgg ttaaggacta caatccgaag     60
cccaagcgaa agcaagtttg aagtgtacac acattgtgtg tctagagcga ttttgtcact    120
ccttatggac ccgaacccgg gtgatctatt catggccagg atgaagcttg ggtaacacca    180
agtgaaggtc cgaactcatc gatgttgaaa aatcgtggga tgagttgtga atagggtga    240 aatgccaatc gaactcggag ctagctggtt ctccccgaaa tgtgttgagg cgcagcgatt    300
cacgatctaa agtacggttt aggggtaaag cactgtttcg gtgcgggctg ttaacgcggt    360
accaaatcgt ggcaaactaa gaatactaaa cttgtatgcc gtgaatcagt gagactaaga    420
gggataagct tcttagtcaa gagggaaaca gcccagatca ccagctaagg ccccaaaatg    480
acagctaagt ggcaaaggag gtgagagtgc agaaacaacc aggaggtttg cttagaagca    540
gccatccttt aaagagtgcg taatagctca ctg                                 573
```

```
<210> SEQ ID NO 22
<211> LENGTH: 573
<212> TYPE: DNA
<213> ORGANISM: Chlorella saccharophila

<400> SEQUENCE: 22
tgttgaagaa tgagccggcg acttataggg ggtggcttgg ttaaggacta caatccgaag     60
```

```
cccaagcgaa agcaagtttg aagtgtacac acgttgtgtg tctagagcga tttttgtcact    120 ccttatggac ccgaacccgg gtgatctatt catggccagg atgaagcttg ggtaacacca    180
agtgaaggtc cgaactcatc gatgttgaaa atcgtggga tgagttgtga ataggggtga    240
aatgccaatc gaactcggag ctagctggtt ctccccgaaa tgtgttgagg cgcagcgatt    300
cacgatctaa agtacggttt aggggtaaag cactgtttcg gtgcgggctg ttaacgcggt    360
accaaatcgt ggcaaactaa gaatactaaa cttgtatgcc gtgaatcagt gagactaaga    420
gggataagct tcttagtcaa gagggaaaca gcccagatca ccagctaagg ccccaaaatg    480
acagctaagt ggcaaaggag gtgagagtgc agaaacaacc aggaggtttg cttagaagca    540
gccatccttt aaagagtgcg taatagctca ctg                                 573
```

<210> SEQ ID NO 23
<211> LENGTH: 573
<212> TYPE: DNA
<213> ORGANISM: Chlorella saccharophila

<400> SEQUENCE: 23

```
tgttgaagaa tgagccggcg acttataggg ggtggcttgg ttaaggacta caatccgaag    60
cccaagcgaa agcaagtttg aagtgtacac acattgtgtg tctagagcga tttttgtcact   120 ccttatggac ccgaacccgg gtgatctatt catggccagg atgaagcttg ggtaacacca   180
agtgaaggtc cgaactcatc gatgttgaaa atcgtggga tgagttgtga ataggggtga    240
aatgccaatc gaactcggag ctagctggtt ctccccgaaa tgtgttgagg cgcagcgatt   300
cacgatctaa agtacggttt aggggtaaag cactgtttcg gtgcgggctg ttaacgcggt   360
accaaatcgt ggcaaactaa gaatactaaa cttgtatgcc gtgaatcagt gagactaaga   420
gggataagct tcttagtcaa gagggaaaca gcccagatca ccagctaagg ccccaaaatg   480
acagctaagt ggcaaaggag gtgagagtgc agaaacaacc aggaggtttg cttagaagca   540
gccatccttt aaagagtgcg taatagctca ctg                                573
```

<210> SEQ ID NO 24
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 24

```
tgttgaagaa tgagccggcg ac                                             22
```

<210> SEQ ID NO 25
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 25

```
cagtgagcta ttacgcactc                                                20
```

<210> SEQ ID NO 26
<211> LENGTH: 541
<212> TYPE: DNA
<213> ORGANISM: Prototheca kruegani

<400> SEQUENCE: 26

```
tgttgaagaa tgagccggcg agttaaaaag agtggcatgg ttaaagaaaa tactctggag      60
ccatagcgaa agcaagttta gtaagcttag gtcattcttt ttagacccga aaccgagtga     120
tctacccatg atcagggtga agtgttagta aaataacatg gaggcccgaa ccgactaatg     180
ttgaaaaatt agcggatgaa ttgtgggtag gggcgaaaaa ccaatcgaac tcggagttag     240
ctggttctcc ccgaaatgcg tttaggcgca gcagtagcag tacaaataga ggggtaaagc     300 actgttttctt ttgtgggctt cgaaagttgt acctcaaagt ggcaaactct gaatactcta    360
tttagatatc tactagtgag accttggggg ataagctcct tggtcaaaag ggaaacagcc     420
cagatcacca gttaaggccc caaaatgaaa atgatagtga ctaaggatgt gggtatgtca     480
aaacctccag caggttagct tagaagcagc aatcctttca agagtgcgta atagctcact     540
g                                                                     541
```

<210> SEQ ID NO 27
<211> LENGTH: 573
<212> TYPE: DNA
<213> ORGANISM: Prototheca wickerhamii

<400> SEQUENCE: 27

```
tgttgaagaa tgagccggcg acttaaaata aatggcaggc taagagattt aataactcga      60
aacctaagcg aaagcaagtc ttaatagggc gtcaatttaa caaaacttta aataaaattat    120 aaagtcattt atttagacc cgaacctgag tgatctaacc atggtcagga tgaaacttgg     180
gtgacaccaa gtggaagtcc gaaccgaccg atgttgaaaa atcggcggat gaactgtggt     240
tagtggtgaa ataccagtcg aactcagagc tagctggttc tccccgaaat gcgttgaggc     300
gcagcaatat atctcgtcta tctaggggta aagcactgtt tcggtgcggg ctatgaaaat     360
ggtaccaaat cgtggcaaac tctgaatact agaaatgacg atatattagt gagactatgg     420
gggataagct ccatagtcga gagggaaaca gcccagacca ccagttaagg ccccaaaatg     480
ataatgaagt ggtaaaggag gtgaaaatgc aaatacaacc aggaggttgg cttagaagca     540
gccatccttt aaagagtgcg taatagctca ctg                                   573
```

<210> SEQ ID NO 28
<211> LENGTH: 541
<212> TYPE: DNA
<213> ORGANISM: Prototheca stagnora

<400> SEQUENCE: 28

```
tgttgaagaa tgagccggcg agttaaaaaa aatggcatgg ttaaagatat ttctctgaag      60
ccatagcgaa agcaagtttt acaagctata gtcatttttt ttagacccga aaccgagtga     120
tctacccatg atcagggtga agtgttggtc aaataacatg gaggcccgaa ccgactaatg     180
gtgaaaaatt agcggatgaa ttgtgggtag gggcgaaaaa ccaatcgaac tcggagttag     240
ctggttctcc ccgaaatgcg tttaggcgca gcagtagcaa cacaaataga ggggtaaagc     300 actgttttctt ttgtgggctt cgaaagttgt acctcaaagt ggcaaactct gaatactcta    360
tttagatatc tactagtgag accttggggg ataagctcct tggtcaaaag ggaaacagcc     420
cagatcacca gttaaggccc caaaatgaaa atgatagtga ctaaggacgt gagtatgtca     480
aaacctccag caggttagct tagaagcagc aatcctttca agagtgcgta atagctcact     540
g                                                                     541
```

<210> SEQ ID NO 29

```
<211> LENGTH: 541
<212> TYPE: DNA
<213> ORGANISM: Prototheca moriformis

<400> SEQUENCE: 29
tgttgaagaa tgagccggcg agttaaaaag agtggcatgg ttaaagataa ttctctggag    60
ccatagcgaa agcaagttta acaagctaaa gtcacccttt ttagacccga aaccgagtga   120
tctacccatg atcagggtga agtgttggta aaataacatg gaggcccgaa ccgactaatg   180
gtgaaaaatt agcggatgaa ttgtgggtag gggcgaaaaa ccaatcgaac tcggagttag   240
ctggttctcc ccgaaatgcg tttaggcgca gcagtagcaa cacaaataga ggggtaaagc   300
actgtttctt ttgtgggctt cgaaagttgt acctcaaagt ggcaaactct gaatactcta   360
tttagatatc tactagtgag accttggggg ataagctcct tggtcaaaag ggaaacagcc   420
cagatcacca gttaaggccc caaaatgaaa atgatagtga ctaaggatgt gggtatgtta   480
aaacctccag caggttagct tagaagcagc aatcctttca agagtgcgta atagctcact   540
g                                                                   541

<210> SEQ ID NO 30
<211> LENGTH: 573
<212> TYPE: DNA
<213> ORGANISM: Prototheca moriformis

<400> SEQUENCE: 30
tgttgaagaa tgagccggcg acttaaaata aatggcaggc taagagaatt aataactcga    60
aacctaagcg aaagcaagtc ttaatagggc gctaatttaa caaaacatta aataaaatct   120
aaagtcattt attttagacc cgaacctgag tgatctaacc atggtcagga tgaaacttgg   180
gtgacaccaa gtggaagtcc gaaccgaccg atgttgaaaa atcggcggat gaactgtggt   240
tagtggtgaa ataccagtcg aactcagagc tagctggttc tccccgaaat gcgttgaggc   300
gcagcaatat atctcgtcta tctaggggta aagcactgtt tcggtgcggg ctatgaaaat   360
ggtaccaaat cgtggcaaac tctgaatact agaaatgacg atatattagt gagactatgg   420
gggataagct ccatagtcga gagggaaaca gcccagacca ccagttaagg ccccaaaatg   480
ataatgaagt ggtaaaggag gtgaaaatgc aaatacaacc aggaggttgg cttagaagca   540
gccatccttt aaagagtgcg taatagctca ctg                                573

<210> SEQ ID NO 31
<211> LENGTH: 573
<212> TYPE: DNA
<213> ORGANISM: Prototheca wickerhamii

<400> SEQUENCE: 31
tgttgaagaa tgagccgtcg acttaaaata aatggcaggc taagagaatt aataactcga    60
aacctaagcg aaagcaagtc ttaatagggc gctaatttaa caaaacatta aataaaatct   120
aaagtcattt attttagacc cgaacctgag tgatctaacc atggtcagga tgaaacttgg   180
gtgacaccaa gtggaagtcc gaaccgaccg atgttgaaaa atcggcggat gaactgtggt   240
tagtggtgaa ataccagtcg aactcagagc tagctggttc tccccgaaat gcgttgaggc   300
gcagcaatat atctcgtcta tctaggggta aagcactgtt tcggtgcggg ctatgaaaat   360
ggtaccaaat cgtggcaaac tctgaatact agaaatgacg atatattagt gagactatgg   420
gggataagct ccatagtcga gagggaaaca gcccagacca ccagttaagg ccccaaaatg   480
ataatgaagt ggtaaaggag gtgaaaatgc aaatacaacc aggaggttgg cttagaagca   540
``` gccatcccttt aaagagtgcg taatagctca ctg 573

<210> SEQ ID NO 32
<211> LENGTH: 541
<212> TYPE: DNA
<213> ORGANISM: Prototheca moriformis

<400> SEQUENCE: 32
tgttgaagaa tgagccggcg agttaaaaag agtggcgtgg ttaaagaaaa ttctctggaa    60
ccatagcgaa agcaagttta acaagcttaa gtcactttt ttagacccga aaccgagtga   120
tctacccatg atcagggtga agtgttggta aataacatg gaggcccgaa ccgactaatg    180
gtgaaaaatt agcggatgaa ttgtgggtag gggcgaaaaa ccaatcgaac tcggagttag   240
ctggttctcc ccgaaatgcg tttaggcgca gcagtagcaa cacaaataga ggggtaaagc   300
actgtttctt ttgtgggctc cgaaagttgt acctcaaagt ggcaaactct gaatactcta   360
tttagatatc tactagtgag accttgggg ataagctcct tggtcgaaag ggaaacagcc   420
cagatcacca gttaaggccc caaaatgaaa atgatagtga ctaaggatgt gagtatgtca   480
aaacctccag caggttagct tagaagcagc aatcctttca agagtgcgta atagctcact   540
g                                                                   541

<210> SEQ ID NO 33
<211> LENGTH: 541
<212> TYPE: DNA
<213> ORGANISM: Prototheca zopfii

<400> SEQUENCE: 33
tgttgaagaa tgagccggcg agttaaaaag agtggcatgg ttaaagaaaa ttctctggag    60
ccatagcgaa agcaagttta acaagcttaa gtcactttt ttagacccga aaccgagtga   120
tctacccatg atcagggtga agtgttggta aataacatg gaggcccgaa ccgactaatg    180
gtgaaaaatt agcggatgaa ttgtgggtag gggcgaaaaa ccaatcgaac tcggagttag   240
ctggttctcc ccgaaatgcg tttaggcgca gcagtagcaa cacaaataga ggggtaaagc   300
actgtttctt tcgtgggctt cgaaagttgt acctcaaagt ggcaaactct gaatactcta   360
tttagatatc tactagtgag accttgggg ataagctcct tggtcaaaag ggaaacagcc   420
cagatcacca gttaaggccc caaaatgaaa atgatagtga ctaaggatgt gagtatgtca   480
aaacctccag caggttagct tagaagcagc aatcctttca agagtgcgta atagctcact   540
g                                                                   541

<210> SEQ ID NO 34
<211> LENGTH: 565
<212> TYPE: DNA
<213> ORGANISM: Prototheca moriformis

<400> SEQUENCE: 34
tgttgaagaa tgagccggcg acttagaaaa ggtggcatgg ttaaggaaat attccgaagc    60
cgtagcaaaa gcgagtctga atagggcgat aaaatatatt aatatttaga atctagtcat   120
tttttctaga cccgaacccg ggtgatctaa ccatgaccag gatgaagctt gggtgatacc   180
aagtgaaggt ccgaaccgac cgatgttgaa aaatcggcgg atgagttgtg gttagcggtg   240
aaataccagt cgaacccgga gctagctggt tctccccgaa atgcgttgag gcgcagcagt   300
acatctagtc tatctagggg taaagcactg tttcggtgcg ggctgtgaga acggtaccaa   360

```
atcgtggcaa actctgaata ctagaaatga cgatgtagta gtgagactgt gggggataag    420
ctccattgtc aagagggaaa cagcccagac caccagctaa ggccccaaaa tggtaatgta    480
gtgacaaagg aggtgaaaat gcaaatacaa ccaggaggtt ggcttagaag cagccatcct    540
ttaaagagtg cgtaatagct cactg                                         565

<210> SEQ ID NO 35
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 35
gtccctgccc tttgtacaca c                                              21

<210> SEQ ID NO 36
<211> LENGTH: 23
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 36
ttgatatgct taagttcagc ggg                                            23

<210> SEQ ID NO 37
<211> LENGTH: 710
<212> TYPE: DNA
<213> ORGANISM: Rhodotorula glutinis

<400> SEQUENCE: 37
cgcccgtcgc tactaccgat tgaatggctt agtgaggcct ccggattggc tattgggagc     60
tcgcgagagc acctgactgc cgagaagttg tacgaacttg gtcatttaga ggaagtaaaa    120
gtcgtaacaa ggtttccgta ggtgaacctg cggaaggatc attagtgaat attagggtgt    180
ccaacttaac ttggagcccg accctcactt tctaaccctg tgcatttgtc ttgggtagta    240
gcttgcgtca gcgagcgaat cccatttcac ttacaaacac aaagtctatg aatgtaacaa    300
atttataaca aaacaaaact ttcaacaacg gatctcttgg ctctcgcatc gatgaagaac    360
gcagcgaaat gcgatacgta atgtgaattg cagaattcag tgaatcatcg aatctttgaa    420
cgcaccttgc gctccatggt attccgtgga gcatgcctgt ttgagtgtca tgaattcttc    480
aacccacctc tttcttagtg aatcaggcgg tgtttggatt ctgagcgctg ctggcttcgc    540
ggcctagctc gctcgtaatg cattagcatc cgcaatcgaa cttcggattg actcggcgta    600
atagactatt cgttgaggat tctggtctct gactggagcc gggtaaggtt aaagggagct    660
actaatcctc atgtctatct tgagattaga cctcaaatca ggtaggacta               710

<210> SEQ ID NO 38
<211> LENGTH: 707
<212> TYPE: DNA
<213> ORGANISM: Rhodotorula glutinis

<400> SEQUENCE: 38
cgcccgtcgc tactaccgat tgaatggctt agtgaggcct ccggattggc tattgggagc     60
tcgcgagagc acccgactgc cgagaagttg tacgaacttg gtcatttaga ggaagtaaaa    120
gtcgtaacaa ggtttccgta ggtgaacctg cggaaggatc attagtgaat attagggcgt    180
```

```
ccaacttaac ttggagcccg aactctcact ttctaaccct gtgcatctgt ttctggtcag    240
tagctctctc gggagtgaac gccattcact taaaacacaa agtctatgaa tgtataaaat    300
ttataacaaa acaaaacttt caacaacgga tctcttggct ctcgcatcga tgaagaacgc    360
agcgaaatgc gataagtaat gtgaattgca gaattcagtg aatcatcgaa tctttgaacg    420
caccttgcgc tctctggtat tccggagagc atgcctgttt gagtgtcatg aaatcttcaa    480
ccctctcttt tcttaatgaa tcgagaggtg cttggatcct gagcgctgct ggcttcggcc    540
tagctcgttc gtaatgcatt agcatccgca atcgaacttc ggattgactt ggcgtaatag    600
actattcgct gaggattctg gtctcgtacc agagccgggt tgggttaaag gaagcttcta    660
atcctaaaag tctaacttt gattagatct caaatcaggt aggacta                  707
```

```
<210> SEQ ID NO 39
<211> LENGTH: 630
<212> TYPE: DNA
<213> ORGANISM: Lipomyces tetrasporus

<400> SEQUENCE: 39
cgcccgtcgc tactaccgat tgaatggctt agtgaggcct tcggactggc tccagaaaat     60
gggaaaccat tatcaggagc tggaaagttg gtcaaacttg gtcatttaga ggaagtaaaa    120
gtcgtaacaa ggtttccgta ggtgaacctg cggaaggatc attactgagt atttgtcttt    180
taaagacatc tctctatcca taaactcttt tttctaaaaa gacatgattt acacaattag    240
tctgaatgat tatataaaaa tcttcaaaac tttcaacaac ggatctcttg gttctcgcat    300
cgatgaagaa cgcagcaaaa tgcgataagt attgtgaatt gcaggatttt gtgaatcatc    360 gaattttttga acgcacattg caccttctgg tattccggag ggtatacctg tttgagcgtc    420
atttatatac tcaaaacttt gttttggtga tgggcacata tctggtgaga gctagatttg    480
cctgaaatat agtggtagag attgctacga gttatgcaag ttagccaatg ctattaagtt    540
aattcgttgg tgaagcatgc ggagctttag cggtcgccctt ccttaactat tggaatttt    600 ctaattttga cctcaaatca ggcaggagta                                     630
```

```
<210> SEQ ID NO 40
<211> LENGTH: 641
<212> TYPE: DNA
<213> ORGANISM: Lipomyces starkeyi

<400> SEQUENCE: 40
cgcccgtcgc tactaccgat tgaatggctt agtgagaccc tcggattggc gttaggaagc     60
cggcaacggc atcctttggc cgagaagttg gtcaaacttg gtcatttaga ggaagtaaaa    120
gtcgtaacaa ggtttccgta ggtgaacctg cggaaggatc attagtgatt gcctttatag    180
gcttataact atatccactt acacctgtga actgttctat tacttgacgc aagtcgagta    240
tttttacaaa caatgtgtaa tgaacgtcgt tttattataa caaaataaaa ctttcaacaa    300
cggatctctt ggctctcgca tcgatgaaga acgcagcgaa ttgcgataag taatgtgaat    360
tgcagaattc agtgaatcat cgaatctttg aacgcagctt gcgctctctg gtattccgga    420
gagcatgcct gtttcagtgt catgaaatct caaccactag ggtttcctaa tggattggat    480
ttgggcgtct gcgatctctg atcgctcgcc ttaaagagt tagcaagttt gacattaatg    540
tctggtgtaa taagttcac tgggtccatt gtgttgaagc gtgcttctaa tcgtccgcaa    600
ggacaattac tttgactctg gcctgaaatc aggtaggact a                        641
```

<210> SEQ ID NO 41
<211> LENGTH: 456
<212> TYPE: DNA
<213> ORGANISM: Yarrowia lipolytica

<400> SEQUENCE: 41

| | | | | | |
|---|---|---|---|---|---|
| cgcccgtcgc | tactaccgat | tgaatggttt | agtgagacct | tgggagggcg | agatgagggg | 60 |
| ggcaaccoct | tttgaacatc | caaacttggt | caaacttgat | tatttagagg | aagtaaaagt | 120 |
| cgtaacaagg | tttccgtagg | tgaacctgcg | aaggatcat | tattgattt | atctatttct | 180 |
| gtggatttct | ggtatattac | agcgtcattt | tatctcaatt | ataactatca | acaacggatc | 240 |
| tcttggctct | cacatcgatg | aagaacgcag | cgaaccgcga | tattttttgt | gacttgcaga | 300 |
| tgtgaatcat | caatctttga | acgcacattg | cgcggtatgg | cattccgtac | cgcacggatg | 360 |
| gaggagcgtg | ttccctctgg | gatcgcattg | cttcttgaa | atggatttt | taaactctca | 420 |
| attattacgt | catttcacct | ccttcatccg | agatta | | | 456 |

<210> SEQ ID NO 42
<211> LENGTH: 628
<212> TYPE: DNA
<213> ORGANISM: Cryptococcus curvatus

<400> SEQUENCE: 42

| | | | | | |
|---|---|---|---|---|---|
| cgcccgtcgc | tactaccgat | tgaatggctt | agtgagattt | ctggattggc | gttaggaagc | 60 |
| cggcaacggc | atcctttggc | tgagaagtta | ctcaaacttg | gtcatttaga | ggaagtaaaa | 120 |
| gtcgtaacaa | ggtttccgta | ggtgaacctg | cggaaggatc | attagtgatt | tgccttcggg | 180 |
| ctaaactata | tccataacac | ctgtgaactg | ttgattgact | tcggtcaata | ttttacaaa | 240 |
| cattgtgtaa | tgaacgtcat | gttataataa | caaatataac | tttcaacaac | ggatctcttg | 300 |
| gctctcgcat | cgatgaagaa | cgcagcgaaa | tgcgataagt | aatgtgaatt | gcagaattca | 360 |
| gtgaatcatc | gaatctttga | acgcaacttg | cgctctctgg | tattccggag | agcatgcctg | 420 |
| tttgagtgtc | atgaaatctc | aaccattagg | gtttcttaat | ggcttggatt | tggacgtttg | 480 |
| ccagtcaaat | ggctcgtctt | aaaagagtta | gtgaatttaa | catttgtctt | ctggcgtaat | 540 |
| aagtttcgct | gggctgatag | tgtgaagttt | gcttctaatc | gtccgcaagg | acaattcttg | 600 |
| aactctggcc | tcaaatcagg | taggacta | | | | 628 |

<210> SEQ ID NO 43
<211> LENGTH: 628
<212> TYPE: DNA
<213> ORGANISM: Trichosporon sp.

<400> SEQUENCE: 43

| | | | | | |
|---|---|---|---|---|---|
| cgcccgtcgc | tactaccgat | tgaatggctt | agtgagaccc | tcggattggc | gttaagaagc | 60 |
| cggcaacggc | atcttttggc | cgagaagttg | tcaaacttg | gtcatttaga | ggaagtaaaa | 120 |
| gtcgtaacaa | ggtttccgta | ggtgaacctg | cggaaggatc | attagtgaat | tgctctttga | 180 |
| gcgttaaact | atatccatct | acacctgtga | actgttgatt | gacttcggtc | aattactttt | 240 |
| acaaacattg | tgtaatgaac | gtcatgttat | tataacaaaa | ataactttca | acaacggatc | 300 |
| tcttggctct | cgcatcgatg | aagaacgcag | cgaaatgcga | taagtaatgt | gaattgcaga | 360 |
| attcagtgaa | tcatcgaatc | tttgaacgca | acttgcgctc | tctggtattc | cggagagcat | 420 |
| gcctgtttga | gtatcatgaa | atctcaacca | ttagggtttc | ttaatggctt | ggatttgggc | 480 |
| gctgccactt | gcctggctcg | ccttaaaaga | gttagcgtat | aacttgtcg | atctggcgta | 540 |

```
ataagtttcg ctggtgtaga cttgagaagt gcgcttctaa tcgtcctcgg acaattcttg    600
aactctggtc tcaaatcagg taggacta                                       628

<210> SEQ ID NO 44
<211> LENGTH: 716
<212> TYPE: DNA
<213> ORGANISM: Sporobolomyces alborubescens

<400> SEQUENCE: 44
cgcccgtcgc tactaccgat tgaatggctt agtgaggcct ccggattggc tattgggagc     60
tcgcgagagc acccgactgc cgagaagttg tacgaacttg gtcatttaga ggaagtaaaa    120
gtcgtaacaa ggtttccgta ggtgaacctg cggaaggatc attagtgaat ataggacgtc    180
caacttaact tggagtccga actctcactt tctaaccctg tgcacttgtt tgggatagta    240
actctcgcaa gagagcgaac tcctattcac ttataaacac aaagtctatg aatgtattaa    300
attttataac aaaataaaac tttcaacaac ggatctcttg gctctcgcat cgatgaagaa    360
cgcagcgaaa tgcgataagt aatgtgaatt gcagaattca gtgaatcatc gaatctttga    420
acgcaccttg cgctccatgg tattccgtgg agcatgcctg tttgagtgtc atgaatactt    480
caaccctcct ctttcttaat gattgaagag gtgtttggtt tctgagcgct gctggccttt    540
acggtctagc tcgttcgtaa tgcattagca tccgcaatcg aatttcggat tgacttggcg    600
taatagacta ttcgctgagg aattctagtc ttcggattag agccgggttg ggttaaagga    660
agcttctaat cagaatgtct acattttaag attagatctc aaatcaggta ggacta        716

<210> SEQ ID NO 45
<211> LENGTH: 718
<212> TYPE: DNA
<213> ORGANISM: Rhodotorula glutinis

<400> SEQUENCE: 45
cgcccgtcgc tactaccgat tgaatggctt agtgaggcct ccggattggc tattgggagc     60
tcgcgagagc acccgactgc cgagaagttg tacgaacttg gtcatttaga ggaagtaaaa    120
gtcgtaacaa ggtttccgta ggtgaacctg cggaaggatc attagtgaat ctaggacgtc    180
caacttaact tggagtccga actctcactt tctaaccctg tgcatctgtt ttaaaattgg    240
ctagtagctc ttcggagcga accaccattt ttcacttata caaacacaaa gtctatgaat    300
gtaaacaaat ttataacaaa acaaaacttt caacaacgga tctcttggct ctcgcatcga    360
tgaagaacga gcgaaatgc gatacgtaat gtgaattgca gaattcagtg aatcatcgaa    420
tctttgaacg caccttgcgc tccttggtat tccgaggagc atgcctgttt gagtgtcatg    480
aaatcttcaa cccacctctt tcttagtgaa tctggtggtg cttggtttct gagcgctgct    540
ctgcttcggc ttagctcgtt cgtaatgcat tagcatccgc aaccgaaact cggattgac    600 ttggcgtaat agactattcg ctgaggattc cagacttgtt ctggagccga gttgggttaa    660
aggaagcttc taatcctaaa gtctattttt tgattagatc tcaaatcagg taggacta     718

<210> SEQ ID NO 46
<211> LENGTH: 693
<212> TYPE: DNA
<213> ORGANISM: Rhodotorula glutinis

<400> SEQUENCE: 46
cgcccgtcgc tactaccgat tgaatggctt agtgagggct ccggattggc ttctgggagc     60
```

```
cggcaacggc acctagtcgc tgagaagttg gacgaacttg gtcatttaga ggaagtaaaa    120
gtcgtaacaa ggtttccgta ggtgaacctg cggaaggatc attaatgaaa tgcaaggacg    180 ctcttttag aggtccgacc caattcattt tctcacactg tgcacacact acttttaca    240 ccattttaa cacttgaagt ctaagaatgt aaacagtctc ttaattgagc ataaaattta    300
aacaaaactt tcagcaacgg atctcttggc tctcccatcg atgaagaacg cagcgaaatg    360
cgatacgtaa tgtgaattgc agaattcagt gaatcatcga atctttgaac gcaccttgca    420
ctctttggta ttccgaagag tatgtctgtt tgagtgtcat gaaactctca acccccctgt    480
tttgtaatga accaggcgtg ggcttggatt atggctgctg ccggcgtaat tgtcgactcg    540
gctgaaatac acgagctacc catttcataa gaaatagacg gtttgactcg gcgtaataac    600
atatttcgct gaggacgtca cattctttac ctagtggtgc ttctaatgcg acatctaaac    660
tttaagcttt agacctcaaa tcagtcagga cta                                 693

<210> SEQ ID NO 47
<211> LENGTH: 640
<212> TYPE: DNA
<213> ORGANISM: Trichosporon behrend

<400> SEQUENCE: 47
cgcccgtcgc tactaccgat tgaatggctt agtgagaccc tcggattggc gttaggaagc     60
cggcaacggc atcctttggc cgagaagttg gtcaaacttg gtcatttaga ggaagtaaaa    120
gtcgtaacaa ggtttccgta ggtgaacctg cggaaggatc attagtgatt gccttcatag    180
gcttaaacta tatccacata cacctgtgaa ctgttccacc acttgacgca agtcgagtgt    240
ttttacaaac aatgtgtaat gaacgtcgtt ttattataac aaaataaaac tttcaacaac    300
ggatctcttg gctctcgcat cgatgaagaa cgcagcgaat tgcgataagt aatgtgaatt    360
gcagaattca gtgaatcatc gaatctttga acgcagcttg cgctctctgg tattccggag    420
agcatgcctt tttcagtgtc atgaaatctc aaccactagg gtttcctaat ggattggatt    480
tgggcgtctg cgatctctga tcgctcgcct taaaagagtt agcaagtttg acattaatgt    540
ctggtgtaat aagtttcact gggtccattg tgttgaagcg tgcttctaat cgtccgcaag    600
gacaattact ttgactctgg cctgaaatca ggtaggacta                          640

<210> SEQ ID NO 48
<211> LENGTH: 476
<212> TYPE: DNA
<213> ORGANISM: Geotrichum histeridarum

<400> SEQUENCE: 48
cgcccgtcgc tactaccgat cgaatggctt agtgaggctt ccggattgat ttgggagaga     60
gggcgacttt tttcctggaa cgagaagcta gtcaaacttg gtcatttaga ggaagtaaaa    120
gtcgtaacaa ggtttccgta ggtgaacctg cggaaggatc attagaaaaa tgcgatatta    180
gtggtttatt ttgctcgccg aaaggcaaac ttttaacata cctacctttt tttaactata    240
aaaactttta acaacggatc tcttggttct cgcatcgatg aagaacgcag cgaattgcga    300
tacgttttgt gaattgcaga agtgaatcat caatctttga acgcacattg cgcctggtgg    360
tattccgcca ggcataccctg tttgagcgtt gttctctctg ggattgtcta ctttcctcaa    420
agaaattaaa caaacaagtt tgacacaaca cctcaacctc agatcaggta ggacta        476

<210> SEQ ID NO 49
<211> LENGTH: 687
```

```
<212> TYPE: DNA
<213> ORGANISM: Rhodotorula aurantiaca

<400> SEQUENCE: 49
cgcccgtcgc tactaccgat tgaatggctt agtgaggcct tcggattggc ttctgggagc      60
cggcaacggc acctagtcgc tgagaagttt gacgaacttg gtcatttaga ggaagtaaaa     120
gtcgtaacaa ggtttccgta ggtgaacctg cggaaggatc attaatgaat tttaggacgt     180
tcttttaga agtccgaccc tttcatttc ttacactgtg cacacacttc tttttttacac     240
acacttttaa caccttagta taagaatgta atagtctctt aattgagcat aaataaaaac     300
aaaactttca gcaacggatc tcttggctct cgcatcgatg aagaacgcag cgaattgcga     360
taagtaatgt gaattgcaga attcagtgaa tcatcgaatc tttgaacgca ccttgcactc     420
tttggtattc cgaagagtat gtctgtttga gtgtcatgaa actctcaacc cccctatttt     480
gtaatgagat gggtgtgggc ttggattatg gttgtctgtc ggcgtaattg ccggctcaac     540
tgaaatacac gagcaaccct attgaaataa acggtttgac ttggcgtaat aattatttcg     600
ctaaggacgc tttcttcaaa tataagaggt gcttctaatt cgcttctaat agcatttaag     660
ctttagacct caaatcagtc aggacta                                         687

<210> SEQ ID NO 50
<211> LENGTH: 636
<212> TYPE: DNA
<213> ORGANISM: Trichosporon domesticum

<400> SEQUENCE: 50
cgcccgtcgc tactaccgat tgaatggctt agtgagacct ccggattggc gttgagaagc      60
cggcaacggc atctcttggc tgagaagttt gtcaaacttg gtcatttaga ggaagtaaaa     120
gtcgtaacaa ggtttccgta ggtgaacctg cggaaggatc attagtgatt gccttaattg     180
gcttaaacta tatccatcta cacctgtgaa ctgtttgatt gaatcttcgg attcgatttt     240
atacaaacat tgtgtaatga acgtcattat attataacaa aaaaaaaact ttcaacaacg     300
gatctcttgg ctctcgcatc gatgaagaac gcagcgaaat gcgataagta atgtgaattg     360
cagaattcag tgaatcatcg aatctttgaa cgcaacttgc gctctctggt attccggaga     420
gcatgcctgt ttgagtgtca tgaaatctca accattaggg tttcttaatg gcttggatttt    480
ggaggtttgc cagtctgact ggctcctctt aaaagagtta gcaagttgaa ctattgctat     540
ctggcgtaat aagtttcgct ggaatggtat tgtgaagcgt gcttctaatc gtcttcggac     600
aattttttga ctctggcctc aaatcaggta ggacta                               636

<210> SEQ ID NO 51
<211> LENGTH: 711
<212> TYPE: DNA
<213> ORGANISM: Rhodotorula toruloides

<400> SEQUENCE: 51
cgcccgtcgc tactaccgat tgaatggctt agtgaggcct ccggattggc tatcgggagc      60
tcgcgagagc acctgactgc cgagaagttg tacgaacttg gtcatttaga ggaagtaaaa     120
gtcgtaacaa ggtttccgta ggtgaacctg cggaaggatc attagtgaat attagggtgt     180
ccaacttaac ttggagcccg accctcactt tctaaccctg tgcatttgtc ttgggtagta     240
gctcgtgtca gcgagcgaat cccatttcac ttacaaacac aaagtctatg aatgtaacaa     300
atttataaca aacaaaactt tcaacaacgg atctcttggc tctcgcatcg atgaagaacg     360
```

```
cagcgaaatg cgatacgtaa tgtgaattgc agaattcagt gaatcatcga atctttgaac    420
gcaccttgcg ctccatggta ttccgtggag catgcctgtt tgagtgtcat gaattcttca    480
acccacctct ttcttagtga atcaggcggt gtttggattc tgagcgttgc tggcttcgcg    540
gcctagctcg ctcgtaatgc attagcatcc gcaatcgaac ttcggattga ctcggcgtaa    600
tagactattc gctgaggatt ctggtctctg actggagccg ggtaagatta aggaagcta    660 ctaatcctca tgtctatctt ttgagattag acctcaaatc aggtaggact a            711
```

```
<210> SEQ ID NO 52
<211> LENGTH: 753
<212> TYPE: DNA
<213> ORGANISM: Rhodotorula terpendoidalis

<400> SEQUENCE: 52
cgcccgtcgc tactaccgat tgaatggctt agtgaggcct ccggactggc tattgggatc     60
tcgcgagaga acctgactgc tgggaagttg tacgaacttg gtcatttaga ggaagtaaaa    120
gtcgtaacaa ggtttccgta ggtgaacctg cggaaggatc attaatgaat attagggtgc    180
tcttttcatc aaagaggcct gaccttcatt cttctaccct gtgcactatt caaacattcg    240
gcagttggta atttggcttg taaaagagcc agacgactct gctgaattca ctcttaaact    300
ctaaagtata agaatgttac aaataaaaca aataaaactt caacaacgg atctcttggc     360 tctcgcatcg atgaagaacg cagcgaaatg cgataagtaa tgtgaattgc agaattcagt    420
gaatcatcga atctttgaac gcaccttgcg ctcgctggta ttccggcgag catgcctgtt    480
tgagtgtcat gaaaacctca acccttcaat tccttgttga attgtaaggt gtttggattc    540
tgaatgtttg ctggcttgaa gggcccttgg ctacttcaaa agcgaagctc attcgtaata    600
cattagcatc tcaatttcga atattcggat tgactcggcg taatagactt tattcgctga    660
ggacaccttc acaaggtggc cgaatttcga ggtagaagct tccaattcga tcaaaagtca    720
ctcttagttt agacctcaga tcaggcagga cta                                  753
```

```
<210> SEQ ID NO 53
<211> LENGTH: 456
<212> TYPE: DNA
<213> ORGANISM: Yarrowia lipolytica

<400> SEQUENCE: 53
cgcccgtcgc tactaccgat tgaatggttt agtgagacct tgggagggcg agatgagggg     60
ggcaacccct tttgaacatc caaacttggt caaacttgat tatttagagg aagtaaaagt    120
cgtaacaagg tttccgtagg tgaacctgcg gaaggatcat tattgatttt atctatttct    180
gtggatttct ggtatattac agcgtcattt tatctcaatt ataactatca acaacggatc    240
tcttggctct cacatcgatg aagaacgcag cgaaccgcga tatttttgt gacttgcaga    300 tgtgaatcat caatctttga acgcacattg cgcggtatgg tattccgtac cgcacggatg    360
gaggagcgtg ttccctctgg gatcgcattg cttccttgaa atggattttt aaactctca    420 attattacgt catttcacct ccttcatccg agatta                              456
```

```
<210> SEQ ID NO 54
<211> LENGTH: 709
<212> TYPE: DNA
<213> ORGANISM: Rhodotorula glutinis

<400> SEQUENCE: 54
cgcccgtcgc tactaccgat tgaatggctt agtgaggcct ccggattggc tattgggagc     60
```

```
tcgcgagagc acctgactgc cgagaagttg tacgaacttg gtcatttaga ggaagtaaaa      120
gtcgtaacaa ggtttccgta ggtgaacctg cggaaggatc attagtgaat attagggtgt      180
ccaacttaac ttggaacccg accctcactt tctaaccctg tgcatttgtc ttgggtagta      240
gcttgcgtcg gcgagcgaat cccatttcac ttacaaacac aaagtctatg aatgtaacaa      300
atttataaca aacaaaactt tcaacaacgg atctcttggc tctcgcatcg atgaagaacg      360
cagcgaaatg cgatacgtaa tgtgaattgc agaattcagt gaatcatcga atctttgaac      420
gcaccttgcg ctccatggta ttccgtggag catgcctgtt tgagtgtcat gaattcttca      480
acccacctat ttcttagtga atcaggcggt gtttggattc tgagcgctgc tggcctcacg      540
gcctagctcg ctcgtaatgc attagcatcc gcaatcgaac ttcggattga ctcggcgtaa      600
tagactattc gctgaggatt ctggtctctg actggagccg ggtgagatta aaggaagcta      660
ctaatcctca tgtctatctt gagattagac ctcaaatcag gtaggacta                  709

<210> SEQ ID NO 55
<211> LENGTH: 500
<212> TYPE: DNA
<213> ORGANISM: Yarrowia lipolytica

<400> SEQUENCE: 55
gtccctgccc tttgtacaca ccgcccgtcg ctactaccga ttgaatggtt tagtgagacc       60
ttgggagggc gagatgaggg gggcaacccc ttctgaacat ccaaacttgg tcaaacttga      120
ttatttagag gaagtaaaag tcgtaacaag gtttccgtag gtgaacctgc ggaaggatca      180
ttattgattt tatctatttc tgtggatttc tattctatta cagcgtcatt ttatctcaat      240
tataactatc aacaacggat ctcttggctc tcacatcgat gaagaacgca gcgaaccgcg      300
atattttttg tgacttgcag atgtgaatca tcaatctttg aacgcacatt gcgcggtatg      360
gcattccgta ccgcacggat ggaggagcgt gttccctctg gatcgcattg ctttcttga      420 aatggatttt ttaaactctc aattattacg tcatttcacc tccttcatcc gagattaccc      480
gctgaactta agcatatcaa                                                  500

<210> SEQ ID NO 56
<211> LENGTH: 707
<212> TYPE: DNA
<213> ORGANISM: Lipomyces tetrasporus

<400> SEQUENCE: 56
cgcccgtcgc tactaccgat tgaatggctt agtgaggcct ccggattggc tattgggagc       60
tcgcgagagc acctgactgc tgagaagttg tacgaacttg gtcatttaga ggaagtaaaa      120
gtcgtaacaa ggtttccgta ggtgaacctg cggaaggatc attagtgaat ctaggacgtc      180
caacttaact tggagtccga atctcactt tctaaccctg tgcatctgtt aattggaata       240
gtagctcttc ggagtgaacc accattcact tataaaacac aaagtctatg aatgtataca      300
aatttataac aaaacaaaac tttcaacaac ggatctcttg gctctcgcat cgatgaagaa      360
cgcagcgaaa tgcgatacgt aatgtgaatt gcagaattca gtgaatcatc gaatctttga      420
acgcaccttg cgctccttgg tattccgagg agcatgcctg tttgagtgtc atgaaatctt      480
caacccacct ctttcttagt gaatctggtg gtgcttggtt tctgagcgct gctctgcttc      540
ggcttagctc gttcgtaatg cattagcatc cgcaaccgaa cttcggattg acttggcgta      600
atagactatt cgctgaggat tctagtttac tagagccgag ttgggttaaa ggaagctcct      660
```

```
aatcctaaag tctatttttt gattagatct caaatcaggt aggacta            707

<210> SEQ ID NO 57
<211> LENGTH: 457
<212> TYPE: DNA
<213> ORGANISM: Yarrowia lipolytica

<400> SEQUENCE: 57
cgcccgtcgc tactaccgat tgaatggttt agtgagacct tgggagggcg agatgagggg    60
ggcaacccct tctgaacatc caaacttggt caaacttgat tatttagagg aagtaaaagt   120
cgtaacaagg tttccgtagg tgaacctgcg aaggatcat tattgatttt atctatttct    180
gtggatttct attctattac agcgtcattt tatctcaatt ataactatca acaacggatc   240
tcttggctct cacatcgatg aagaacgcag cgaaccgcga tatttttgt gacttgcaga    300 tgtgaatcat caatctttga acgcacattg gcgggtatgg cattccgtac cgcacggatg   360
gaggagcgtg ttccctctgg gatcgcattg ctttcttgaa atggatttt taaactctc    420 aattattacg tcatttcacc tccttcatcc gagatta                           457

<210> SEQ ID NO 58
<211> LENGTH: 1022
<212> TYPE: DNA
<213> ORGANISM: Lipomyces tetrasporus

<400> SEQUENCE: 58
cgcccgtcgc tactaccgat tgaatggctt agtgaggcct tcggactggc tccagaaaat    60
gggaaaccat tatcaggagc tggaaagttg gtcaaacttg gtcatttaga ggaagtaaaa   120
gtcgtaacaa ggtttccttc cgtagcactt actgaagctt tagcagcccg aaaaggcgaa   180
tgctagcgac tataaataaa tatggcgttc ttaaatgcta gtctctgatt agaggcgaca   240
ttgccaaatt gcggggacat cctaaagatc ttgataccaa gctggtagtc gaaagacgcc   300
agtggccgag ctaacagccc tgggtatggt aataattcaa gatatggaac aatgggtaat   360
ccgcagccaa gtcctaaact acgcaagtag catggatgca gttcacaggc caaatggtga   420
tgggtagatt actaaatctg cttaagatat ggtcggtccc gctgtgagag cagatgggaa   480
gctacaaagc agactcgtga gtttgcgcaa acgtaactaa aaacgttccg taggtgaacc   540
tgcggaagga tcattactga gtatttgtct tttaaagaca tctctctatc cataaactct   600
tttttctaaa aagacatgat ttacacaatt agtctgaatg attatataaa aatcttcaaa   660
actttcaaca acggatctct tggttctcgc atcgatgaag aacgcagcaa aatgcgataa   720
gtattgtgaa ttgcaggatt ttgtgaatca tcgaatttt gaacgcacat tgcaccttct    780
ggtattccgg agggtatacc tgtttgagcg tcatttatat actcaaaact tcgttttggt   840
gatgggcaca tatctggtga gagctagatt tgcctgaaat atagtggtag agattgctac   900
gagttatgca agttagccaa tgctattaag ttaattcgtt ggtgaagcat gcggagcttt   960
agtgatcgcc ttccttaact attggaattt ttctaatttt gacctcaaat caggcaggag  1020
ta                                                                 1022

<210> SEQ ID NO 59
<211> LENGTH: 712
<212> TYPE: DNA
<213> ORGANISM: Rhodosporidium sphaerocarpum

<400> SEQUENCE: 59
cgcccgtcgc tactaccgat tgaatggctt agtgaggcct ccggaccggc tattgggagc    60
```

```
tcgcgagagc acccgactgc tgggaagttg tacgaacttg gtcatttaga ggaagtaaaa    120
gtcgtaacaa ggtttccgta ggtgaacctg cggaaggatc attagtgaat ataggacgtc    180
caacttaact tggagtccga actctcactt tctaaccctg tgcatttgtt tgggatagta    240
gcctctcggg gtgaactcct attcactcat aaacacaaag tctatgaatg tatttaattt    300
ataacaaaat aaaactttca acaacggatc tcttggctct cgcatcgatg aagaacgcag    360
cgaaatgcga taagtaatgt gaattgcaga attcagtgaa tcatcgaatc tttgaacgca    420
ccttgcgctc catggtattc cgtggagcat gcctgtttga gtgtcatgaa tacttcaacc    480
ctcctctttt ctagtgaaag agaaggtgct tggtttctga cgttttgct ggcctcacgg     540 tcgagctcgc tcgtaatgca ttagcatccg caatcgaact tcggattgac ttggcgtaat    600
agactattcg ctgaggaatt ctaatcttcg gattagagcc gggttgggtt aaaggaagct    660
tctaatccta atgtctatat ttttagatta gatctcaaat caggtaggac ta            712

<210> SEQ ID NO 60
<211> LENGTH: 631
<212> TYPE: DNA
<213> ORGANISM: Trichosporon brassicae

<400> SEQUENCE: 60
cgcccgtcgc tactaccgat tgaatggctt agtgagacct ccggattggc gttgagaagc     60
cggcaacggc atctcttggc cgagaagttg gtcaaacttg gtcatttaga ggaagtaaaa    120
gtcgtaacaa ggtttccgta ggtgaacctg cggaaggatc attagtgatt gccttaattg    180
gcttaaacta tatccaacta cacctgtgaa ctgttcgatt gaatcttcga ttcaatttta    240
caaacattgt gtaaagaacg tcattagatc ataacaaaaa aaactttta acaacggatc     300 tcttggctct cgcatcgatg aagaacgcag cgaaatgcga taagtaatgt gaattgcaga    360
attcagtgaa tcatcgaatc tttgaacgca acttgcgctc tctggtattc cggagagcat    420
gcctgtttga gtgtcatgaa atctcacaca tcaaggtttc ttgatgaagt ggatttggag    480
gttgccagtc taactggctc ctcttaaagg agttagcata tttgattatt gctgtctggc    540
gtaataagtt tcgctagttt ggcattttga agtgtgcttc taatcgtctt cggacaattt    600
tttgactctg gcctcaaatc aggtaggact a                                   631

<210> SEQ ID NO 61
<211> LENGTH: 627
<212> TYPE: DNA
<213> ORGANISM: Cryptococcus curvatus

<400> SEQUENCE: 61
cgcccgtcgc tactaccgat tgaatggctt agtgagattt ccggattggc gttaggaagc     60
cggcaacggc atccttttggc tgagaagcta ctcaaacttg gtcatttaga ggaagtaaaa   120
gtcgtaacaa ggtttccgta ggtgaacctg cggaaggatc attagtgatt tgccttcggg   180
ctaactatat ccataacacc tgtgaactgt tgattgactt cggtcaatat ttttacaaac    240
attgtgtaat gaacgtcatg ttataataac aaatataact ttcaacaacg gatctcttgg    300
ctctcgcatc gatgaagaac gcagcgaaat gcgataagta atgtgaattg cagaattcag    360
tgaatcatcg aatctttgaa cgcaacttgc gctctctggt attccggaga gcatgcctgt    420
ttgagtgtca tgaaatctca accattaggg tttcttaatg gcttggattt ggacgtttgc    480
cagtcaaatg gctcgtctta aaagagttag tgaatttaac atttgtcttc tggcgtaata    540
```

| agtttcgctg ggctgatagt gtgaagtttg cttctaatcg tccgcaagga caattcttga | 600 |
| actctggcct caaatcaggt aggacta | 627 |

<210> SEQ ID NO 62
<211> LENGTH: 637
<212> TYPE: DNA
<213> ORGANISM: Lipomyces starkeyi

<400> SEQUENCE: 62

| cgcccgtcgc tactaccgat tgaatggctt agtgaggcct tcggactggc tccagaaaat | 60 |
| gggaaaccat tatcaggagc tggaaagttg gtcaaacttg gtcatttaga ggaagtaaaa | 120 |
| gtcgtaacaa ggtttccgta ggtgaacctg cggaaggatc attactgagt atttgtcttt | 180 |
| tcaagacatc tctctatcca taaactcttt ttttaaaaa gacatgattt ataacaatta | 240 |
| gtctgaatga ttattttaa atcttcaaaa cttttcaacaa cggatctctt ggttctcgca | 300 |
| tcgatgaaga acgcagcaaa ttgcgataag taatgtgaat tgcaggattt tgtgaatcat | 360 |
| cgaattttg aacgcacatt gcaccttctg gtattccgga gggtatacct gtttgagcgt | 420 |
| catttatata ctcaaaactt acgttttggt gatgggcacg tatctggctt ctaagttaga | 480 |
| tttgcctgaa atatagcggt agaggtcgct agaagcgatg caagttagcc aatgctatta | 540 |
| aagttaattc gttggtgacg catgttgagc ttttggtgaa gtcttcctta attattggaa | 600 |
| ttttttttcta attttgacct caaatcaggc aggagta | 637 |

<210> SEQ ID NO 63
<211> LENGTH: 457
<212> TYPE: DNA
<213> ORGANISM: Yarrowia lipolytica

<400> SEQUENCE: 63

| cgcccgtcgc tactaccgat tgaatggttt agtgagacct tgggagggcg agatgagggg | 60 |
| ggcaacccct tttgaacatc caaacttggt caaacttgat tatttagagg aagtaaaagt | 120 |
| cgtaacaagg tttccgtagg tgaacctgcg gaaggatcat tattgatttt atctatttct | 180 |
| gtggatttct attctattac agcgtcattt tatctcaatt ataactatca acaacggatc | 240 |
| tcttggctct cacatcgatg aagaacgcag cgaaccgcga tatttttgt gacttgcaga | 300 |
| tgtgaatcat caatctttga acgcacattg cgcggtatgg cattccgtac cgcacggatg | 360 |
| gaggagcgtg ttccctctgg gatcgcattg ctttcttgaa atggattttt ttaaaactctc | 420 |
| aattattacg tcatttcacc tccttcatcc gagatta | 457 |

<210> SEQ ID NO 64
<211> LENGTH: 631
<212> TYPE: DNA
<213> ORGANISM: Trichosporon loubieri

<400> SEQUENCE: 64

| cgcccgtcgc tactaccgat tgaatggctt agtgagacct ccggattggc gttgagaagc | 60 |
| cggcaacggc atctcttggc cgagaagttg gtcaaacttg gtcatttaga ggaagtaaaa | 120 |
| gtcgtaacaa ggtttccgta ggtgaacctg cggaaggatc attagtgatt gccatcttgg | 180 |
| cttaaactat atccatctac acctgtgaac cgtttgattg aatcttctga ttcaatttta | 240 |
| caaacattgt gtaatgaacg tcattagatc ataataagaa aaactttca acaacggatc | 300 |
| tcttggctct cgcatcgatg aagaacgcag cgaaatgcga taagtaatgt gaattgcaga | 360 |
| attcagtgaa tcatcgaatc tttgaacgca acttgcgctc tctggtattc cggagagcat | 420 |

```
gcctgtttga gtgtcatgaa atctcaacca ttagggtttc ttaatggctt ggatttggag      480
gttgccattc taaatggctc ctcttaaaag agttagcgag tttaactatt gctatctggc      540
gtaataagtt tcgctggaat ggtattgtga agcgcgcttc taatcgtctt cggacaattt      600
tttgactctg gcctcaaatc aggtaggact a                                     631

<210> SEQ ID NO 65
<211> LENGTH: 476
<212> TYPE: DNA
<213> ORGANISM: Geotrichum vulgare

<400> SEQUENCE: 65
cgcccgtcgc tactaccgat tgaatggctt agtgaggctt ccggattgat tagttggaga       60
gggagacttt tctgactgaa cgagaagcta gtcaaacttg gtcatttaga ggaagtaaaa      120
gtcgtaacaa ggtttccgta ggtgaacctg cggaaggatc attaaagatt taatattaat      180
tgtgaaatta aaacgatatt aacaaaaaat catacaatca attataaaaa aaatcaaaac      240
ttttaacaat ggatctcttg gttctcgtat cgatgaagaa cgcagcgaaa cgcgatattt      300
cttgtgaatt gcagaagtga atcatcagtt tttgaacgca cattgcactt gggggtatcc      360
cccaaagtat acttgtttga gcgttgtttc tctcttggaa ttgcattgct tttctaaaaa      420
atcgaatcaa attcgtttga aacatccatt cttcaacctc agatcaagta ggatta         476

<210> SEQ ID NO 66
<211> LENGTH: 710
<212> TYPE: DNA
<213> ORGANISM: Rhodosporidium toruloides

<400> SEQUENCE: 66
cgcccgtcgc tactaccgat tgaatggctt agtgaggcct ccggattggc tattgggagc       60
tcgcgagagc acctgactgc cgagaagttg tacgaacttg gtcatttaga ggaagtaaaa      120
gtcgtaacaa ggtttccgta ggtgaacctg cggaaggatc attagtgaat attagggtgt      180
ccaacttaac ttggagcccg accctcactt tctaaccctg tgcatttgtc ttgggtagta      240
gcttgcgtca gcgagcgaat cccatttcac ttacaaacac aaagtctatg aatgtaacaa      300
atttataaca aaacaaaact ttcaacaacg gatctcttgg ctctcgcatc gatgaagaac      360
gcagcgaaat gcgatacgta atgtgaattg cagaattcag tgaatcatcg aatctttgaa      420
cgcaccttgc gctccatggt attccgtgga gcatgcctgt ttgagtgtca tgaattcttc      480
aacccacctc tttcttagtg aatcaggcgg tgtttggatt ctgagcgctg ctggcttcgc      540
ggcctagctc gctcgtaatg cattagcatc cgcaatcgaa cttcggattg actcggcgta      600
atagactatt cgctgaggat tctggtctct gactggagcc gggtaaggtt aaagggagct      660
actaatcctc atgtctatct tgagattaga cctcaaatca ggtaggacta               710

<210> SEQ ID NO 67
<211> LENGTH: 707
<212> TYPE: DNA
<213> ORGANISM: Rhodotorula glutinis

<400> SEQUENCE: 67
cgcccgtcgc tactaccgat tgaatggctt agtgaggcct ccggattggc tattgggagc       60
tcgcgagagc acctgactgc tgagaagttg tacgaacttg gtcatttaga ggaagtaaaa      120
gtcgtaacaa ggtttccgta ggtgaacctg cggaaggatc attagtgaat ctaggacgtc      180
```

```
caacttaact tggagtccga actctcactt tctaaccctg tgcatctgtt aattggaata    240
gtagctcttc ggagtgaacc accattcact tataaaacac aaagtctatg aatgtataca    300
aatttataac aaaacaaaac tttcaacaac ggatctcttg gctctcgcat cgatgaagaa    360
cgcagcgaaa tgcgatacgt aatgtgaatt gcagaattca gtgaatcatc gaatctttga    420
acgcaccttg cgctccttgg tattccgagg agcatgcctg tttgagtgtc atgaaatctt    480
caacccacct ctttcttagt gaatctggtg gtgcttggtt tctgagcgct gctctgcttc    540
ggcttagctc gttcgtaatg cattagcatc cgcaaccgaa cttcggattg acttggcgta    600
atagactatt cgctgaggat tctagtttac tagagccgag ttgggttaaa ggaagctcct    660
aatcctaaag tctattttt gattagatct caaatcaggt aggacta                  707
```

<210> SEQ ID NO 68
<211> LENGTH: 627
<212> TYPE: DNA
<213> ORGANISM: Rhodotorula aurantiaca

<400> SEQUENCE: 68

```
cgcccgtcgc tactaccgat tgaatggctt agtgagattt ccggattggc gttaggaagc     60
cggcaacggc atcctttggc tgagaagcta ctcaaacttg gtcatttaaa ggaagtaaaa    120
gtcgtaacaa ggtttccgta ggtgaacctg cggaaggatc attagtgatt tgccttcggg    180
ctaactatat ccataacacc tgtgaactgt tgattgactt cggtcaatat ttttacaaac    240
attgtgtaat gaacgtcatg ttataataac aaatataact ttcaacaacg gatctcttgg    300
ctctcgcatc gatgaagaac gcagcgaaat gcgataagta atgtgaattg cagaattcag    360
tgaatcatcg aatctttgaa cgcaacttgc gctctctggt attccggaga gcatgcctgt    420
ttgagtgtca tgaaatctca accattaggg tttcttaatg gcttggattt ggacgtttgc    480
cagtcaaatg gctcgtctta aaagagttag tgaatttaac atttgtcttc tggcgtaata    540
agtttcgctg ggctgatagt gtgaagtttg cttctaatcg tccgcaagga caattcttga    600
actctggcct caaatcaggt aggacta                                       627
```

<210> SEQ ID NO 69
<211> LENGTH: 899
<212> TYPE: DNA
<213> ORGANISM: Torulaspora delbrueckii

<400> SEQUENCE: 69

```
cgcccgtcgc tagtaccgat tgaatggctt agtgaggcct caggatctgc ttagagaagg     60
gggcaactcc atctcagagc ggagaatctg gtcaaacttg gtcatttaga ggaactaaaa    120
gtcgtaacaa ggtttccgta ggtgaacctg cggaaggatc attagagaaa tctatatgaa    180
tgaagttaga ggacgtctaa agatactgta agagaggatc aggttcaaga ccagcgctta    240
attgcgcggt tgcggcttgg ttcgcctttt gcggaacatg tcttttctcg ttgttaactc    300
tacttcaact tctacaacac tgtggagttt tctacacaac ttttcttctt tgggaagata    360
cgtcttgtgc gtgcttccca gaggtgacaa acacaaacaa ctttttatta ttataaacca    420
gtcaaaacca atttcgttat gaaattaaaa atatttaaaa ctttcaacaa cggatctctt    480
ggttctcgca tcgatgaaga acgcagcgaa atgcgatacg taatgtgaat tgcagaattc    540
cgtgaatcat cgaatctttg aacgcacatt gcgcccttg gtattccagg ggcatgcct     600 gtttgagcgt catttccttc tcaaacaatc atgtttggta gtgagtgata ctctgtcaag    660
ggttaacttg aaattgctag cctgttattt ggttgtgatt ttgctggctt ggatgacttt    720
```

```
gtccagtcta gctaataccg aattgtcgta ttaggtttta ccaacttcgg cagactgtgt    780
gttggctcgg gcgctttaaa gactttgtcg taaacgattt atcgtttgtt tgagcttttc    840
gcatacgcaa tccgggcgaa caatactctc aaagtttgac ctcaaatcag gtaggaata    899
```

<210> SEQ ID NO 70
<211> LENGTH: 710
<212> TYPE: DNA
<213> ORGANISM: Lipomyces tetrasporus

<400> SEQUENCE: 70

```
cgcccgtcgc tactaccgat tgaatggctt agtgaggcct ccggattggc tattgggagc    60
tcgcgagagc acctgactgc cgagaagttg tacgaacttg gtcatttaga ggaagtaaaa   120
gtcgtaacaa ggtttccgta ggtgaacctg cggaaggatc attagtgaat attagggtgt   180
ccaacttaac ttggagcccg accctcactt tctaaccctg tgcatttgtc ttgggtagta   240
gcttgcgtca gcgagcgaat cccatttcac ttacaaacac aaagtctatg aatgtaacaa   300
atttataaca aaacaaaact ttcaacaacg gatctcttgg ctctcgcatc gatgaagaac   360
gcagcgaaat gcgatacgta atgtgaattg cagaattcag tgaatcatcg aatctttgaa   420
cgcaccttgc gctccatggt attccgtgga gcatgcctgt ttgagtgtca tgaattcttc   480
aacccacctc tttcttagtg aatcaggcgg tgtttggatt ctgagcgctg ctggcttcgc   540
ggcctagctc gctcgtaatg cattagcatc cgcaatcgaa cttcggattg actcggcgta   600
atagactatt cgttgaggat tctggtctct gactggagcc gggtaaggtt aagggagct    660 actaatcctc atgtctatct tgagattaga cctcaaatca ggtaggacta              710
```

<210> SEQ ID NO 71
<211> LENGTH: 707
<212> TYPE: DNA
<213> ORGANISM: Lipomyces tetrasporus

<400> SEQUENCE: 71

```
cgcccgtcgc tactaccgat tgaatggctt agtgaggcct ccggattggc tattgggagc    60
tcgcgagagc acccgactgc cgagaagttg tacgaacttg gtcatttaga ggaagtaaaa   120
gtcgtaacaa ggtttccgta ggtgaacctg cggaaggatc attagtgaat attagggcgt   180
ccaacttaac ttggagcccg aactctcact ttctaaccct gtgcatctgt ttctggtcag   240
tagctctctc gggagtgaac gccattcact aaaacacaa agtctatgaa tgtataaaat    300
ttataacaaa acaaaacttt caacaacgga tctcttggct ctcgcatcga tgaagaacgc   360
agcgaaatgc gataagtaat gtgaattgca gaattcagtg aatcatcgaa tctttgaacg   420
caccttgcgc tctctggtat tccggagagc atgcctgttt gagtgtcatg aaatcttcaa   480
ccctctcttt tcttaatgaa tcgagaggtg cttggatcct gagcgctgct ggcttcggcc   540
tagctcgttc gtaatgcatt agcatccgca atcgaacttc ggattgactt ggcgtaatag   600
actattcgct gaggattctg gtctcgtacc agagccgggt tgggttaaag gaagcttcta   660
atcctaaaag tctaacttt gattagatct caaatcaggt aggacta                  707
```

<210> SEQ ID NO 72
<211> LENGTH: 641
<212> TYPE: DNA
<213> ORGANISM: Trichosporon montevideense

<400> SEQUENCE: 72

```
cgcccgtcgc tactaccgat tgaatggctt agtgagaccc tcggattggc gttaggaagc      60
cggcaacggc atcctttggc cgagaagttg gtcaaacttg gtcatttaga ggaagtaaaa     120
gtcgtaacaa ggtttccgta ggtgaacctg cggaaggatc attagtgatt gcctttatag     180
gcttataact atatccactt acacctgtga actgttctat tacttgacgc aagtcgagta     240
tttttacaaa caatgtgtaa tgaacgtcgt tttattataa caaataaaa ctttcaacaa      300 cggatctctt ggctctcgca tcgatgaaga acgcagcgaa ttgcgataag taatgtgaat     360
tgcagaattc agtgaatcat cgaatctttg aacgcagctt gcgctctctg gtattccgga     420
gagcatgcct gtttcagtgt catgaaatct caaccactag ggtttcctaa tggattggat     480
ttgggcgtct gcgatctctg atcgctcgcc ttaaaagagt tagcaagttt gacattaatg     540
tctggtgtaa taagtttcac tgggtccatt gtgttgaagc gtgcttctaa tcgtccgcaa     600
ggacaattac tttgactctg gcctgaaatc aggtaggact a                         641

<210> SEQ ID NO 73
<211> LENGTH: 628
<212> TYPE: DNA
<213> ORGANISM: Rhodotorula mucilaginosa

<400> SEQUENCE: 73
cgcccgtcgc tactaccgat tgaatggctt agtgagattt ctggattggc gttaggaagc      60
cggcaacggc atcctttggc tgagaagtta ctcaaacttg gtcatttaga ggaagtaaaa     120
gtcgtaacaa ggtttccgta ggtgaacctg cggaaggatc attagtgatt tgccttcggg     180
ctaaactata tccataacac ctgtgaactg ttgattgact tcggtcaata ttttacaaa      240 cattgtgtaa tgaacgtcat gttataataa caaatataac tttcaacaac ggatctcttg     300
gctctcgcat cgatgaagaa cgcagcgaaa tgcgataagt aatgtgaatt gcagaattca     360
gtgaatcatc gaatctttga acgcaacttg cgctctctgg tattccggag agcatgcctg     420
tttgagtgtc atgaaatctc aaccattagg gtttcttaat ggcttggatt tggacgtttg     480
ccagtcaaat ggctcgtctt aaaagagtta gtgaatttaa catttgtctt ctggcgtaat     540
aagtttcgct gggctgatag tgtgaagttt gcttctaatc gtccgcaagg acaattcttg     600
aactctggcc tcaaatcagg taggacta                                         628

<210> SEQ ID NO 74
<211> LENGTH: 687
<212> TYPE: DNA
<213> ORGANISM: Cryptococcus curvatus

<400> SEQUENCE: 74
cgcccgtcgc tactaccgat tgaatggctt agtgaggcct tcggattggc ttctgggagc      60
cggcaacggc acctagtcgc tgagaagttt gacgaacttg gtcatttaga ggaagtaaaa     120
gtcgtaacaa ggtttccgta ggtgaacctg cggaaggatc attaatgaat tttaggacgt     180
tctttttaga agtccgaccc tttcattttc ttacactgtg cacacacttc ttttttacac     240
acacttttaa cacccttagta taagaatgta atagtctctt aattgagcat aaataaaaac     300
aaaactttca gcaacggatc tcttggctct cgcatcgatg aagaacgcag cgaattgcga     360
taagtaatgt gaattgcaga attcagtgaa tcatcgaatc tttgaacgca ccttgcactc     420
tttggtattc cgaagagtat gtctgtttga gtgtcatgaa actctcaacc ccctatttt      480 gtaatgagat gggtgtgggc ttggattatg gttgtctgtc ggcgtaattg ccggctcaac     540
tgaaatacac gagcaaccct attgaaataa acggtttgac ttggcgtaat aattatttcg     600
```
ctaaggacgc tttcttcaaa tataagaggt gcttctaatt cgcttctaat agcatttaag   660
ctttagacct caaatcagtc aggacta                                        687

<210> SEQ ID NO 75
<211> LENGTH: 627
<212> TYPE: DNA
<213> ORGANISM: Lipomyces tetrasporus

<400> SEQUENCE: 75
cgcccgtcgc tactaccgat tgaatggctt agtgagattt ccggattggc gttaggaagc    60
cggcaacggc atcctttggc tgagaagcta ctcaaacttg gtcatttaga ggaagtaaaa   120
gtcgtaacaa ggtttccgta ggtgaacctg cggaaggatc attagtgatt tgccttcggg   180
ctaactatat ccataacacc tgtgaactgt tgattgactt cggtcaatat ttttacaaac   240
attgtgtaat gaacgtcatg ttataataac aaatataact ttcaacaacg gatctcttgg   300
ctctcgcatc gatgaagaac gcagcgaaat gcgataagta atgtgaattg cagaattcag   360
tgaatcatcg aatctttgaa cgcaacttgc gctctctggt attccggaga gcatgcctgt   420
ttgagtgtca tgaaatctca accattaggg tttcttaatg gcttggattt ggacgtttgc   480
cagtcaaatg gctcgtctta aaagagttag tgaatttaac atttgtcttc tggcgtaata   540
agtttcgctg gctgatagt gtgaagtttg cttctaatcg tccgcaagga caattcttga   600
actctggcct caaatcaggt aggacta                                        627

<210> SEQ ID NO 76
<211> LENGTH: 707
<212> TYPE: DNA
<213> ORGANISM: Lipomyces orientalis

<400> SEQUENCE: 76
cgcccgtcgc tactaccgat tgaatggctt agtgaggcct ccggattggc tattgggagc    60
tcgcgagagc acctgactgc tgagaagttg tacgaacttg gtcatttaga ggaagtaaaa   120
gtcgtaacaa ggtttccgta ggtgaacctg cggaaggatc attagtgaat ctaggacgtc   180
caacttaact tggagtccga actctcactt tctaaccctg tgcatctgtt aattggaata   240
gtagctcttc ggagtgaacc accattcact tataaaacac aaagtctatg aatgtataca   300
aatttataac aaaacaaaac tttcaacaac ggatctcttg ctctcgcat cgatgaagaa   360 cgcagcgaaa tgcgatacgt aatgtgaatt gcagaattca gtgaatcatc gaatctttga   420
acgcaccttg cgctccttgg tattccgagg agcatgcctg tttgagtgtc atgaaatctt   480
caacccacct ctttcttagt gaatctggtg gtgcttggtt tctgagcgct gctctgcttc   540
ggcttagctc gttcgtaatg cattagcatc cgcaaccgaa cttcggattg acttggcgta   600
atagactatt cgctgaggat tctagtttac tagagccgag ttgggttaaa ggaagctcct   660
aatcctaaag tctatttttt gattagatct caaatcaggt aggacta                  707